(12) United States Patent
Oreffo et al.

(10) Patent No.: US 12,472,284 B2
(45) Date of Patent: Nov. 18, 2025

(54) STRUCTURED GELS

(71) Applicant: UNIVERSITY OF SOUTHAMPTON, Southampton (GB)

(72) Inventors: Richard Oreffo, Southampton (GB); Jonathan Dawson, Southampton (GB); Nicholas Evans, Southampton (GB); Roxanna Sharon Ramnarine Sanchez, Southampton (GB)

(73) Assignee: University of Southampton, Southampton (GB)

( * ) Notice: Subject to any disclaimer, the term of this patent is extended or adjusted under 35 U.S.C. 154(b) by 1083 days.

(21) Appl. No.: 17/277,690

(22) PCT Filed: Sep. 20, 2019

(86) PCT No.: PCT/GB2019/052647
§ 371 (c)(1),
(2) Date: Mar. 18, 2021

(87) PCT Pub. No.: WO2020/058724
PCT Pub. Date: Mar. 26, 2020

(65) Prior Publication Data
US 2022/0096715 A1    Mar. 31, 2022

(30) Foreign Application Priority Data

Sep. 20, 2018 (GB) .................................... 1815369

(51) Int. Cl.
*A61L 27/54* (2006.01)
*A61K 31/4188* (2006.01)
(Continued)

(52) U.S. Cl.
CPC ........ *A61L 27/446* (2013.01); *A61K 31/4188* (2013.01); *A61K 38/164* (2013.01); *A61K 38/1709* (2013.01); *A61K 38/1875* (2013.01); *A61L 27/54* (2013.01); *C07K 16/283* (2013.01); *A61L 2300/204* (2013.01);
(Continued)

(58) Field of Classification Search
CPC ....... C07K 16/283; A61L 27/54; A61L 27/52; A61L 27/446; A61L 2300/252; A61L 2300/256; A61L 2400/12; A61L 2300/442; A61L 2300/204; A61K 38/164;
(Continued)

(56) References Cited

U.S. PATENT DOCUMENTS

2017/0043058 A1* 2/2017 Oreffo .................... C08K 3/346

FOREIGN PATENT DOCUMENTS

WO    WO2015/170075 A2    11/2015

OTHER PUBLICATIONS

Horiba ("Colloids and Particle Characterization", 2024) (Year: 2024).*
Dawson et al ("Clay Gels For the Delivery of Regenerative Microenvironments"). (Year: 2011).*
Dawson et al., "Clay Gels for the Delivery of Regenerative Microenvironments," Aug. 2011. Advanced Materials, 23 (29): 3304-3308.

(Continued)

*Primary Examiner* — Jiangtian Xu
(74) *Attorney, Agent, or Firm* — Lee & Hayes, P.C.

(57) ABSTRACT

The invention relates to a method for assembling a clay-nanoparticle gel suitable for loading with one or more molecule species such that they are spatially structured therein, and a method for forming a clay-nanoparticle gel comprising one or more spatially structured molecule species. The invention further relates to structured clay nanoparticle gel and their use, for example in treatment.

18 Claims, 40 Drawing Sheets

Figure 1:
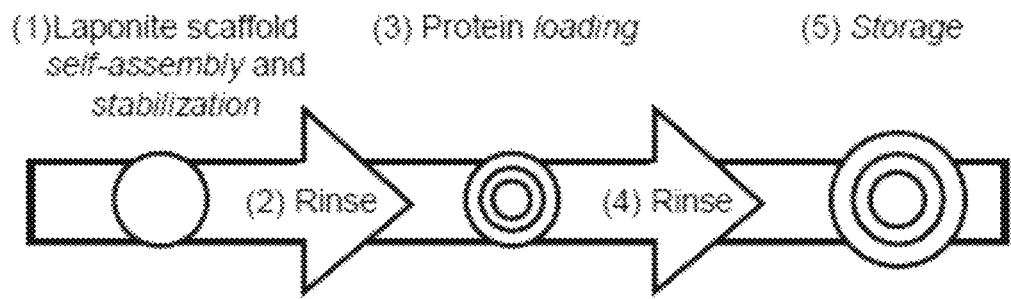

(51) Int. Cl.
    *A61K 38/16*     (2006.01)
    *A61K 38/17*     (2006.01)
    *A61K 38/18*     (2006.01)
    *A61L 27/44*     (2006.01)
    *C07K 16/28*     (2006.01)

(52) U.S. Cl.
    CPC ............... *A61L 2300/252* (2013.01); *A61L 2300/256* (2013.01); *A61L 2300/442* (2013.01); *A61L 2400/12* (2013.01)

(58) Field of Classification Search
    CPC ............ A61K 38/1709; A61K 47/02; A61K 31/4188; A61K 38/1875
    See application file for complete search history.

(56) References Cited

OTHER PUBLICATIONS

Great Britain Search Report mailed Mar. 22, 2019 in GB Patent Application No. 1815369.2, 4 pages.
Gibbs, et al., "Bone Induction at Physiological Doses of BMP through Localization by Clay Nanoparticle Gels", May 2016. Biomaterials, vol. 99, pp. 16-23.
International Search Report and Written Opinion mailed Dec. 6, 2019 in PCT Application No. PCT/GB2019/052647, 14 pages.
Office Action for European Application No. 19778610.6, Dated Jun. 27, 2024, 7 pages.
Dawson et al., "Clay Gels for the Delivery of Regenerative Microenvironments—Supporting Information," Advanced Materials, vol. 23, No. 29, Aug. 2011, pp. 3304-3308.

\* cited by examiner

E

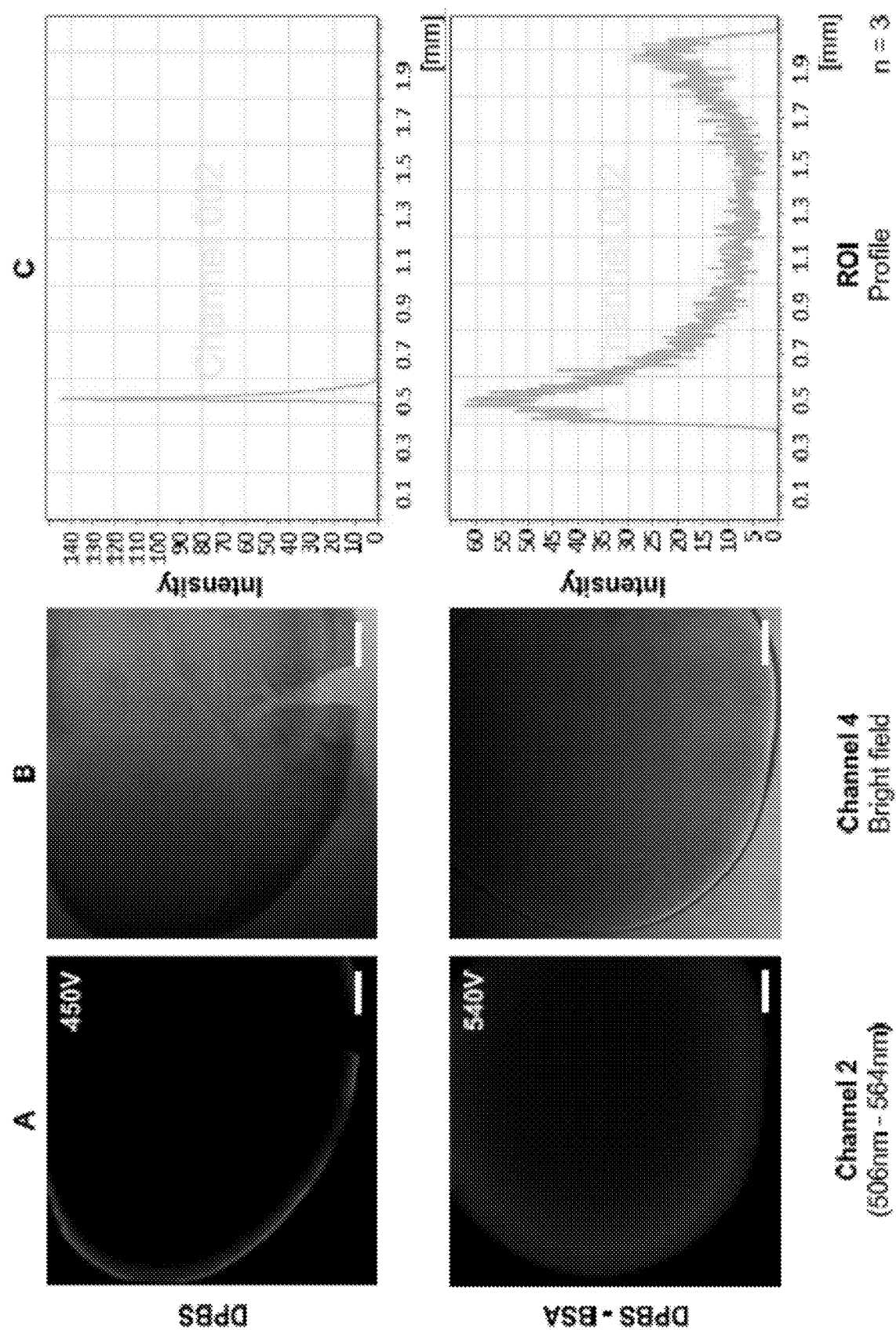

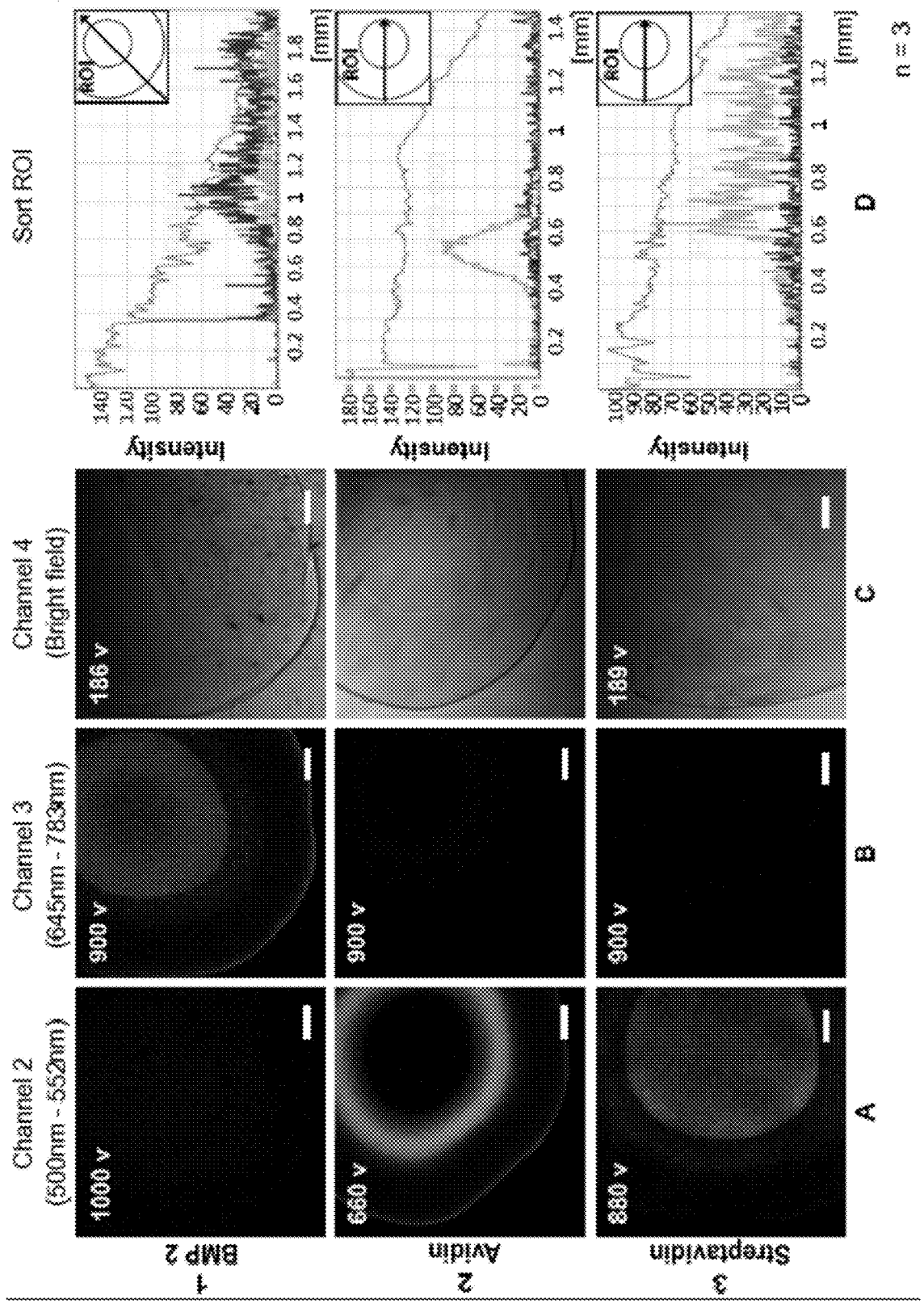

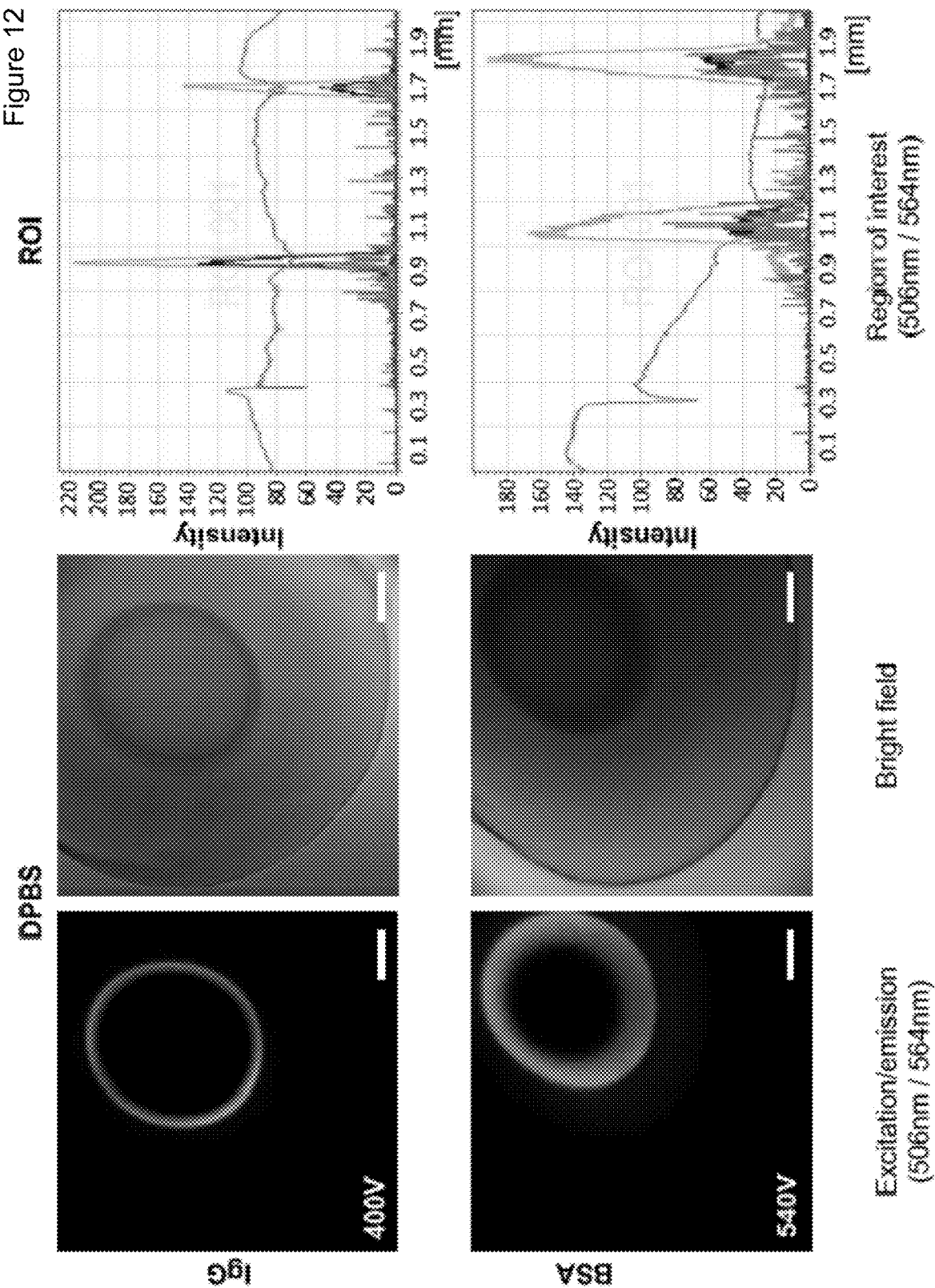

n = 8; 200μm

STRUCTURED GELS

CROSS REFERENCE TO RELATED APPLICATIONS

This application is a U.S. National Phase Application of International Application No. PCT/GB2019/052647, filed Sep. 20, 2019, which claims the benefit of Great Britain Patent Application No. 1815369.2 field Sep. 20, 2018, which are hereby incorporated by reference in their entirety herein.

This invention relates to structured hydrogels; their methods of manufacture and applications thereof.

Hydrogels are water-swollen 3D networks usually assembled with hydrophilic materials. Depending on their composition and type of crosslink (chemical or physical), they are capable of swelling or deswelling reversibly or irreversibly in aqueous media. However, these changes in volume are subject to the environmental conditions; a property which has been exploited to design smart hydrogels that respond to specific physical and chemical stimuli, where the physical stimuli include; temperature, electric or magnetic field, light, pressure, and sound, while the chemical stimuli include; pH, solvent composition, ionic strength, and molecular species.

Owing to their high water content, hydrogels resemble soft tissue, which make them attractive scaffolds for tissue engineering purposes. Generally, they exhibit good biocompatibility and high permeability for oxygen, nutrients and other water-soluble metabolites. Thus, they can be used to mimic native extracellular matrix or as delivery systems of bioactive factors. Moreover, their stimuli-responsive characteristic to environmental changes is usually exploited to fabricate 3D matrices with tuned performance. For example, ionic strength responsive hydrogels, like clay, can self-assemble in situ to allow minimally invasive delivery of stem-cells and/or growth factors (Dawson et al. 2011. *Advanced Materials*, 23(29), pp. 3304-3308). In another example, protein diffusion can be controlled with pH and ionic strength changes in chemically crosslinked carboxy methyl dextran hydrogel (Zhang et al. 2005. *Biomaterials*, 26(22), pp. 4677-4683.).

Formation of hydrogels with charged molecules such as clay nanoparticles can impart new and useful properties to hydrogels. For example clay nanoparticles provide new opportunities for biomaterial design, from the delivery of bioactive molecules to the enhancement of the mechanical properties of polymeric hydrogels (Dawson & Oreffo 2013, *Adv. Mater,* 25, 4069-4086) (Zhao et al. 2015, Soft Matter, 11, 9229-9245). Hydrogels made specifically of delaminated smectite clays have "the potential to interact with organic molecules on particle surfaces or within inter-layer pores and inter-particle spaces through cation-exchange, hydrophobic interactions, hydrogen bonding, cation bridging, anion exchange and proton transfer". Recent studies demonstrate that Laponite®, a synthetic smectite clay, has the capacity to bind and localize proteins in space and time, restricting their diffusion from the implant site and improving their efficacy. (Dawson et al. 2011. *Advanced Materials,* 23(29), pp. 3304-3308; Gibbs et al. 2016. *Biomaterials*, 99, pp. 16-23). WO2015170075 (incorporated herein by reference) describes clay gels, including polymer-clay hydrogels, and their use in bone repair.

Laponite® (a synthetic hectorite) is a synthetic particle constituted by a central magnesium sheet sandwiched by two silica sheets giving rise to a disc shaped particle of approximately 25 nm diameter and 1 nm depth possessing dissimilar charge distribution, with a negative face charge and a weak positive rim charge.

Understanding of the bone hierarchical structure and properties at different length scales has led to the formulation of new bone tissue engineering strategies towards the fabrication of more biomimetic scaffolds. The new bone tissue engineering strategies involve emulating the topographies, mechanical and biochemical cues found at the cellular microenvironment in order to control the fate of mesenchymal stem cells (MSCs). In the last three decades, numerous approaches with nano and microscale cues that induce osteogenesis have been developed. However, the major challenge to translate these approaches into clinical applications is the loss of nano and micro resolution as the approaches are scaled up towards larger macrostructures, which is imperative in order to restore the full function of severely damaged bone tissue.

To overcome the addressed challenge, the use of water based colloidal gels made of charged particles, such as Laponite® clay nanoparticles, is proposed, since this nanotechnology has shown interesting opportunities for bone tissue engineering. Early work performed by Dawson et al. (2011. *Advanced Materials,* 23(29), pp. 3304-3308) demonstrated the capacity of Laponite® colloidal gel to self-assemble into micro and macrodroplets under physiological conditions and suggested their use as delivery systems of growth factors by premixing or adsorbing them over the droplet surface. Moreover, Gibbs et al. (2016. *Biomaterials*, 99, pp. 16-23) indicated that the localization of growth factor with Laponite® colloidal gel (whether premixed or adsorbed) enhances the bioactivity of physiological dosage of BMP-2 to achieve ectopic bone formation in a subcutaneous murine model. Both approaches highlight the benefit of binding and localizing proteins in space and time, restricting their diffusion from the implant site and improving their efficacy. However, they do not display any hierarchical order.

Another study performed by Min et al. (2014) showed that Laponite® nanoparticles can be used to build a composite microstructure with 2D spatial-localization, organization and controlled release of macromolecules. In this regard, they fabricated a polymer-based, self-assembled, multi-layered structure, loaded with rhBMP-2, gentamicin and Laponite® nanoparticles to coat orthopaedic implants using a spray Layer-By-Layer (LBL) polyelectrolyte technique. The in vitro study showed that the Laponite® barrier modulated the release profile of ~300 ng/cm$^2$/day of rhBMP-2 over a 40-day time course, which resulted in a physiologically relevant dosing. This hierarchical approach seems to be promising for enhancing implants osseointegration, though it is still limited to a 2D microscale level.

Other approaches involve mixing of Laponite® nanoparticles with well-designed organic macromolecules such as dendrimers to assemble hydrogels with hierarchical nanostructure, good mechanical and self-healing properties, which could potentially be used as protein carriers (Wang et al. 2010. *Nature,* 463(7279), pp. 339-43.); or chiral nematic liquid crystal copolymers to self-assemble hydrogels with mesocrystalline structures (Tritschler et al. 2013 *Langmuir,* 29(35), pp. 11093-11101). The latter seems to be a good approach to build structures with a larger hierarchical organization. However, the Tritschler et al (2013) 3D scaffold was assembled under harsh conditions by exfoliating the Laponite® in dimethylformamide.

An aim of the present invention is to provide an improved gel having spatially structured biomolecules therein.

According to a first aspect of the invention, there is provided a method for assembling a clay-nanoparticle gel suitable for loading with one or more molecule species such that they are spatially structured therein, the method comprising:

providing a colloidal solution of clay nanoparticles;

immersing the colloidal solution of clay nanoparticles into an aqueous assembly solution and allowing the colloidal solution of clay nanoparticles to set into a gel within the aqueous solution wherein a protein is provided in the aqueous assembly solution prior to, concurrently, or after the immersion of the colloidal solution of clay nanoparticles into the aqueous assembly solution, thereby forming a clay-nanoparticle gel comprising the protein.

According to another aspect of the invention there is provided a method for forming a clay-nanoparticle gel comprising one or more spatially structured molecule species, the method comprising:

providing a clay-nanoparticle gel comprising protein, as prepared according to the first aspect of the invention; and loading the clay-nanoparticle gel comprising protein with additional organic molecules comprising the step of immersing the clay-nanoparticle gel comprising protein into an aqueous loading solution, wherein the additional molecules are provided in the aqueous loading solution prior to, concurrently, or after the immersion of the clay-nanoparticle gel comprising protein into the aqueous loading solution, such that the additional molecules are absorbed into the clay-nanoparticle gel.

The gel comprising one or more spatially structured organic molecule species may also be termed "spatially loaded gel" herein.

Advantageously, the invention herein has developed a 3D scaffold with different levels of hierarchical organization that can mimic the cellular microenvironment of bone by exploiting the physicochemical properties of clay nanoparticles, and proteins. In particular, the invention provides assembled scaffolds with birefringent properties displaying symmetric optical patterns upon protein diffusion, which is indicative of 3D spatial rearrangement of the clay nanoparticles, and organic molecules, such as proteins. Such gel scaffolds can be used to build hierarchical structures with 3D protein micro-patterning and microstructural rearrangement. The localisation of the 3D protein micro-pattern can be tuned by varying the protein concentration, incubation time and temperature, centripetal forces, ionic concentration, type of protein and Laponite® concentration, shear and aging history. The invention can be used to study the clay/protein interaction, 3D protein micro patterning and used to deliver growth factors for tissue engineering.

Addition of protein, such as albumin, allows movement of proteins to the core in a concentration dependent manner. The rate of movement of proteins to the core can be protein concentration and assembly time and temperature dependent. Addition of ions can be used to accelerate the assembly process. An aqueous assembly solution of protein, such as albumin, alone is sufficient to assemble synthetic hectorite-protein gel scaffolds capable of patterning organic molecules, such as proteins, within synthetic hectorite. Unlike other hydrogel systems, the invention can advantageously provide the absence of chemical cross linkers, nontoxic assembly under physiological conditions and a unique degree of hierarchical organization of proteins. The skilled person will also recognise that cross-linking may still be used and compatible with the invention, if required or advantageous, to impart a property on the gel, and/or improve its manufacture.

Clay Nanoparticle

A clay nanoparticle is understood to be an inorganic nanoparticle. The clay nanoparticles may comprise or consist of synthetic clay nanoparticles (i.e. not occurring in nature), such as synthetic silicate. The clay nanoparticles may comprise a smectite clay. The clay nanoparticles may comprise any material selected from the group comprising Laponite® (synthetic hectorite), montmorillonite, beidellite, nontronite, hectorite, saponite, sauconite, bentonite, kaolinite, and halloysite; or combinations thereof. In one embodiment the clay-nanoparticles are a synthetic hectorite. The synthetic hectorite may be Laponite® RD™ or Laponite® XLG™, a synthetic layered silicate, such as synthetic hectorite. The synthetic hectorite may have a pharmaceutically acceptable level of heavy metals and microbiological content. In one embodiment the synthetic hectorite may be Laponite® XLG™ or an equivalent generic material having a pharmaceutically acceptable level of heavy metals content equivalent to that of Laponite® XLG™.

In one embodiment, the clay nanoparticles may have an average size of between about 10 nm and about 800 nm in the longest dimension. In another embodiment, the clay nanoparticles may have an average size of between about 10 nm and about 300 nm in the longest dimension. The clay nanoparticles may have an average size of between about 10 nm and about 100 nm in the longest dimension. The clay nanoparticles may have an average size of between about 10 nm and about 50 nm in the longest dimension. The clay nanoparticles may have an average size between about 20 nm and about 50 nm in the longest dimension. The clay nanoparticles may have an average size of between about 20 nm and about 30 nm in the longest dimension. In another embodiment, the clay nanoparticles may have an average size of about 25 nm in the longest dimension.

The clay nanoparticles may have an average thickness (shortest dimension) of between about 0.5 nm and about 2 nm. In one embodiment, the clay nanoparticles may have an average thickness of about 1 nm. The clay nanoparticles may have an average thickness of about 0.92 nm. The thickness of the clay nanoparticles may be determined when dispersed in an aqueous environment.

In one embodiment, the clay nanoparticles may have an aspect ratio of between about 1:5 and about 1:100. In another embodiment, the clay nanoparticles may have an aspect ratio of at least 1:5. The clay nanoparticles may have an aspect ratio of at least 1:10. The clay nanoparticles may have an aspect ratio of at least 1:20. The clay nanoparticles may have an aspect ratio of at least 1:25. The clay nanoparticles may have an aspect ratio of less than 1:100. The clay nanoparticles may have an aspect ratio of less than 1:50. The clay nanoparticles may have an aspect ratio of less than 1:30. The clay nanoparticles may have an aspect ratio of between 1:10 and 1:100. The clay nanoparticles may have an aspect ratio of between 1:10 and 1:50. The clay nanoparticles may have an aspect ratio of between 1:20 and 1:50. The clay nanoparticles may have an aspect ratio of between 1:15 and 1:40. The clay nanoparticles may have an aspect ratio of between 1:15 and 1:30. The clay nanoparticles may have an aspect ratio of between 1:20 and 1:30.

The clay nanoparticles may have a <3 nm to >15 nm aspect ratio. In another embodiment, the clay nanoparticles may have an about 1 nm to about 25 nm aspect ratio.

The charge and aspect ratio of clay nanoparticles such as synthetic hectorite, advantageously allow interaction to form a gel in an aqueous environment. Advantageously, the large surface area and corresponding aspect ratio increases the strength of the surface effects in the system and generates stronger gels.

Clay Nanoparticle Solution

The colloidal solution of clay nanoparticles, may comprise clay nanoparticles) suspended in water forming a colloid. The colloid of clay nanoparticles may comprise saline, buffer or cell culture media.

The colloidal solution of clay nanoparticles may comprise between about 0.5% and about 5% clay nanoparticles (w/v). The colloidal solution of clay nanoparticles may comprise between about 0.5% and about 4% clay nanoparticles (w/v). The colloidal solution of clay nanoparticles may comprise between about 1% and about 3% clay nanoparticles (w/v). The colloidal solution may comprise between about 1% and about 2% clay nanoparticles (w/v). The colloidal solution may comprise between about 2% and about 3% clay nanoparticles (w/v). The colloidal solution may comprise about 2% (w/v) clay nanoparticles.

The colloidal solution of clay nanoparticles may further comprise polymer. The solution of clay nanoparticles may comprise between about 0.5% and about 5% polymer (w/v). The colloidal solution of clay nanoparticles may comprise between about 0.5% and about 4% polymer (w/v). In another embodiment, the colloidal solution of clay nanoparticles may comprise between about 0.5% and about 3% polymer (w/v). In another embodiment, the colloidal solution of clay nanoparticles may comprise between about 1% and about 3% polymer (w/v). In another embodiment, the colloidal solution of clay nanoparticles may comprise between about 1% and about 4% polymer (w/v). The colloidal solution of clay nanoparticles may comprise about 2% (w/v) polymer.

In one embodiment, the w/w ratio of clay nanoparticles to polymer may be about 1:2. In another embodiment, the w/w ratio of clay nanoparticles to polymer may be about 1:100. In another embodiment, the w/w ratio of clay nanoparticles to polymer may be between about 1:2 and about 1:100.

The clay nanoparticles and polymer may not be cross-linked by covalent bonding, or may not be arranged to be cross-linked by covalent bonding. In an alternative embodiment, the clay nanoparticles, and polymer may be cross-linked by covalent bonding, or may be arranged to be cross-linked by covalent bonding, for example by UV-assisted cross-linking of UV-activated moieties on the charged molecules or particles and/or polymer. For example, the polymer gelatine-methacryloyl could be incorporated along with a photo-initiator such as Irgacure® 2959 without compromising assembly and patterning and allow for cross-linking at the end of the assembly process for improved mechanical properties. The cross linker used will depend on the polymer incorporated and the method of cross-linking to be applied. Cross-linking may be initiated during or after the assembly process and before or after the loading.

The polymer may be natural or synthetic. The polymer may be biodegradeable. The polymer may be biocompatible.

The polymer may comprise or consist of agarose. The polymer may comprise or consist of glycosaminoglycan. The glycosaminoglycan may comprise or consist of hyaluronan (HA). The polymer may comprise or consist of a polymer selected from any of the group comprising polyacrylamide; pectin; alginate; carboxymethylcellulose; methylcellulose; PLGA; PEG; polysaccharide, such as starch, cellulose, chitin, alginate, and hyaluronate; protein, such as collagen, gelatine, casein, albumin; polyvinyl alcohol (PVA); polyvinylpyrrolidone (PVP); polyetheleneglycol (PEG); polylactic acid (PLA); and polyhydroxy acid (PHA), or combinations thereof. The polymer may comprise or consist of a polymer selected from any of the group comprising polyacrylamide; pectin; alginate; carboxymethylcellulose; methylcellulose; PLGA; PEG; polysaccharide, such as starch, cellulose, chitin, alginate, and hyaluronate; protein, such as collagen, gelatine, casein, albumin; polyvinylpyrrolidone (PVP); polyetheleneglycol (PEG); polylactic acid (PLA); and polyhydroxy acid (PHA), or combinations thereof. The polymer may comprise or consist of a polymer selected from any of the group comprising poly ([alpha]-hydroxyacids) including poly (D, L-lactide-co-glycolide) (PLGA), poly D,L-lactic acid (PDLLA), polyethyleneimine (PEI), polylactic or polyglcolic acids, poly-lactide polyglycolide copolymers, and poly-lactide poly-glycolide polyethylene glycol copolymers, polyethylene glycol (PEG), polyesters, poly ([epsilon]-caprolactone), poly (3-hydroxybutyrate), poly (s-caproic acid), poly (p-dioxanone), poly (propylene fumarate), poly (orthoesters), polyol/diketene acetals addition polymers, polyanhydrides, poly (sebacic anhydride) (PSA), poly (carboxybiscarboxyphenoxyphosphazene) (PCPP), poly [bis(p-carboxyphenoxy) methane] (PCPM), poly (amino acids), poly (pseudo amino acids), polyphosphazenes, derivatives of poly [(dichloro) phosphazene], poly [(organo) phosphazenes], polyphosphates, polyethylene glycol polypropylene block co-polymers for example that sold under the trade mark Pluronics™, natural or synthetic polymers such as silk, elastin, chitin, chitosan, fibrin, fibrinogen, polysaccharides (including pectins), alginates, collagen, peptides, polypeptides or proteins, copolymers prepared from the monomers of any of these polymers, random blends of these polymers, any suitable polymer and mixtures or combinations thereof. In one embodiment, the polymer comprises or consists of fibril.

In one embodiment, the polymer may have a molecular weight of at least 10 kDa. In another embodiment, the polymer may have a molecular weight of at least 12 kDa. The polymer may have a molecular weight of at least 15 kDa. The polymer may have a molecular weight of at least 20 kDa. The polymer may have a molecular weight of at least 25 kDa. The polymer may have a molecular weight of at least 50 kDa. The polymer may have a molecular weight of at least 100 kDa. The polymer may have a molecular weight of at least 150 kDa. The polymer may have a molecular weight of between about 10 kDa and about 1000 kDa. The polymer may have a molecular weight of between about 15 kDa and about 1000 kDa. The polymer may have a molecular weight of between about 20 kDa and about 1000 kDa. The polymer may have a molecular weight of between about 50 kDa and about 1000 kDa. The polymer may have a molecular weight of about 150 kDa. In one embodiment, the polymer may be hyaluronan with a molecular weight of about 150 kDa.

The colloidal solution may further comprise an active agent. The active agent may be a therapeutically, prophylactically or diagnostically active substance. The active agent may be a bioactive substance. The active agent may be selected from the group comprising a drug, pro-drug, peptide, protein, and nucleic acid, or combinations thereof. The active agent may comprise or consist of a biomolecule. The active agent may be a drug, a cell, signalling molecule, such as a growth factor, or any other suitable active agent. For example, the active agent may comprise amino acids, peptides, proteins, sugars, antibodies, nucleic acid, antibiotics, antimycotics, growth factors, nutrients, enzymes, hormones, steroids, synthetic material, adhesion molecules, colourants/dyes (which may be used for identification), radioisotopes (which may be for X-ray detection and/or monitoring of degradation), and other suitable constituents, or combinations thereof. In one embodiment, the active agent comprises an antibiotic and/or antimycotic. In one embodiment, the active agent comprises an enzyme and/or an antibody, or fragment or mimetic thereof.

The clay-nanoparticle solution may be sterile or may be sterilised, for example by autoclaving or UV light, prior to forming the clay-nanoparticle gel.

Advantageously, the clay-nanoparticle gel develops optical anisotropic properties upon autoclaving, and the protein loading stabilises such properties. This can have benefits for example for protein activity or fluorescence enhancement.

Protein Component and Assembly Solution

The protein may be a globular protein (also known as spheroprotein). The protein may not be a fibrous, disordered or membrane protein. The protein may comprise a globin comprising a globin fold. The protein may be any protein, or any globular protein, having a molecular weight of between 14 kDa and 250 kDa. The protein may be a multi-subunit protein. The protein may comprise a majority of alpha helices.

The protein may comprise a globin protein, such as hemoglobin or myoglobin. In another embodiment, the protein may be an enzyme, such as an enzyme selected from hyaluronidase, catalase and lysozyme. In another embodiment, the protein comprises an immunoglobulin, such as IgG. In another embodiment, the protein may comprise avidin, casein, or streptavidin.

In one embodiment, the protein comprises albumin. The albumin may comprise a serum albumin, such as a mammalian serum albumin. The albumin may comprise any albumin selected from the group comprising human serum albumin and bovine serum albumin; or combinations thereof. In one embodiment, the albumin is bovine serum albumin (BSA). In one embodiment the albumin is provided as foetal calf serum (FCS), or a BSA-comprising fraction thereof. Therefore, in one embodiment, the aqueous solution comprising albumin may comprise or consist of FCS, synthetic FCS, or a fraction of FCS that comprises albumin. The skilled person will recognise that FCS is bovine in origin, however, the FCS may be substituted with another mammalian serum comprising a serum albumin. In another embodiment, the mammalian serum may be substituted with any solution containing growth factors or proteins, wherein the protein may be a globular protein. For example, platelet rich plasma, growth factor enhanced media, supplement growth factor concentrates, or serum fractions.

The protein may be dissolved in an aqueous assembly solution. In one embodiment, the protein is dissolved in water. In one embodiment, the aqueous assembly solution is water. The water may be deionized water. In another embodiment, the protein is dissolved in Dulbecco's phosphate buffered saline (DPBS). The aqueous assembly solution may comprise Dulbecco's phosphate buffered saline (DPBS). The aqueous assembly solution may comprise any from the group comprising water, Dulbecco's modified eagle medium, Dulbecco's phosphate buffered saline (DPBS); or combinations thereof. The aqueous assembly solution may comprise a buffer solution.

The protein may be provided in the aqueous assembly solution in the amount of between 1 mg/ml to 100 mg/ml. In an embodiment where the protein is in water, the amount of protein may be at least 2.5 mg/ml, at least 5 mg/ml, at least 10 mg/ml, at least 15 mg/ml, at least 18 mg/ml, or at least 20 mg/ml. In an embodiment where the protein is in water, the amount of protein may be between about 15 mg/ml and about 100 mg/ml. In another embodiment where the protein is in water, the amount of protein may be between about 20 mg/ml and about 100 mg/ml. In another embodiment where the protein is in water, the amount of protein may be between about 20 mg/ml and about 50 mg/ml. In another embodiment where the protein is in water, the amount of albumin may be between about 20 mg/ml and about 30 mg/ml.

In another embodiment where the protein is in a buffer (i.e. the aqueous assembly solution is a buffer), such as DPBS, the amount of protein may be at least about 1 mg/ml. In another embodiment where the protein is in a buffer, such as DPBS, the amount of protein may be between about 0.1 mg/ml and about 100 mg/ml. In another embodiment where the protein is in a buffer, such as DPBS, the amount of protein may be between about 0.1 mg/ml and about 50 mg/ml. In another embodiment where the protein is in a buffer, such as DPBS, the amount of protein may be between about 0.5 mg/ml and about 50 mg/ml. In another embodiment where the protein is in a buffer, such as DPBS, the amount of protein may be between about 1 mg/ml and about 50 mg/ml. In another embodiment where the protein is in a buffer, such as DPBS, the amount of protein may be between about 5 mg/ml and about 50 mg/ml. In another embodiment where the protein is in a buffer, such as DPBS, the amount of protein may be between about 10 mg/ml and about 50 mg/ml. In another embodiment where the protein is in a buffer, such as DPBS, the amount of protein may be between about 0.1 mg/ml and about 30 mg/ml. In another embodiment where the protein is in a buffer, such as DPBS, the amount of protein may be between about 1 mg/ml and about 30 mg/ml. In another embodiment where the protein is in a buffer, such as DPBS, the amount of protein may be between about 5 mg/ml and about 30 mg/ml. In another embodiment where the protein is in a buffer, such as DPBS, the amount of protein may be between about 10 mg/ml and about 30 mg/ml. In another embodiment where the protein is in a buffer, such as DPBS, the amount of protein may be between about 20 mg/ml and about 30 mg/ml. The DPBS may be replaced by buffers such as DMEM, aMEM, M199, or by salt solutions from the group comprising DPBS Ca and Mg, EBSS, HBSS, HEPES, sodium chloride, potassium chloride and sodium bicarbonate. The skilled person will recognise that there are many appropriate cell culture media, or balanced salt solutions that could be used, for example with different ionic strength or pH. In one embodiment a buffer may be used with pH ranging from 4 to 10.

In one embodiment, the aqueous assembly solution may further comprise one or more ions. The ions may be divalent cations, such as $Ca^{2+}$ and $Mg^{2+}$. The ions may be provided by dissolution of a salt of such ions into the aqueous solution. For example $CaCl_2$ $2H_2O$ $MgCl_2$ $6H_2O$ may be provided for respective divalent cations $Ca^{2+}$ and $Mg^2$.

The molar ionic strength of the aqueous assembly solution may be between about 0.1 and about 0.30 mol/L. In another embodiment, the molar ionic strength of the aqueous assembly solution may be between about 0.1 and about 0.25 mol/L. In another embodiment, the molar ionic strength of the aqueous assembly solution may be about 0.1 to 0.2 mol/L. In another embodiment, the molar ionic strength of the aqueous assembly solution may be about 0.13 to 0.2 mol/L. Alteration of the molar ionic strength of the solution can be used to alter the distribution or diffusion of the proteins.

In one embodiment, the aqueous assembly solution comprising protein may further comprise a mixture of two or more different proteins. Advantageously, the different proteins may impart different biological functions (e.g. stimulate different cells and their responses simultaneously or at different time scales. For example angiogenesis (VEGF) and osteogenesis (BMP2) for bone formation). Alternatively, the mixture of different proteins may be used to achieve alternate pattern structures.

Advantageously, the skilled person can tune the loading and spatial separation of the organic molecule by choosing the protein concentration and solvent according to the desired properties. The addition of ions to the system significantly decreases the protein concentration necessary to localize proteins inside the clay-nanoparticle gel scaffolds. Ions can be used to tune the scaffolds. For example, they prevent the scaffold shrinkage and help to increase the spatial resolutions of protein localization into the scaffolds.

The clay nanoparticle gel may be assembled with a pre-mixed organic or inorganic molecule, which may functionalise the clay nanoparticle gel. For example, the clay nanoparticles may be functionalised with organic or inorganic molecules prior to assembly of the gel. Additionally or alternatively, if a polymer is provided, the polymer may be functionalised by attachment to organic or inorganic molecules prior to assembly of the gel. In one embodiment, the clay nanoparticle gel may be assembled with a molecule (e.g. mixed with the colloidal solution prior to assembly) selected from an alginate, agarose, collagen type I, ibuprofen, antibiotic; or combinations thereof.

Scaffolds with improved bioactivity, porosity and mechanical properties, may be achieved by mixing clay-nanoparticle with a polymer or other molecules, such as active agents (e.g. alginate, agarose, collagen type I, ibuprofen, antibiotic). Then the composite prepared can be placed in a protein solution to assemble the scaffolds. Later they can be further loaded with a molecule of interest (e.g. BMP 2 and VEGF).

Nanoclay Gel

The clay-nanoparticle gel may have, or be arranged to have, a storage modulus of at least about 11115±2717 Pa after setting. In another embodiment, the clay-nanoparticle gel may have, or be arranged to have, a storage modulus of between about 2357±421 Pa and 11115±2717 Pa after setting.

The clay-nanoparticle gel may have, or be arranged to have, a loss modulus of at least about 1050 G" Pa after setting. In another embodiment, the clay-nanoparticle gel may have, or be arranged to have, a loss modulus of between about 76.64±11.11 Pa and 1050±246.6 Pa G" Pa after setting.

The clay-nanoparticle gel may be in the form of a droplet. In an embodiment wherein the clay-nanoparticle solution is added drop wise to the aqueous solution comprising protein. The clay-nanoparticle solution droplets may set into substantially spherical capsules/structures. A "spherical capsule" or "capsule" may otherwise be referred to as a "droplet" herein. In one embodiment, clay-nanoparticle gel may be in the form of a micro-droplet (e.g. about 100-200 μm in diameter), macro-droplet (e.g. about 2-4 mm in diameter), or a cylinder.

A cylinder may be about 0.4 cm in diameter and about 0.8 cm in length. In another embodiment, a cylinder may be about 0.9 cm in diameter and about 1.2 cm in length. In another embodiment, a cylinder may be about 0.4 cm in diameter and about 1.2 cm in length.

In another embodiment, a cylinder may be in the form of a string, such as between about 750 and about 850 μm in diameter and 1 cm or more in length. In another embodiment, a cylinder may be in the form of a string, such as less than 1000 μm in diameter and 1 cm or more in length.

The clay-nanoparticle gel may be between 1 and 3 mm in size across its largest diameter. In another embodiment, the clay-nanoparticle gel may be between 1.5 and 2.5 mm in size across its largest diameter. The clay-nanoparticle gel may be about 2 mm in size across its largest diameter. In another embodiment, the clay-nanoparticle gel may be between about 100 μm and about 1.2 cm in size across its largest diameter.

The clay-nanoparticle gel may be between about 2 and about 5000 $mm^3$ in volume. In another embodiment, the clay-nanoparticle gel may be between about 5 and about 5000 $mm^3$ in volume. In another embodiment, the clay-nanoparticle gel may be between about 5 and about 200 $mm^3$ in volume. In another embodiment, the clay-nanoparticle gel may be between about 5 and about 20 $mm^3$ in volume. In another embodiment, the clay-nanoparticle gel may be about 5 $mm^3$ in volume.

Reference to the size or volume of the clay-nanoparticle gel may refer to the average size or volume in a population of clay-nanoparticle gels.

Advantageously, having smaller scaffolds increases the surface area of the scaffold and thus extends the interface with biological tissue. For example, the spherical shape leaves a space in-between scaffolds for vascularization, which is crucial for invasion formed elements and proteins, diffusion of oxygen and nutrients, and waste removal.

The clay-nanoparticle gel material may be biocompatible. The term "biocompatible" is understood to include non-toxic to the human or animal body. To be biocompatible, the clay-nanoparticle gel material may not cause an immune response.

The clay-nanoparticle gel material may be biodegradable. The term "biodegradable" is understood to include the ability to breakdown over time in the tissue or body of a human or animal, and/or in the environment. The time for complete degradation may be at least 1 week, at least 1 month, at least 2 months, at least 6 months, or at least 12 months. The time for complete degradation may be no more than 12 months. The time for complete degradation may be no more than 6 months.

The Molecule to be Loaded/Spatially Structured in the Gel

The molecule to be loaded/spatially structured in the gel may be an organic molecule or an inorganic molecule. The molecule (e.g. an organic molecule) to be spatially structured in the clay-nanoparticle gel, may be a bioactive molecule. The molecule may be a therapeutically, prophylactically or diagnostically active molecule. The molecule may be selected from the group comprising a drug, a pro-drug, a biomolecule, a protein, a peptide, an oligomer, nucleic acid, oligonucleotide, antibody, antibody fragment, mimic or variant, and a small molecule; or combinations thereof. In one embodiment, the molecule comprises a biomolecule. The molecule may be a sensor molecule, such as a biosensor molecule. In one embodiment, the molecule may comprise an enzyme and/or an antibody, antibody fragment, or mimetic thereof.

Advantageously, the gel may be functionalised with molecules that can be, for example, sensor molecules, where the gel can be used as a sensor device.

In one embodiment, the molecule, such as the bioactive molecule, may not be a small molecule (for example, a small molecule may comprise an organic molecule of less than 900 Da). In an alternative embodiment, the molecule is a small molecule.

The organic molecule may comprise a protein, such as a globular protein, or a peptide. The protein may comprise a protein selected from the group comprising BMP, such as BMP-2, Avidin, Streptavidin, Casein and IgG, or combinations thereof.

The molecule, such as the organic molecule, may be a drug, a cell, signalling molecule, such as a growth factor, or any other suitable active agent. For example, the molecule, such as the organic molecule, may comprise amino acids, peptides, proteins, sugars, antibodies, nucleic acid, antibiotics, antimycotics, growth factors, nutrients, enzymes, hormones, steroids, synthetic material, adhesion molecules, colourants/dyes (which may be used for identification), radioisotopes (which may be for X-ray detection and/or monitoring of degradation), and other suitable constituents, or combinations thereof. The organic molecule may comprise an osteogenic agent.

The molecule, such as the organic molecule, may comprise or consist of any of the group comprising epidermal growth factor, platelet derived growth factor, basic fibroblast growth factor, vascular endothelial growth factor, insulin-like growth factor, nerve growth factor, hepatocyte growth factor, transforming growth factors and other bone morphogenic proteins, cytokines including interferons, interleukins, monocyte chemotactic protein-1 (MCP-I), oestrogen, testosterone, kinases, chemokinases, glucose or other sugars, amino acids, calcification factors, dopamine, amine-rich oligopeptides, such as heparin binding domains found in adhesion proteins such as fibronectin and laminin, other amines, tamoxifen, cis-platin, peptides and certain toxoids. Additionally, drugs (including statins and NSAIDs), hormones, enzymes, nutrients or other therapeutic agents or factors or mixtures thereof may be included. The active agent may comprise BMP (bone morphogenic protein), such as BMP2. The active agent may comprise VEGF. The active agent may comprise or consist of any of the group comprising angiopoietin 1, angiopoietin 2, BMP7, erythropoietin, IGF 1, PDGF-AB (or —BB), TGF-α, TGF-β. FGFs; PTHrp, PTH, wnt proteins and other growth regulatory factors; or combinations thereof.

The active agent may be heat sensitive and/or pH sensitive. The active agent may be labile, degraded, inactivated, or denatured at temperatures above at least about 30° C. The active agent may be labile, degraded, inactivated, or denatured at temperatures above at least about 50° C. The active agent may be labile, degraded, inactivated, or denatured at temperatures above at least about 70° C. The active agent may be labile, degraded, inactivated, or denatured at temperatures above at least about 100° C. The active agent may be labile, degraded, inactivated, or denatured at temperatures above at least about 150° C. The active agent may be labile, degraded, inactivated, or denatured at a pH<6. The active agent may be labile, degraded, inactivated, or denatured at a pH>8.

In one embodiment, the organic molecule is BMP. The BMP may be BMP-2 or BMP-7. The BMP may be selected from any of the group comprising BMP-2, BMP-3, BMP-4, BMP-6, BMP-7 (OP-1), and BMP-8, or combinations thereof. In one embodiment the BMP is BMP-2.

In an embodiment wherein the organic molecule comprises a protein, the protein may be between 14 and 250 kDa. In an embodiment wherein the organic molecule comprises a protein, the protein may be between 14 and 200 kDa. In another embodiment, the protein may be between about 14 and about 100 kDa. In another embodiment, the protein may be about 19, 26, 32, 60, 66.5 or 150 kDa.

The organic molecule may comprise nucleic acid. The nucleic acid may comprise double stranded nucleic acid and/or single stranded nucleic acid.

In one embodiment, the organic molecule for loading is different to the protein provided in the aqueous assembly solution.

The inorganic molecule may comprise or consist of a non-steroidal anti-inflammatory drug (NSAID). The inorganic molecule may comprise or consist of ibuprofen.

Combinations of different molecules, such as organic molecules and/or inorganic molecules, may be provided. For example, two or more different species of molecules, such as organic and/or inorganic molecule may be loaded into the clay-nanoparticle gel, for example two or more different protein types. In another example, two or more different species of molecules, such as organic and/or inorganic molecule may be loaded into the gel, for example two or more different protein types. In another embodiment, three or more different species of molecules, such as organic and/or inorganic molecules, may be loaded into the clay-nanoparticle gel, for example three or more different protein types. In another embodiment, three or more different species of molecules, such as organic and/or inorganic molecules, may be loaded into the gel, for example three or more different protein types. In one embodiment, an organic molecule and an inorganic molecule are loaded into the gel, such as BMP2 and ibuprofen.

The molecule, such as the organic molecule, may be labelled, such as dye or fluorescent dye labelled. A different label can be used for each species of organic molecule loaded into the clay nanoparticle gel. Labelling the molecule, such as the organic molecule, can aid in tracking the location of the molecule layers within the structured/spatially loaded clay nanoparticle gel.

Any one of the molecules to be loaded/spatially structured in the gel may also be provided in the colloidal solution prior to assembly of the gel, such that they are present and distributed throughout the gel (i.e. not structured/layered therein).

Molecule Solvent

The aqueous loading solution of the molecules to be loaded (e.g. organic molecules) may comprise water. In one embodiment the aqueous loading solution of the molecules to be loaded (e.g. organic molecules) comprises a buffer solution. The buffer may be DPBS. In one embodiment, the molecules, such as organic molecules, may be provided at a concentration of between about 1.5 µM and about 6.3 µM. In another embodiment, the molecules, such as organic molecules, may be provided at a concentration of between about 1.56 µM and about 6.25 µM.

The skilled person will recognise that the concentration of the molecules to be loaded (e.g. the organic molecule) provided in the aqueous loading solution may be proportionally dependent on the intended scaffold size. For example, for 1 ml of gel (e.g. clay-nanoparticle gel) a concentration of 1 mg/ml of molecule (e.g. organic molecule) may be provided. For 200 µl of gel (e.g. clay-nanoparticle gel) a concentration of 200 µg/ml of the molecule (e.g. organic molecule) may be provided. The skilled person will also recognise that the higher the concentration of molecules (e.g. organic molecules), the greater the proportion that will be loaded in a defined timeframe, thus an increased concentration of molecules (e.g. organic molecules) may reduce the loading timeframe and vice versa. In addition, the skilled person will recognise that each protein has its own indications for optimum reconstitution. Solvents may be selected from the group comprising water and buffer, such as DPBS or InductOs™ buffer (dibotermin alfa, for example at 1.5 mg/ml).

Additional Components of Clay-Gel

The clay-nanoparticle gel may further comprise an excipient selected from the group consisting of pharmaceutically acceptable salts, polysaccharides, peptides, proteins, amino acids, synthetic polymers, natural polymers, and surfactants. In one embodiment, the clay-nanoparticle gel may further comprise one or more antibiotic(s). In another embodiment, the clay-nanoparticle gel may further comprise one or more different cell types. The cells may be mammalian, such as human cells. In one embodiment, the cells may comprise stem cells, such as multipotent or pluripotent stem cells. The stem cells may be adult stem cells (e.g. they may not be embryonic stem cells). In another embodiment, the cells may be chondrocytes or human bone marrow stromal cells, but not only musculoskeletal (e.g. Adipocytes). The gel, such as the clay-nanoparticle gel, may further comprise one or more bioactive small molecules (i.e. less than 900 Da). In one embodiment, the gel, such as the clay-nanoparticle gel, may further comprise one or more vitamins. The vitamins may comprise vitamin D and/or ascorbic acid (vitamin C).

Method Steps

Mixing Clay and Solution Steps

The step of providing a colloidal solution of clay-nanoparticles may comprise preparing the colloidal solution of clay-nanoparticles. Preparing the colloidal solution of clay-nanoparticles may comprise dispersing clay-nanoparticles with aqueous solution such as water or a buffer. The water may be deionized water. The water may be free of ions (e.g. ultrapure). In an embodiment wherein a polymer is provided, the polymer may be mixed with the clay-nanoparticles prior to mixing/dispersing in the aqueous solution or the polymer may be mixed with the colloidal solution of clay-nanoparticles.

The mixing may be at room temperature. The mixing may be at a temperature of about 25° C. The mixing may be at a temperature between about 4° C. and about 40° C. The mixing may be at a temperature between about 4° C. and about 35° C. The mixing may be at a temperature between about 4° C. and about 25° C. The mixing may be at a temperature between about 4° C. and about 80° C. The mixing may be at a temperature below 80° C. The mixing may be at a temperature below 70° C. The mixing may be at a temperature below 60° C. The mixing may be at a temperature below 50° C. The mixing may be at a temperature below 45° C. The mixing may be at a temperature below 40° C. The mixing may be at a temperature below 30° C. The mixing may be at a temperature of about 37° C. The skilled person will understand that mixing at higher temperatures could lead to water evaporation and in consequence an increase in the clay-nanoparticle gel concentration. It can also accelerate the gel aging.

In one embodiment, the mixing is at physiological pH. The mixing may be at neutral pH. The mixing may be at a pH of between about 5 and about 10. The mixing may be at a pH of between about 5 and about 9. The mixing may be at a pH of between about 6 and about 8. The mixing may be at a pH of between about 6.5 and about 8. The mixing may be at a pH of between about 6.8 and about 7.8. The mixing may be at a pH of between about 7 and about 7.5.

The clay-nanoparticle solution may be mixed with molecules (e.g. organic and inorganic)

Gel Assembly Steps

Addition of the colloidal solution of clay nanoparticles to an aqueous assembly solution comprising protein can lead to the assembly of the clay-nanoparticle gel comprising the protein. The colloidal solution of clay nanoparticles may be placed into the aqueous solution (also known as the assembly solution) containing proteins, for example using a micropipette or a syringe.

Cylinders, or other shapes of clay-nanoparticle gel can be made with a mould of any desirable shape. The colloidal solution of clay nanoparticles can be provided into the mould and allowed to set therein. The formed shape, such as a cylinder can be immersed in the aqueous solution. The barrel of a syringe may be used as a mould for cylinder-shaped clay-nanoparticle gels.

The clay-nanoparticle gel may be between about 4 nl and about 1 µl in volume. In another embodiment, the clay-nanoparticle gel may be between about 4 nl and about 5 ml in volume. In another embodiment, the clay-nanoparticle gel may be between about 3 µl and about 5 ml in volume.

In one embodiment, the clay-nanoparticle gels are provided as droplets between about 3 µl and about 20 µl in volume. The skilled person will recognise that a 5 µl droplet would provide a 5 $mm^3$ volume clay-nanoparticle gel that is substantially spherical. A substantially spherical 5 $mm^3$ clay-nanoparticle gel would be about 2 mm in diameter.

In another embodiment, the clay-nanoparticle gels are provided as microdroplets between about 4 nl and about 1 µl in volume. The skilled person will recognise that a 4 nl microdroplet would provide a $4*10^6$ $µm^3$ volume clay-nanoparticle gel that is substantially spherical. A substantially spherical $4*10^6$ $µm^3$ clay-nanoparticle would be about 200 µm in diameter. The skilled person will recognise that the gel can be assembled into a variety of shapes and sizes.

In another embodiment, the clay-nanoparticle gels are provided as cylinders between about 200 µl and about 5 ml in volume. The scaffold cylinders may be formed using a mould. In yet another embodiment, the clay-nanoparticle gels are provided as strings.

In one embodiment, the assembly (i.e. setting) of the clay-nanoparticle gel is at a temperature of between about 4° C. and about 37° C. In one embodiment, the assembly (i.e. setting) of the clay-nanoparticle gel is at a temperature of about 4° C. The assembly may be at a temperature of 4° C. or above. In one embodiment, the assembly (i.e. setting) of the clay-nanoparticle gel is at a temperature of below about 37° C. The assembly may be at a temperature between about 4° C. and about 35° C. The assembly may be at a temperature between about 4° C. and about 30° C. The assembly may be at a temperature between about 4° C. and about 25° C. The assembly may be at a temperature below 40° C. The assembly may be at a temperature below 30° C. The assembly may be at a temperature below 20° C.

Advantageously, the assembly temperature can alter absorption and spatial localisation of loaded organic molecules in the clay-nanoparticle gel, such that it offers some control. At 4° C. there is some degree of order to the absorption and spatial localisation of the organic molecule (localised into bands), whereas at 37° C. the molecule to be loaded, such as the organic molecule, may be absorbed into the core but without any visible organisation. These differences between assembly can be preserved regardless of the loading temperature (e.g. see FIG. 17).

The assembly may be at a pH of between about 6 and 9. The assembly may be at a physiological pH. The assembly may be at a neutral pH. The assembly may be at a pH of between about 6.5 and 8. The assembly may be at a pH of between about 6 and 7.5. The assembly may be at a pH of between about 6.8 and 7.8. The assembly may be at a pH of between about 7 and 7.5.

Once the clay nanoparticle solution is dropped for assembly into the aqueous assembly solution comprising protein, the resulting clay nanoparticle gel may be left in the solution and allowed to stabilise. The clay nanoparticle gel may be left in the assembly solution for at least about 20, 30, 40 or 50 minutes. In one embodiment, the clay nanoparticle gel may be left in the solution for about 50 minutes. In another embodiment the clay nanoparticle gel may be left in assembly solution for 1, 2, 3, 4, 5, 6, 7, 8, 9 or 10 hours, or more. The clay nanoparticle gel may be left in assembly solution for at least 24 hours. The clay nanoparticle gel may be left in solution for at least 2 days. In another embodiment, the clay nanoparticle gel may be left in assembly solution for at least 3 days. The skilled person will recognise that the assembly time can be varied to control the formation of rings. For example the assembly time may depend on the protein concentration, type of protein, the presence of ions, or Laponite® volume used. For example: for cylinders of 1 ml it could take about 3 days to form rings with a distance of ~500 µm from the surface. For cylinders of 0.4 mm in diameter it may take about 10 hours; and for strings of 200 µm diameter it may be 30 min. The clay nanoparticle gel may be left in the solution for between about 20 minutes and about 4 days.

The mixing and/or setting may not generate side products, such as toxic side products. "Toxic side product" as used herein is understood to be a substance, which would inhibit, destabilise or negatively interfere with a biological system, cell, or biological pathway. Advantageously, the clay nanoparticle material provides a simple gelation with no chemical reaction required to form the hydrogel from the clay nanoparticle material or clay nanoparticle material mixed with polymers, which leaves no side products that may be toxic or inhibitive.

Rinsing Steps

The method may further comprise the step of rinsing the clay-nanoparticle gel in an aqueous solution (herein referred to as the "rinse solution") after its assembly, for example to remove excess protein. The rinsing step is advantageous for the clay-nanoparticle gel stability during storage, and it can assist with quantifying the loading of the organic molecule. The rinsing may be prior to loading the organic molecule into the clay-nanoparticle gel. The rinsing may be prior to any loading of an organic molecule into the clay-nanoparticle gel. In one embodiment, rinsing may be provided prior each loading of organic molecules into the clay-nanoparticle gel.

The rinsing may comprise running the rinse solution over the clay-nanoparticle gel or suspending/dipping the clay-nanoparticle gel into the rinse solution. The rinsing may be for a period of between about 5 seconds to 60 seconds, or more. The rinsing may be for a period of at least 10 seconds. The rinsing may be for a period of at least 20 seconds. The rinsing may be for a period of at least 30 seconds. The rinsing may be for a period of about 30 seconds. In another embodiment, the rinsing may be for a period of at least about 1, 2, 3, 4, or 5 hours, or more. The rinsing may be for a period of 24 hours, or more.

The rinsing may be accompanied by agitation. The agitation may be orbital agitation. The orbital agitation may be at about 50 rpm to about 400 rpm.

The rinse solution may comprise or consist of water. The rinse solution may comprise an aqueous buffer, such as a phosphate buffer, or salt solution. In one embodiment, the rinse solution is Dulbecco's Phosphate Buffer Saline (DPBS). In another embodiment, the rinse solution is Dulbecco's Modified Eagle Medium (DMEM). In another embodiment, the rinse solution is alpha Modification of Eagles Medium (aMEM). In another embodiment, the rinse solution is Medium 199 (M199). In another embodiment, the rinse solution is Earle's Balanced Salt Solution (EBSS). In another embodiment, the rinse solution is Hank's Balanced Salt Solution (HBSS). In another embodiment, the rinse solution is a HEPES solution. In another embodiment, the rinse solution may comprise sodium chloride. In another embodiment, the rinse solution may comprise potassium chloride. In another embodiment, the rinse solution may comprise sodium bicarbonate. In another embodiment, the rinse solution is an ionic solution, free of any organic molecules.

Loading Steps

In one embodiment, the loading of the clay nanoparticle gel with the organic or inorganic molecule comprises immersing the clay nanoparticle gel in a loading solution or suspension of the organic molecule. Immersion may be achieved by suspending or rinsing the clay-nanoparticle gel in the loading solution or suspension of organic molecule. The loading may be for a period of at least about 20, 30, 40 or 50 minutes. The loading may be for a period of about 1 hour. The skilled person would understand that the loading time is dependent on both the size of the scaffold, protein concentration, properties of the molecule to be loaded (e.g. size), salt content of the loading buffer (i.e. increased concentrations reduces loading time) and depth of loading required.

The protein to be loaded may be dissolved in DPBS. The DPBS may be replaced by buffers such as DMEM, aMEM, M199, or by salt solutions selected from the group comprising DPBS Ca and Mg, EBSS, HBSS, HEPES, sodium chloride, potassium chloride and sodium bicarbonate, or combinations thereof. The skilled person will recognise that there are many appropriate cell culture media, or balanced salt solutions that could be used.

In one embodiment, the loading of the clay nanoparticle gel is at a temperature of between about 4° C. and about 37° C. In one embodiment, the loading of the clay nanoparticle gel is at a temperature of about 4° C. In one embodiment, the loading of the clay nanoparticle gel is at a temperature of below about 37° C. The loading may be at a temperature between about 4° C. and about 35° C. The loading may be at a temperature between about 4° C. and about 30° C. The loading may be at a temperature between about 4° C. and about 25° C. The loading may be at a temperature below 40° C. The loading may be at a temperature below 30° C. The loading may be at a temperature below 20° C. In one embodiment, the loading of the clay nanoparticle gel is at a temperature of about 4° C.

Second Loading

Figure 18:
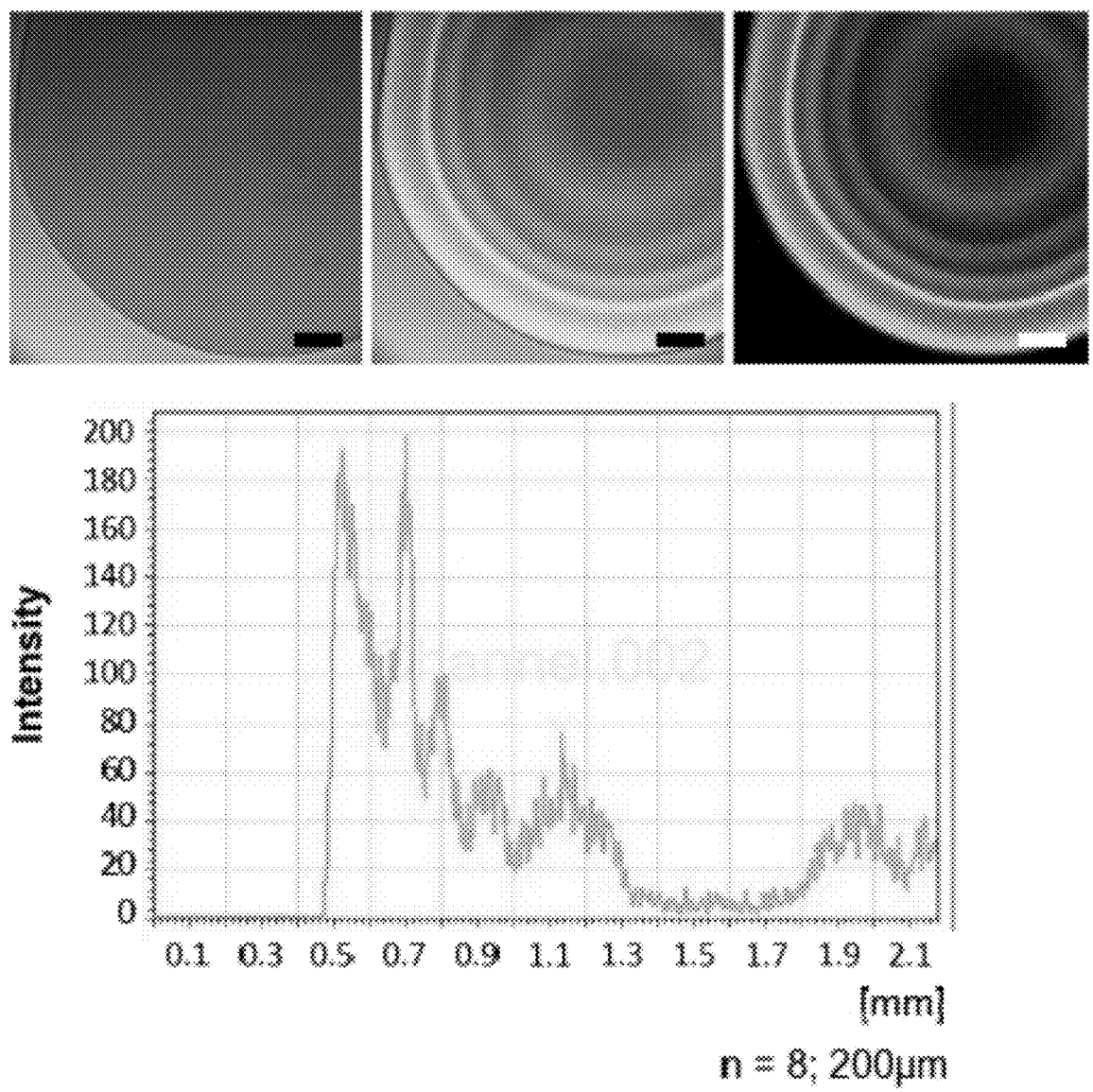

One or more subsequent molecules to be loaded (e.g. organic or inorganic molecules) may be loaded into the clay-nanoparticle gel after loading of the first molecules to be loaded (e.g. organic molecules), for example a second, third or fourth loading, or more (e.g. see FIG. 18). The subsequent molecule(s) (e.g. organic molecule(s)) may be the same molecule (e.g. organic molecule) or a different molecule (e.g. different organic molecule) relative to the prior loaded molecule (e.g. organic molecule). The subsequently loaded molecule(s) (e.g. organic molecule(s)) may be spatially separated from the first loaded, or other subsequently loaded, molecule(s) (e.g. organic molecule(s)), i.e. occupying a different depth layer within the clay-nanoparticle gel. The separation may be by a layer of reacted clay-nanoparticle gel (for example which formed by the adsorption and saturation of the clay nanoparticles with proteins during the assembly step), that has no loaded molecule (e.g. organic molecule) (i.e. a gap between layers), or a layer of a different molecule (e.g. organic molecule) therebetween. The separation may be such that that the loaded molecule (e.g. organic molecule) and subsequent loaded molecules are in distinct layers relative to each other. In another embodiment, the layers of different molecules (e.g. organic molecules) may fully or partially overlap, such that there is a transition from one molecule (e.g. organic molecule) to another towards the core of the clay-nanoparticle gel. The clay-nanoparticle gel may be rinsed (as described herein) between different/subsequent loadings.

The second/subsequent loading may be by immersing the clay-nanoparticle gel into different loading solutions, or adding additional molecules (e.g. organic or inorganic molecules) to be loaded to the same loading solution, for example at different time points.

Other Method Steps

The assembly and loading steps may be carried out in combination as one step. In particular, when immersing the colloidal solution of clay nanoparticles into an aqueous assembly solution, the aqueous assembly solution may also comprise a molecule (e.g. an organic molecule), such as a protein, to be loaded into the resulting clay-nanoparticle gel. The assembly and loading solutions may be the same or otherwise combined. Combining the two steps may result in an alteration of the final loaded scaffold structure (e.g. see FIG. 16).

Therefore, according to another aspect of the invention, there is provided a method for forming a clay-nanoparticle gel comprising one or more spatially structured molecule species (such as an organic molecule species), the method comprising:

providing a colloidal solution of clay nanoparticles;

immersing the colloidal solution of clay nanoparticles into an aqueous solution and allowing the colloidal solution of clay nanoparticles to set into a gel within the aqueous solution, wherein a protein is provided in the aqueous solution prior to, concurrently, or after the immersion of the colloidal solution of clay nanoparticles into the aqueous solution; and wherein molecules (e.g. organic molecules) are provided in the aqueous solution prior to, concurrently, or after the immersion of the colloidal solution of clay nanoparticles into the aqueous solution, thereby forming a clay-nanoparticle gel comprising the protein and the molecules (e.g. organic molecules) spatially structured therein.

In one embodiment, the protein is provided in the aqueous solution prior to immersion of the colloidal solution of clay nanoparticles. Additionally, the molecules (e.g. organic molecules) may be provided in the aqueous solution prior to immersion of the colloidal solution of clay nanoparticles. Alternatively, the molecules (e.g. organic molecules) may be provided in the aqueous solution after immersion of the colloidal solution of clay nanoparticles and optionally after the protein.

The clay-nanoparticle gel may be structured with the molecule in a plurality of rings. The plurality of rings may form a gradient concentration and/or amount of the molecule. In one embodiment, the clay-nanoparticle gel is structured by a plurality of rings of the molecule and the rings may be of different concentration or amount of the structured/layered molecule. The concentration and/or amount of the structured/layered molecule in each ring may be provided by adjusting the concentration of the molecule in the loading solution and/or incubation time of the gel in the loading solution. For example, the plurality of rings may form a gradient of concentrations of the structured/loaded molecule. The plurality of rings may comprise different molecules or different combinations of molecules. In another embodiment, the molecule may be structured to increase or decrease in concentration across the gel, which may be gradual.

Advantageously, providing a punctuated or gradual change in concentration of the molecule(s) across the clay-nanoparticle gel can all the use of the clay-nanoparticle gel to recapitulate development and tissue repair processes.

The clay nanoparticle solution may be sterilised prior to assembly of the clay-nanoparticle gel. The clay nanoparticle solution may be autoclaved, for example at 121° C. and 15 psi for 30 minutes. The skilled person may use alternative autoclaving conditions that result in sterility. In another embodiment, the clay nanoparticles may be sterilised by UV irradiation. For example, the clay nanoparticle powder may be sterilised by UV irradiation prior to preparation of the clay nanoparticle solution.

The loaded and/or un-loaded clay-nanoparticle gel may be stored after their production, and before their use. The loaded clay-nanoparticle gel scaffolds may be stored for about 6 months, or more, before use. The loaded clay-nanoparticle gel scaffolds may be stored for about 5 months, or more, before use. The loaded clay-nanoparticle gel scaffolds may be stored for about 4 months, or more, before use. The un-loaded clay-nanoparticle gel scaffolds may be stored for about 3 weeks, or more, before loading. The loaded and un-loaded clay-nanoparticle gel scaffolds may be stored in a buffer or salt solution, such as DPBS, saline solution, DMEM, aMEM, M199, or salt solutions from the group comprising DPBS Ca and Mg, EBSS, HBSS, HEPES, sodium chloride, potassium chloride and sodium bicarbonate. The skilled person will recognise that there are many appropriate solutions that could be used depending on the clay-nanoparticle gel composition and application. The storage may be at about 4° C.

Other Aspects

According to another aspect of the present invention, there is provided a clay-nanoparticle gel comprising protein, which is made in accordance with the method of the invention herein.

According to another aspect of the present invention, there is provided a structured clay-nanoparticle gel comprising protein and one or more structured molecules (such as organic molecules), which is made in accordance with the method of the invention herein.

According to another aspect of the present invention, there is provided a clay-nanoparticle gel comprising protein and one or more spatially structured molecule (such as organic molecule) species.

According to another aspect of the present invention, there is provided a composition comprising a plurality of clay-nanoparticle gels, wherein the clay-nanoparticle gels comprise protein and one or more spatially structured molecule (such as organic molecule) species.

The composition may be a pharmaceutical composition (i.e. a pharmaceutically acceptable composition). The composition may further comprise a carrier solution, for example to store or deliver the clay-nanoparticle gels into an implant site. The carrier solution may comprise the patient's blood, or fractions thereof. The carrier solution may comprise the patient's plasma rich platelets.

Multiple clay-nanoparticle gels, such as spheres, may be provided in a retainer. The retainer may be a gel or a porous receptacle, such as a porous tube.

Advantageously a retainer would contain multiple clay-nanoparticle gels in place at the site of tissue repair, and work as a spacer to prevent the invasion of soft tissue while the tissue, such as bone, forms.

According to another aspect of the present invention, there is provided the structured clay-nanoparticle gel or composition according to invention for use as a medicament.

According to another aspect of the present invention, there is provided a method of treatment of a subject, the method comprising the administration of the structured clay-nanoparticle gel or composition according to the invention to the subject, wherein the treatment is for treatment or prevention of a disease, tissue repair or tissue replacement.

The structured clay-nanoparticle gel according to invention may be for use in treatment or prevention of a disease, tissue repair or tissue replacement. In one embodiment, the treatment is bone repair in a subject. The use may be for tissue engineering, tissue repair, tissue support, tissue replacement, cavity filling, or drug delivery; or for substrate-mediated enzyme prodrug therapy.

In one embodiment, the subject is mammalian. The subject may be human.

In one embodiment, the structured clay-nanoparticle gels are provided in a resorbable tube for use in bone repair. The resorbable tube may be constructed from any suitable resorbable material. In one embodiment the resorbable material comprises about 82% Poly-L-Lactic Acid and about 18% Poly-Glycolic acid. In another embodiment the resorbable tube is constructed from sheets of LactoSorb®. In one example, for a femur shaft defect of 5 cm, the resorbable tube shall be of about 3 cm diameter and about 6 cm length. The skilled person will recognise that about 100 spherical 5 µl clay-nanoparticle gel scaffolds would be contained within the resorbable tube, wherein the clay-nanoparticle gel scaffolds comprise between about 0.5 and 1 µg/mm$^3$ BMP2. The skilled person will recognise that both the resorbable material and clay-nanoparticle gels can be provided as a plurality of shapes to suit the defect that is being treated.

According to another aspect of the present invention, there is provided the use of the structured clay-nanoparticle gel according to the invention as a model of developmental biology and cell growth factor interactions.

In an embodiment, wherein the structured clay-nanoparticle gel is a model of developmental biology and cell growth factor interactions, the structured clay-nanoparticle gel may comprise, and/or may be structurally loaded with a protein, such as a growth factor.

According to another aspect of the present invention, there is provided the use of the structured clay-nanoparticle gel according to the invention as a sensor device.

In an embodiment, wherein the structured clay-nanoparticle gel is a sensor device, the structured clay-nanoparticle gel may comprise, and/or may be structurally loaded with a sensor molecule, such as a biosensor molecule. The biosensor molecule may be an enzyme or a target-binding polypeptide, such as an antibody, or antibody fragment, or mimetic thereof.

The term "nanoparticle" is understood to mean a particle of the nanoscale, for example, with the largest dimension of less than 1000 nm. However, such term may be used interchangeably with the term "particle" where appropriate.

The term "species" in regard to a molecule species, is intended to refer to different molecules (such as organic or inorganic molecules). For example, a composition may comprise a plurality of molecules (e.g. organic or inorganic molecules), but they may be of the same molecule (e.g. same organic or inorganic molecule) (i.e. same species) or different molecule (e.g different organic or inorganic molecules), whereas a plurality of molecule (e.g. organic or inorganic molecule) species is intended to refer to a plurality of different molecules (e.g. organic or inorganic molecules). For example a composition with different molecule (e.g. organic molecule) species may comprise one or more molecules of a first protein and one or more molecules of a second different protein.

The term "spatially structured", used herein in relation to molecule (e.g. organic or inorganic molecule) species loaded into the clay nanoparticle gel, is intended to refer to the localisation of the molecule into distinct areas/zones of the clay nanoparticle gel, for example, defined concentric layers within a gel droplet, such that the organic molecules are not diffused.

The term "colloid" is understood to mean a heterogeneous mixture wherein the particles are spread evenly throughout the dispersion medium. The dispersion medium may be a solid, liquid or gas. In contrast to a suspension, the dispersed particles do not settle out upon standing and cannot be separated by filtration, but are larger than particles found in a solution.

The term clay-nanoparticle gel" is understood to mean the resulting product of the first aspect of the invention. Clay-nanoparticle gel may be used interchangeably with the term "scaffold" which is understood to mean the structure in which the proteins and molecules (such as organic molecules) of the invention are loaded.

The skilled person will understand that optional features of one embodiment or aspect of the invention may be applicable, where appropriate, to other embodiments or aspects of the invention.

Embodiments of the invention will now be described in more detail, by way of example only, with reference to the accompanying drawings.

FIG. 1 General protocol to make Clay-nanoparticle/protein scaffold. The Laponite® colloidal solution is placed in a protein solution to assemble the Laponite®/protein scaffold (1). Following this, the scaffold is rinsed to remove the excess of protein (2) to load the molecule of interest (3). Finally, it is rinsed (4) and stored (5).

Figure 2:
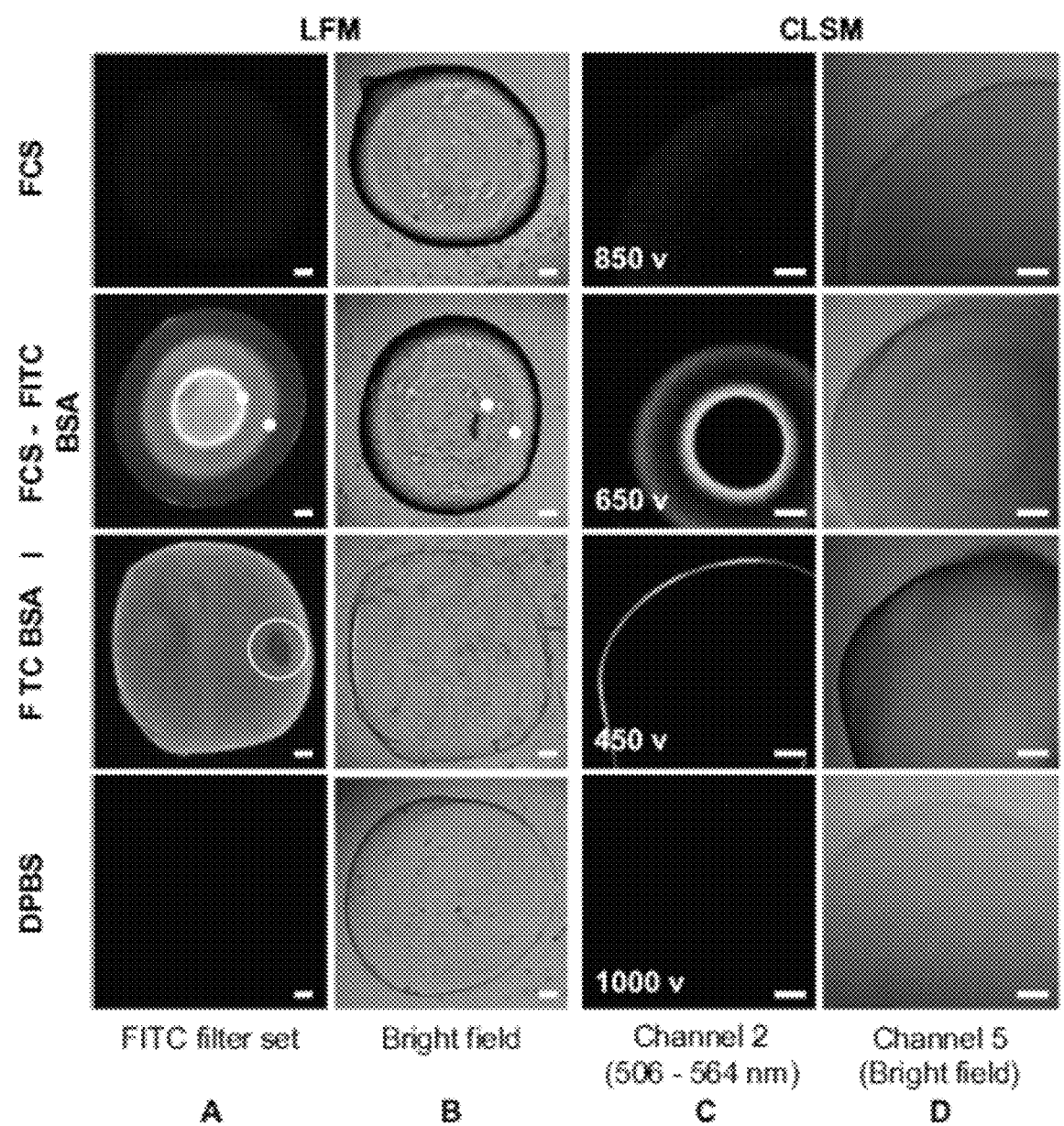
Figure 2:
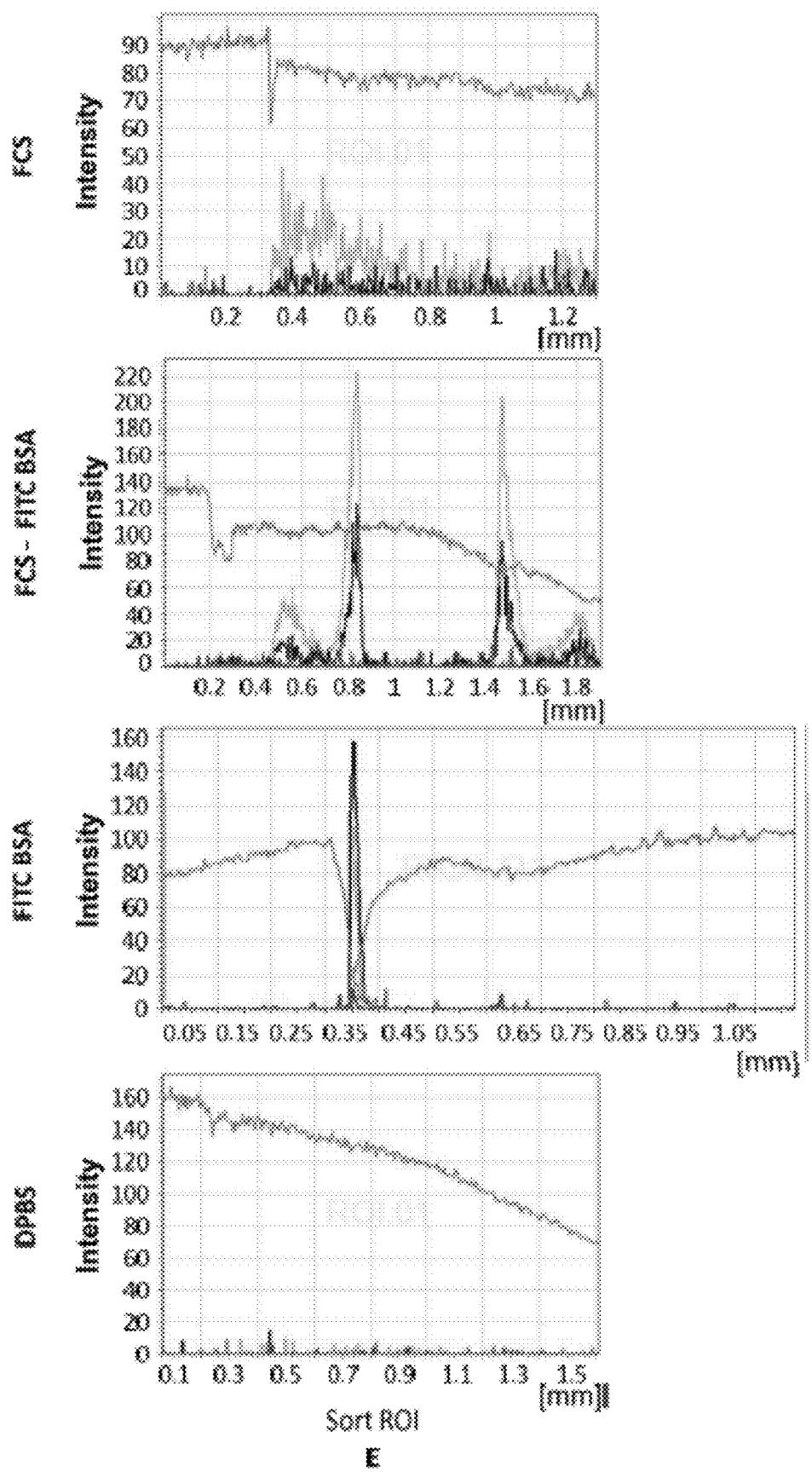
Figure 2:
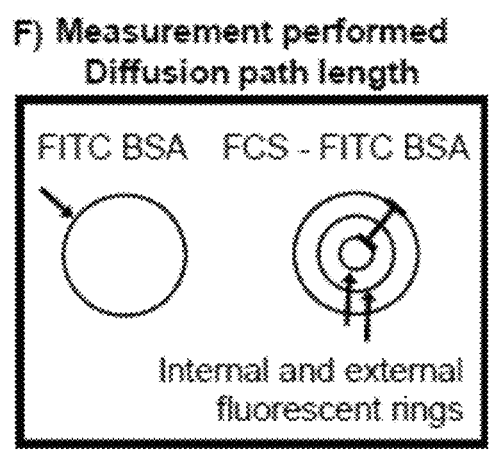
Figure 2:
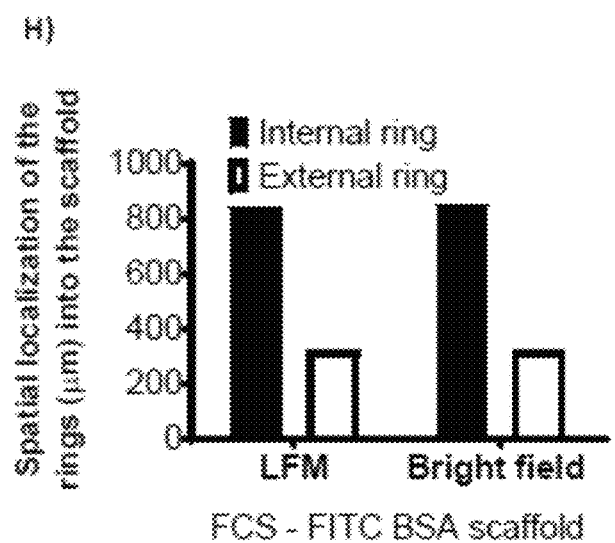
Figure 2:
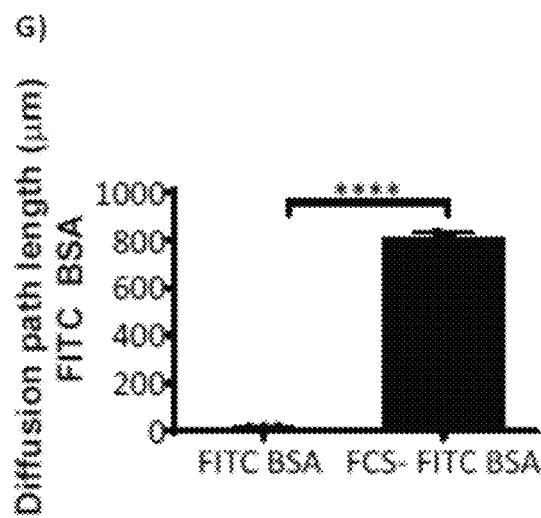
Figure 2:
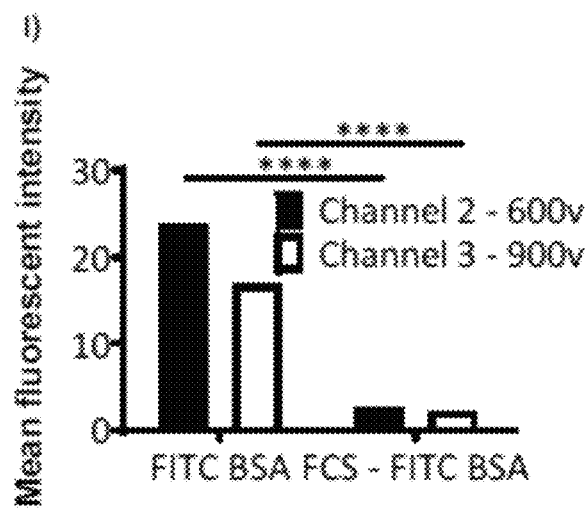

FIG. 2 Diffusion of FITC BSA facilitated by FCS. The CLSM images showed the diffusion and localization of FITC BSA into the scaffolds facilitated by FCS, when compared to the scaffolds assembled directly into FITC BSA (A-C), where the fluorescent proteins stayed next to the surface. The results were presented as the mean and standard deviation of triplicates. The scale bars correspond to 200 Due to large differences in fluorescent intensity different gain settings were used; these are indicated in the figure.

Figure 3:
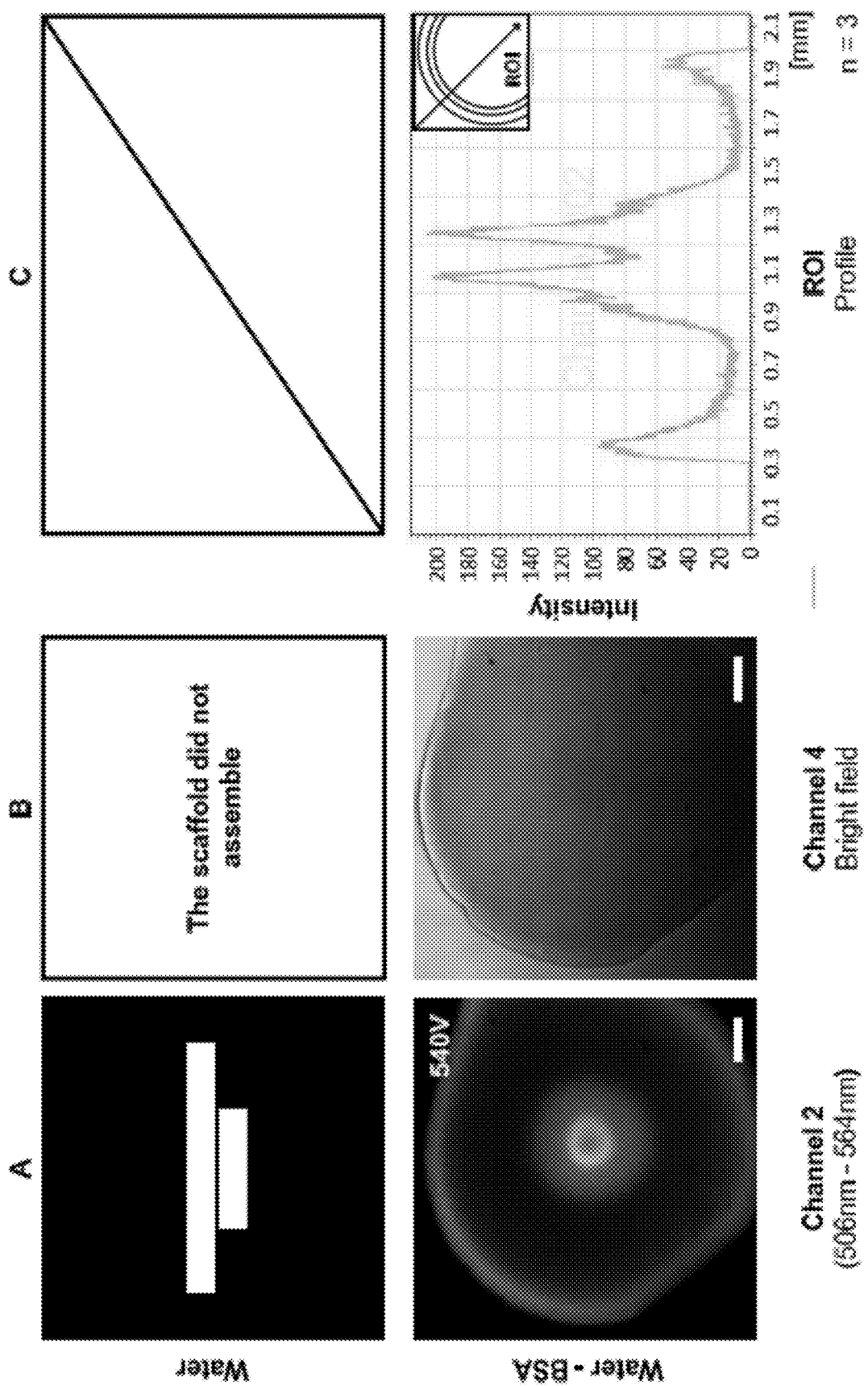
Figure 3:
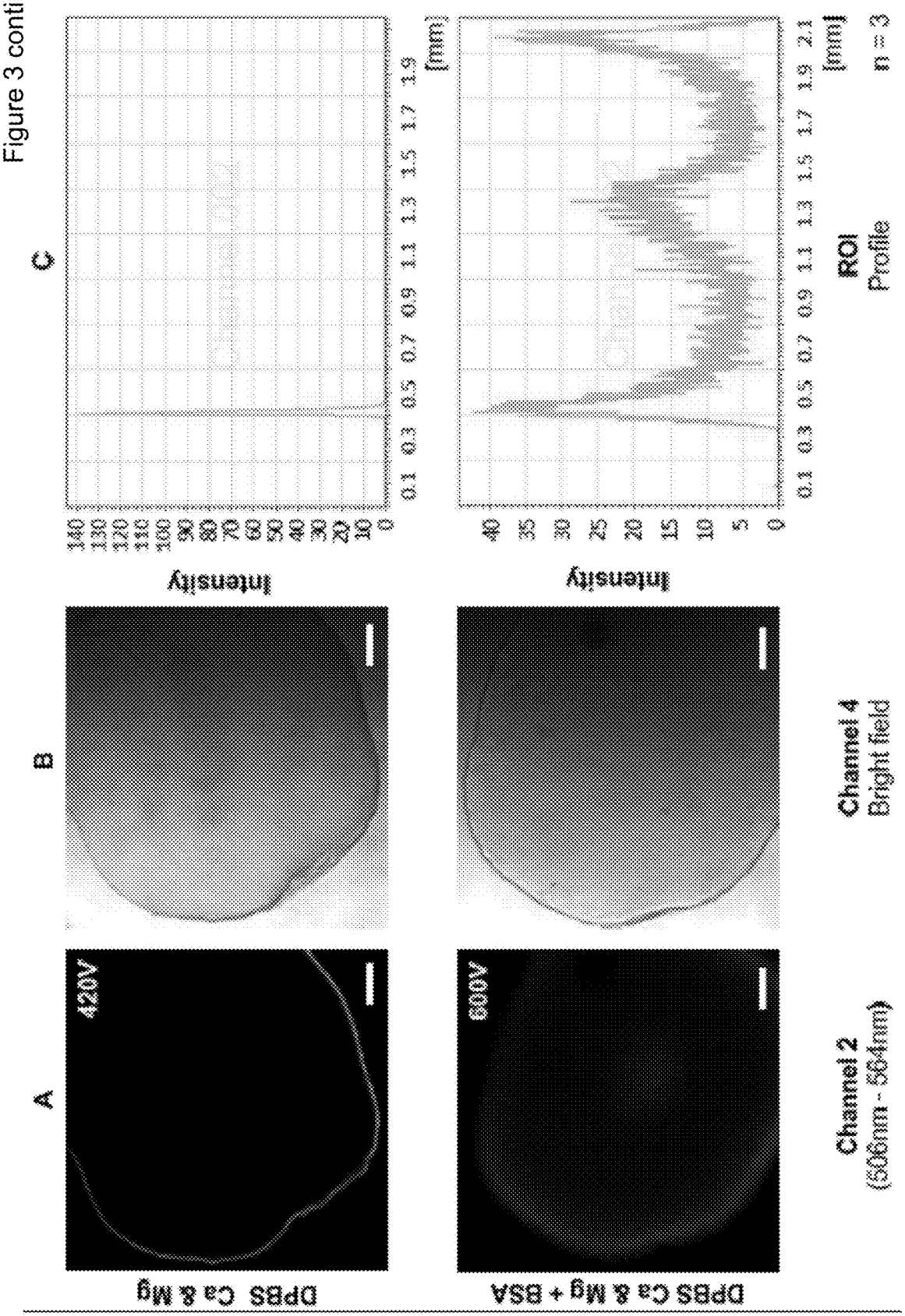

FIG. 3 Localization of FITC BSA into the Clay-nanoparticle/protein scaffold.

The CLSM images showed the diffusion and localization of FITC BSA into the scaffolds (column A). The images were presented with corresponding region of interest (ROI) (column C). The results indicate that a solution of BSA alone is sufficient to assemble the clay-protein scaffold. The data is representatives of n=3 and the scale bars correspond to 200 µm.

Figure 4:
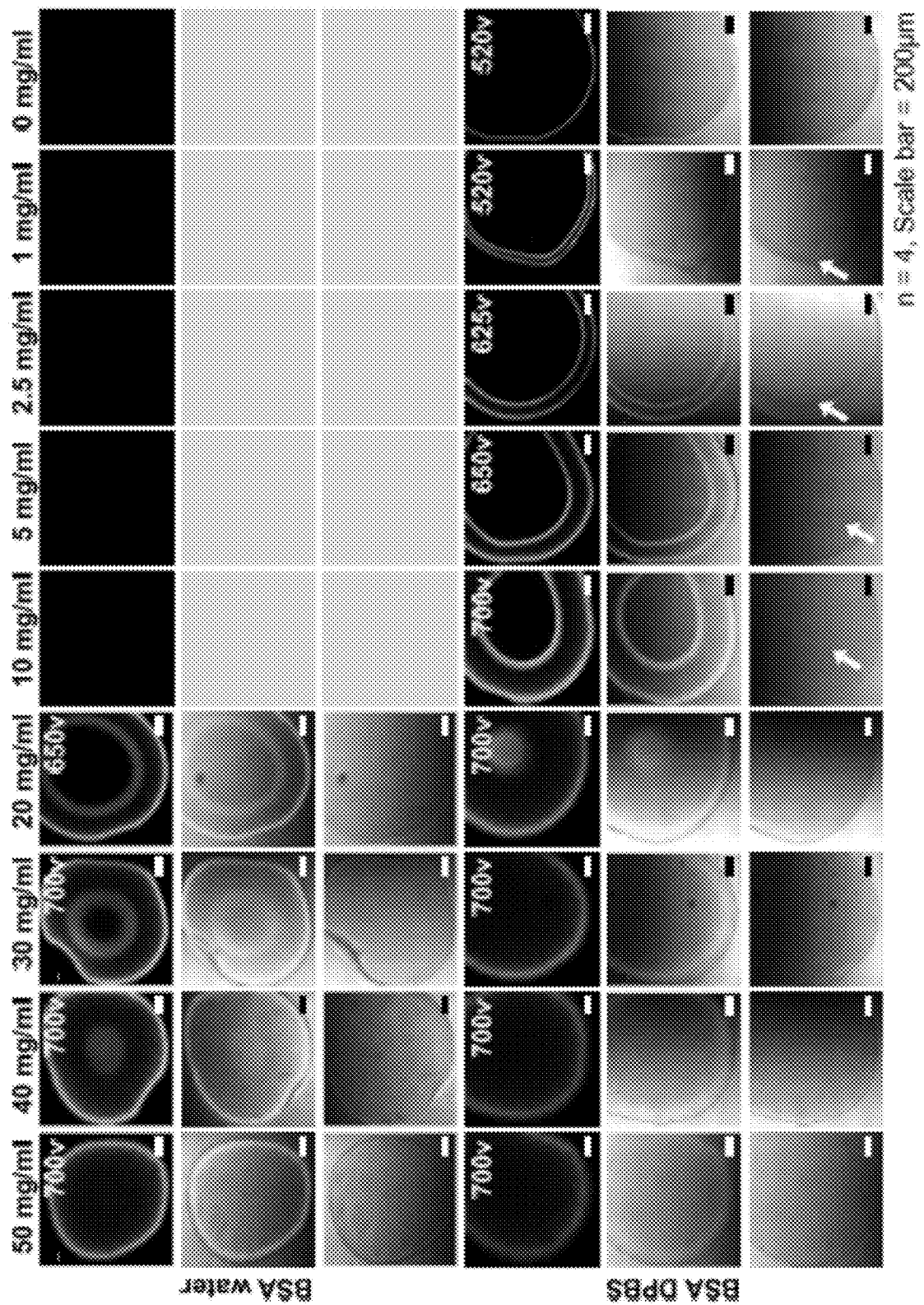

FIG. 4 Clay-nanoparticle/protein scaffold assembly as function BSA concentration. The CLSM images show that the clay-nanoparticle/protein scaffolds do not assemble under 20 mg/ml BSA water. All the scaffolds show a fluorescent ring near the surface except for the 0 mg/ml BSA DPBS that is at the surface. A second fluorescent ring can be observed near the core of the scaffolds assembled with 20-30 mg/ml BSA water and 1-20 mg/ml BSA DPBS. This ring localizes closer to the core as the protein concentration increases. The data is representative of n=4 and the scale bars to 200 µm.

Figure 5:
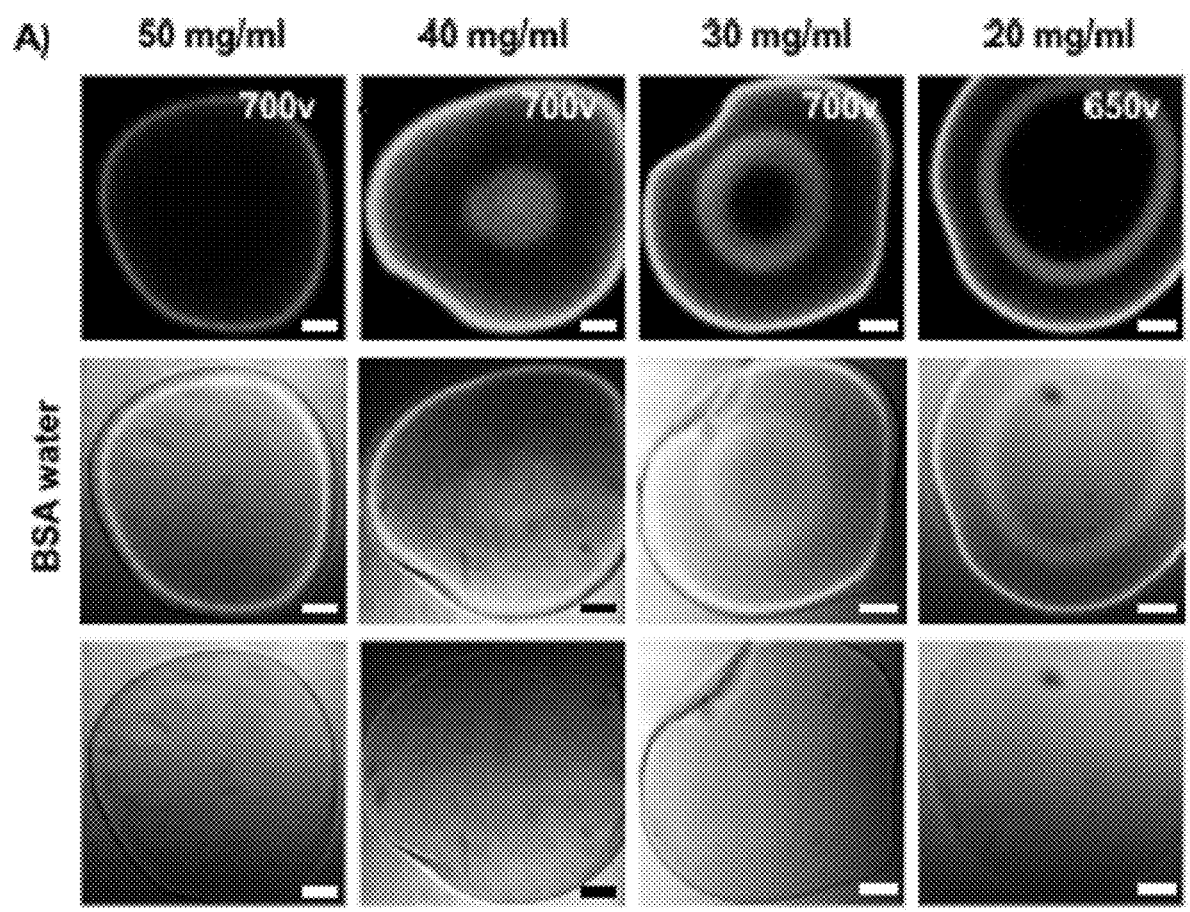
Figure 5:
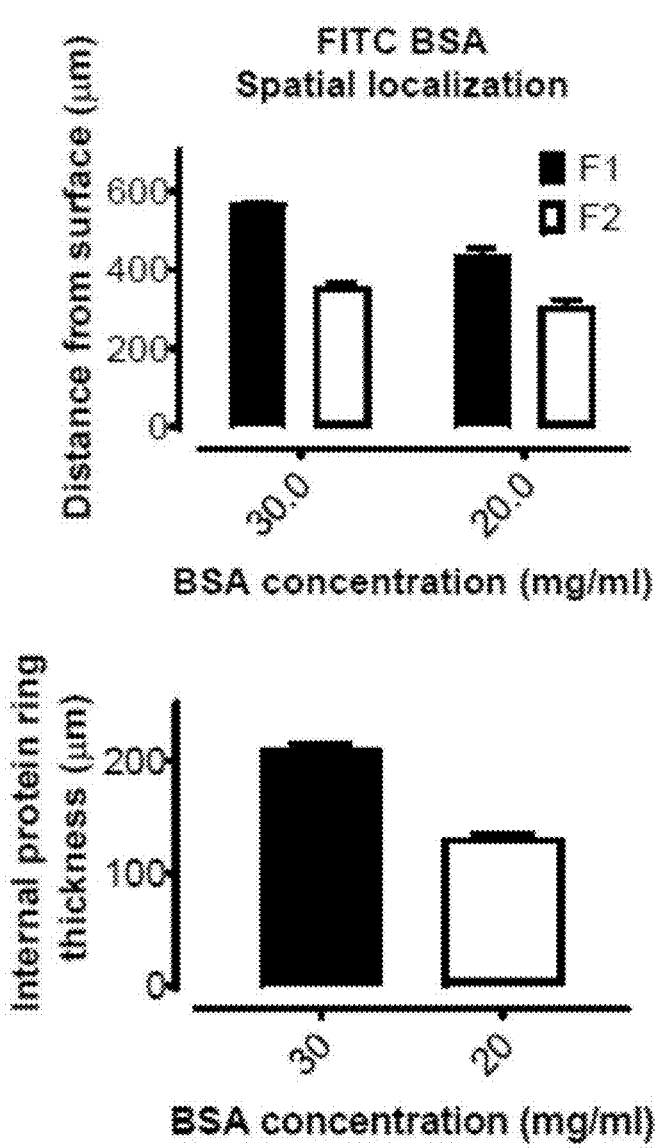
Figure 5:
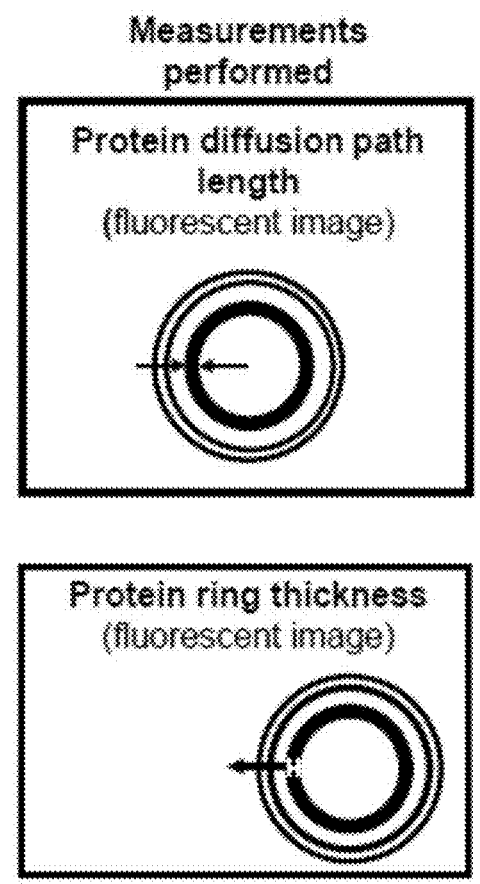

FIG. 5 Clay-nanoparticle/protein scaffolds assembled with BSA water. The fluorescent images show A) the localization of proteins in the core of the scaffolds assembled with 50-20 mg/ml. However, the internal fluorescent ring threshold is 20-30 mg/ml. B) It localizes closer to the core as the protein concentration increases. In addition, D) its thickness increases with the protein concentration. The data of 20 mg/ml and 30 mg/ml BSA water are representative of n=4 and 2 respectively. The scale bars represent 200 µm.

Figure 6:
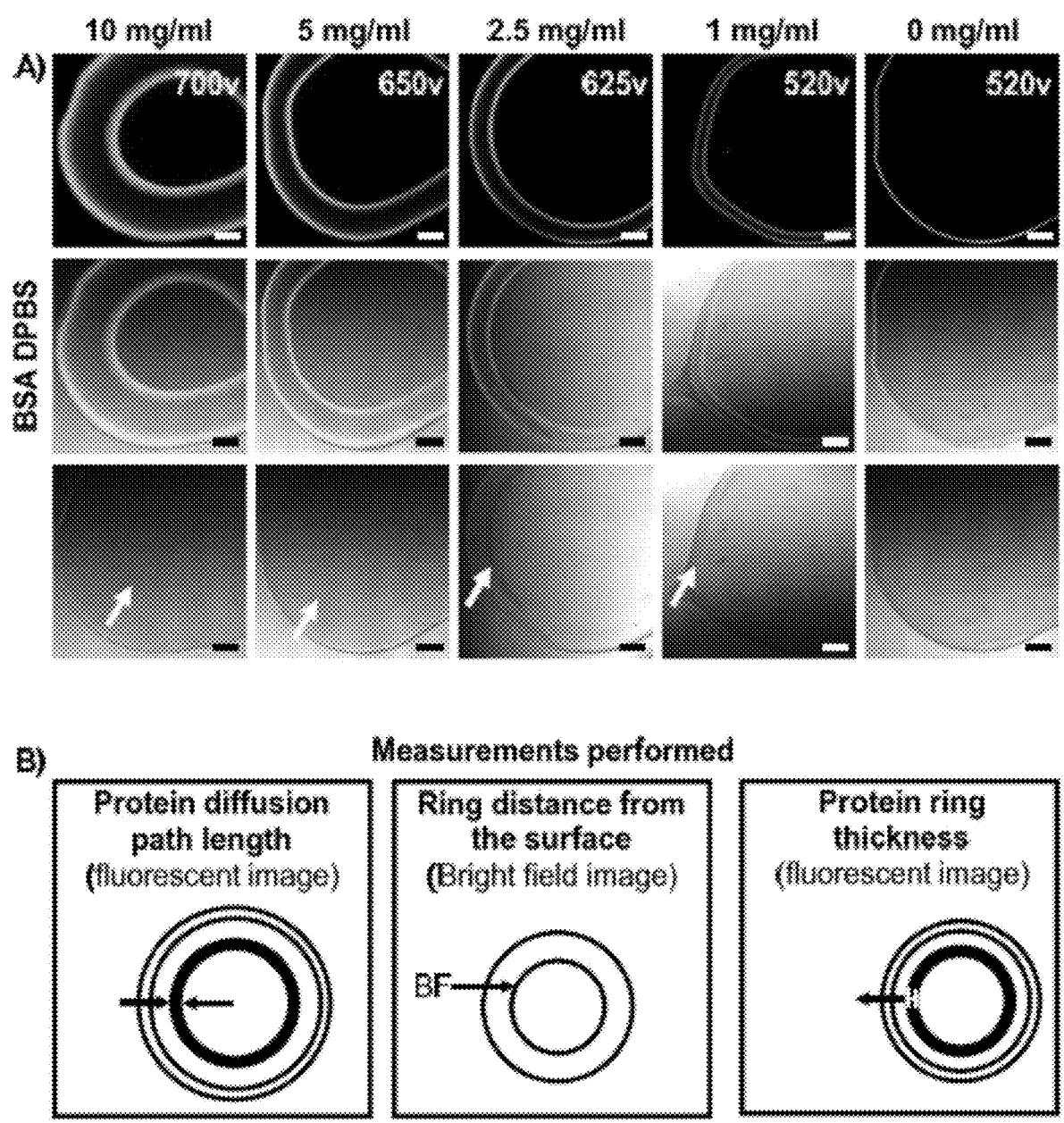
Figure 6:
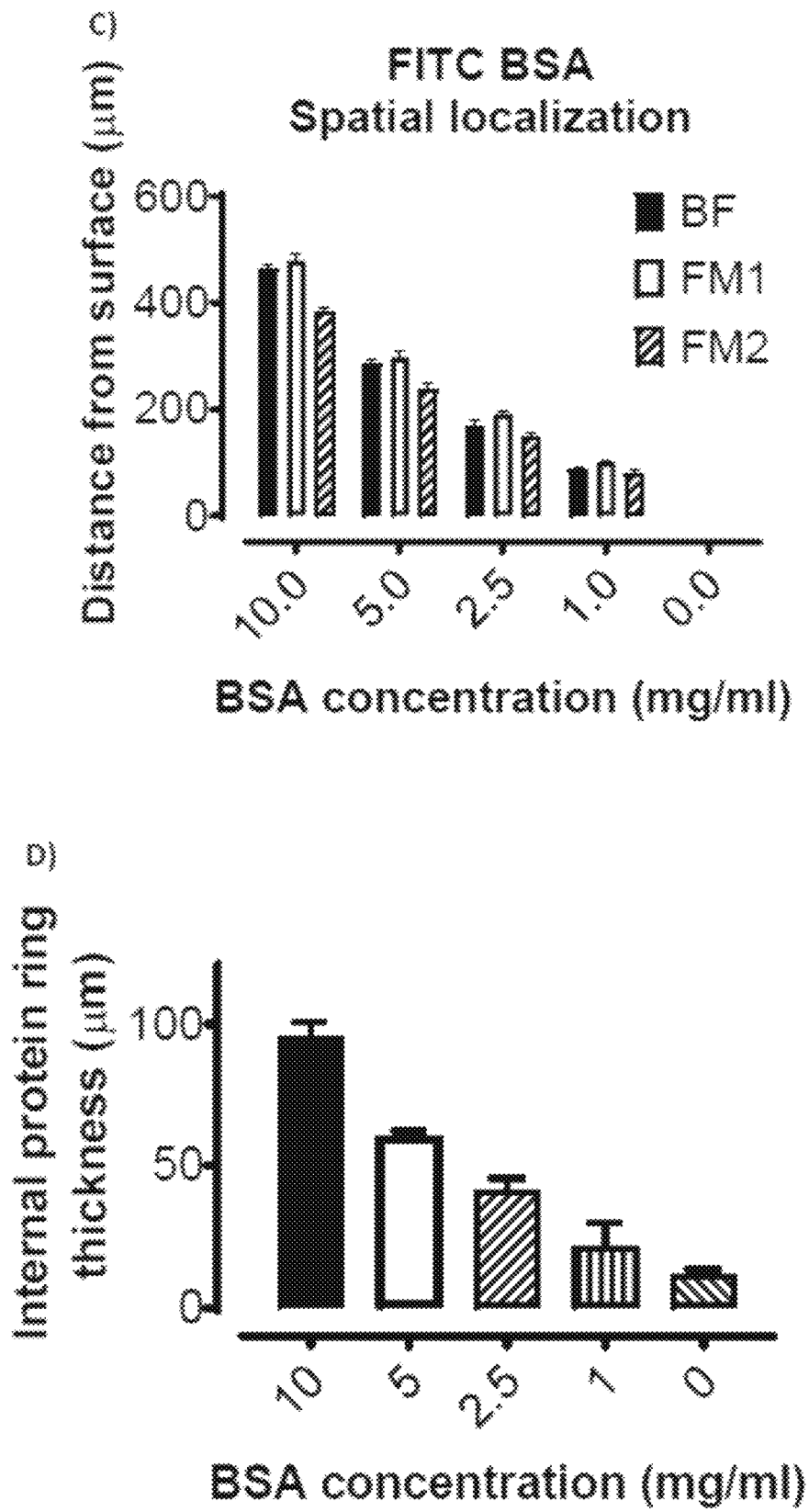

FIG. 6 Clay-nanoparticle/protein scaffolds assemble with BSA DPBS. The bright field images of the scaffolds assembled with 1-10 mg/ml BSA DPBS A) shows an internal ring that moves away from the core as the protein concentration decreases (arrow). B) & C) Measurements of the fluorescent and bright field images indicate that these rings are related to the fluorescent protein localization. D) The thickness of the internal fluorescent ring increases with the protein concentration. The data is representative of n=4 and the scale bars represent 200 µm.

Figure 7:
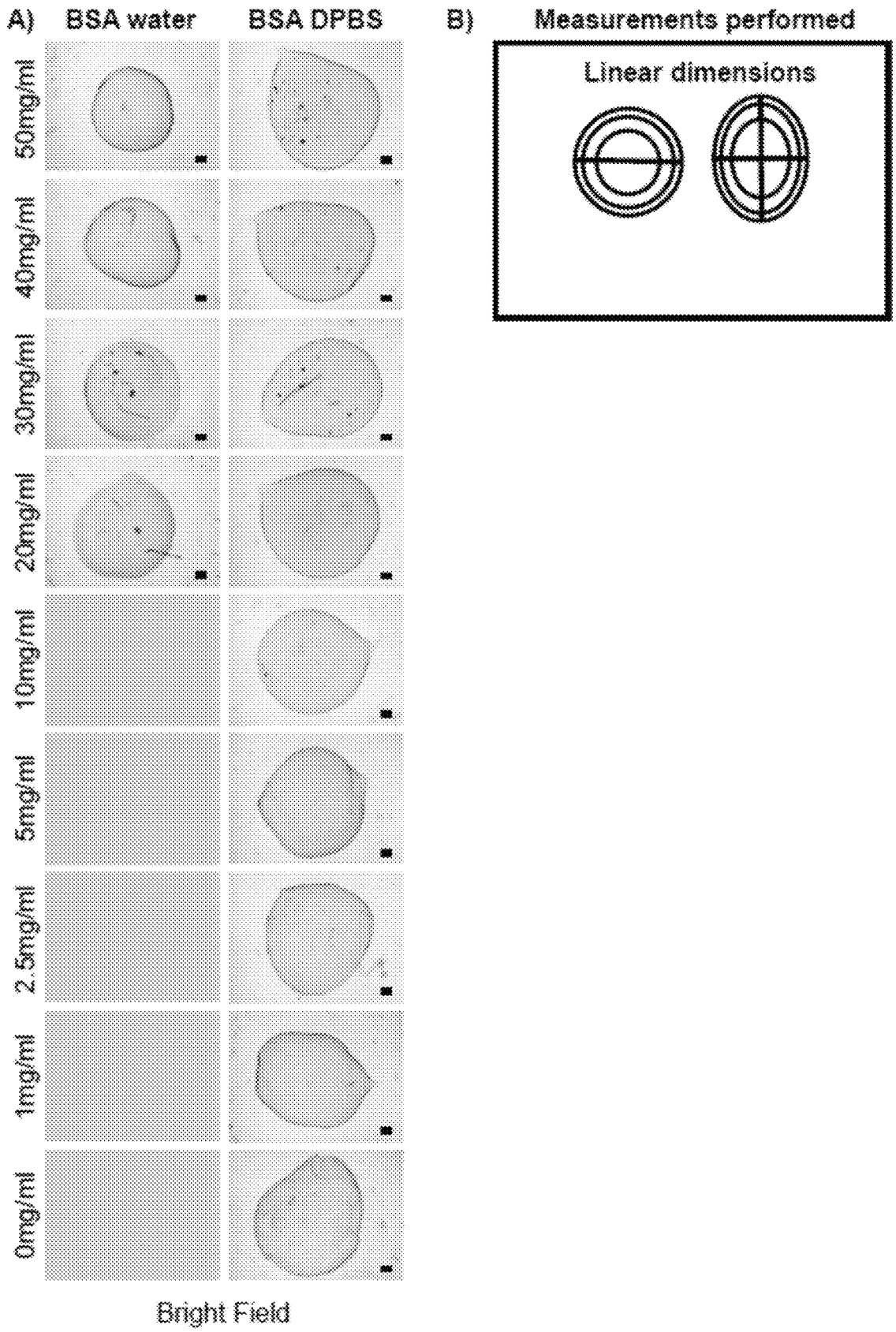
Figure 7:
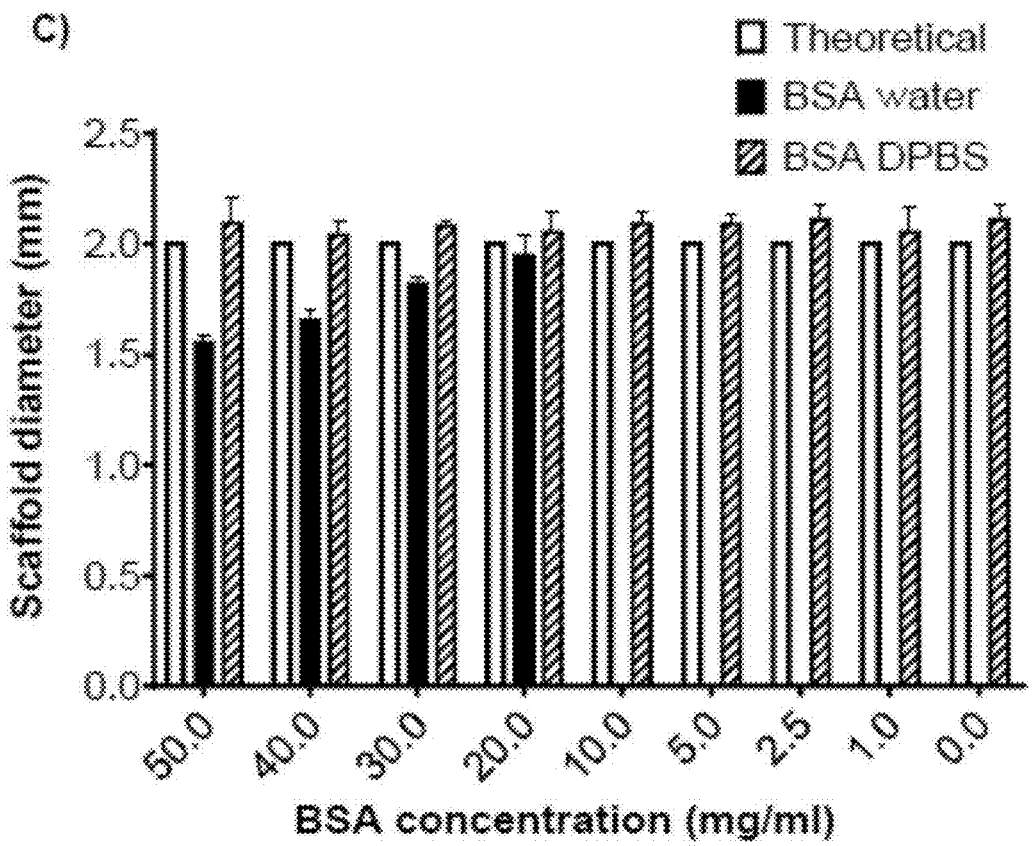
Figure 7:
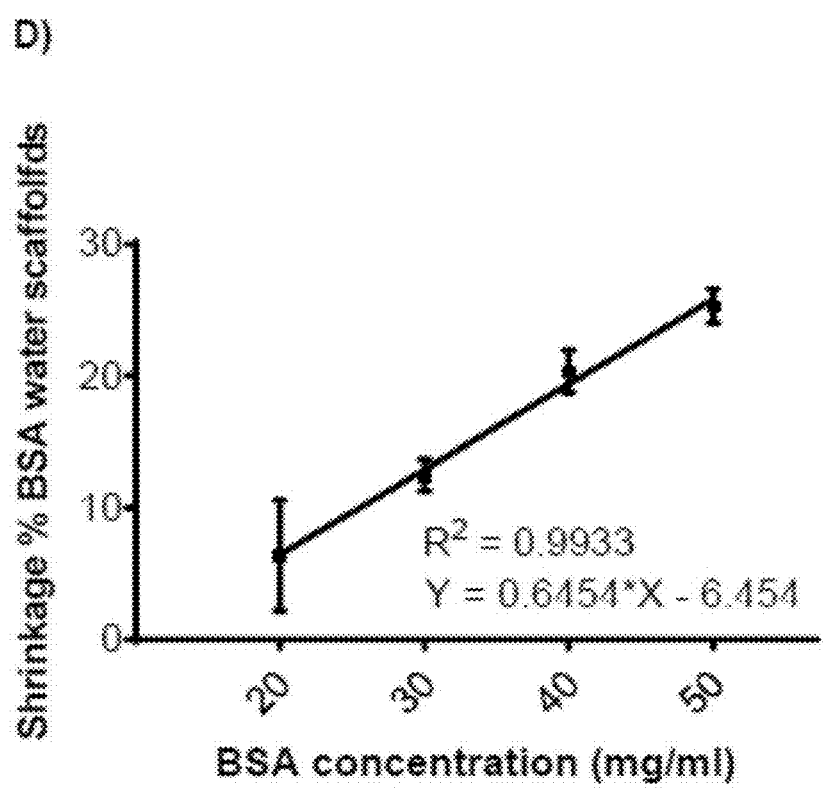

FIG. 7 Linear dimensions of the Clay-nanoparticle/protein scaffolds assembled in a gradient of BSA water and BSA DPBS. A) & C) The bright field images show that the scaffolds assembled in BSA water are smaller than the ones in BSA DPBS. D) The linear regression shows that the shrinkage is inversely proportional to the increase of protein concentration. The scale bar corresponds to 200 µm. n=4.

Figure 8:
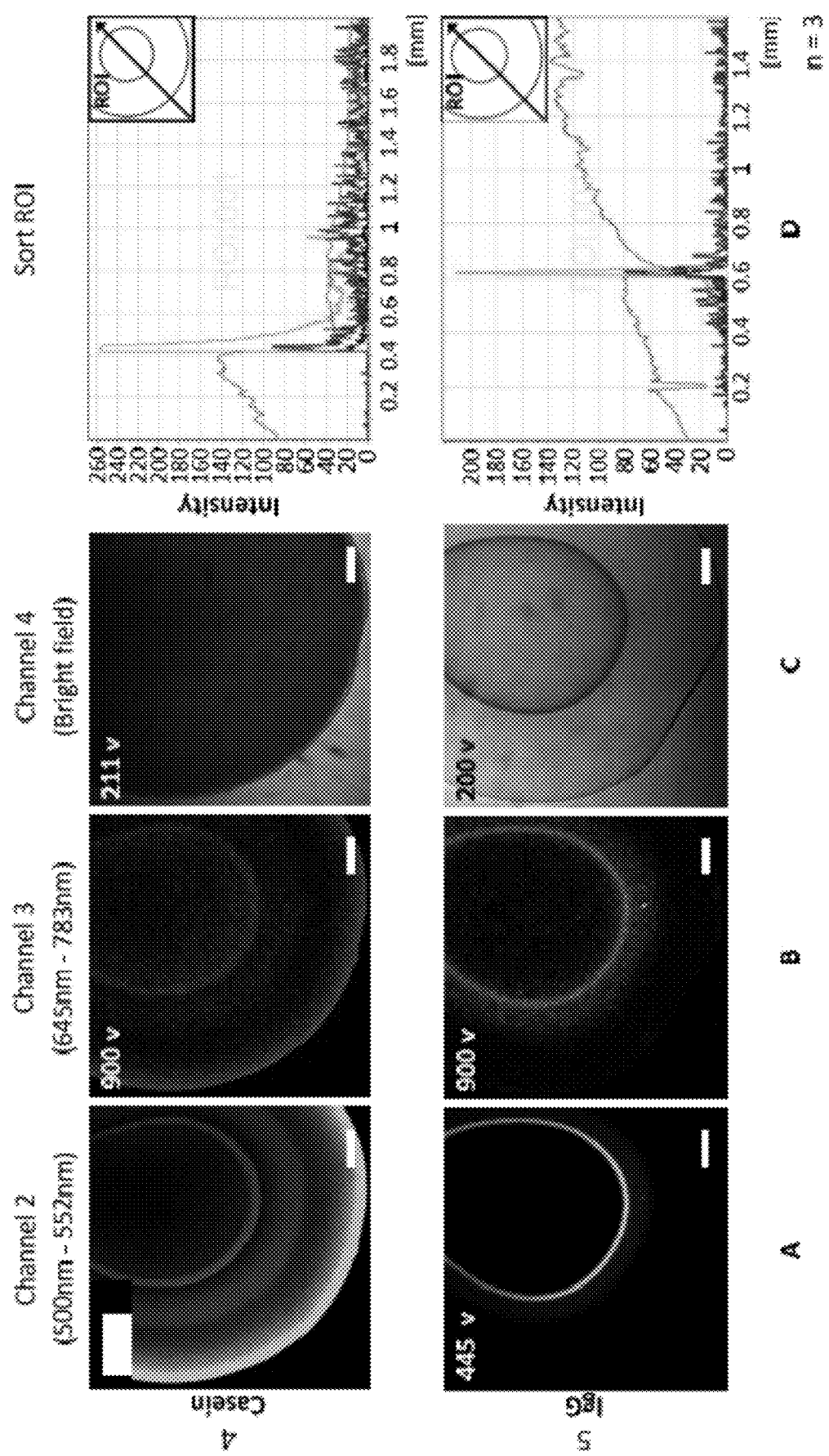
Figure 8:
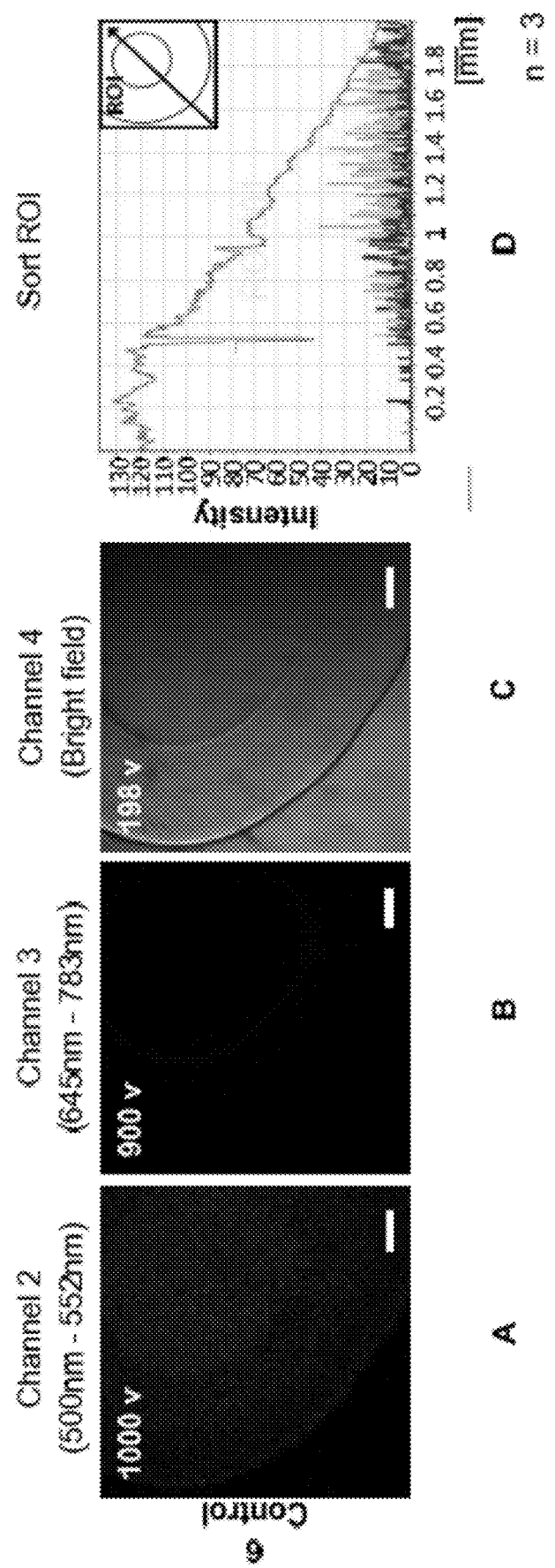

FIG. 8 Loading of Clay-nanoparticle/protein scaffolds with different globular proteins. The CLSM images show the diffusion and localisation of BMP 2 DyLight 633, FITC Avidin, FITC Streptavidin, FITC Casein and FITC IgG into the scaffolds (columns A & B). The images are presented with corresponding region of interest (ROI) (column D). Data is representative of n=3 and the scale bars correspond to 200 µm. Due to large differences in fluorescent intensity, different gain settings were set (indicated in each image).

Figure 9:
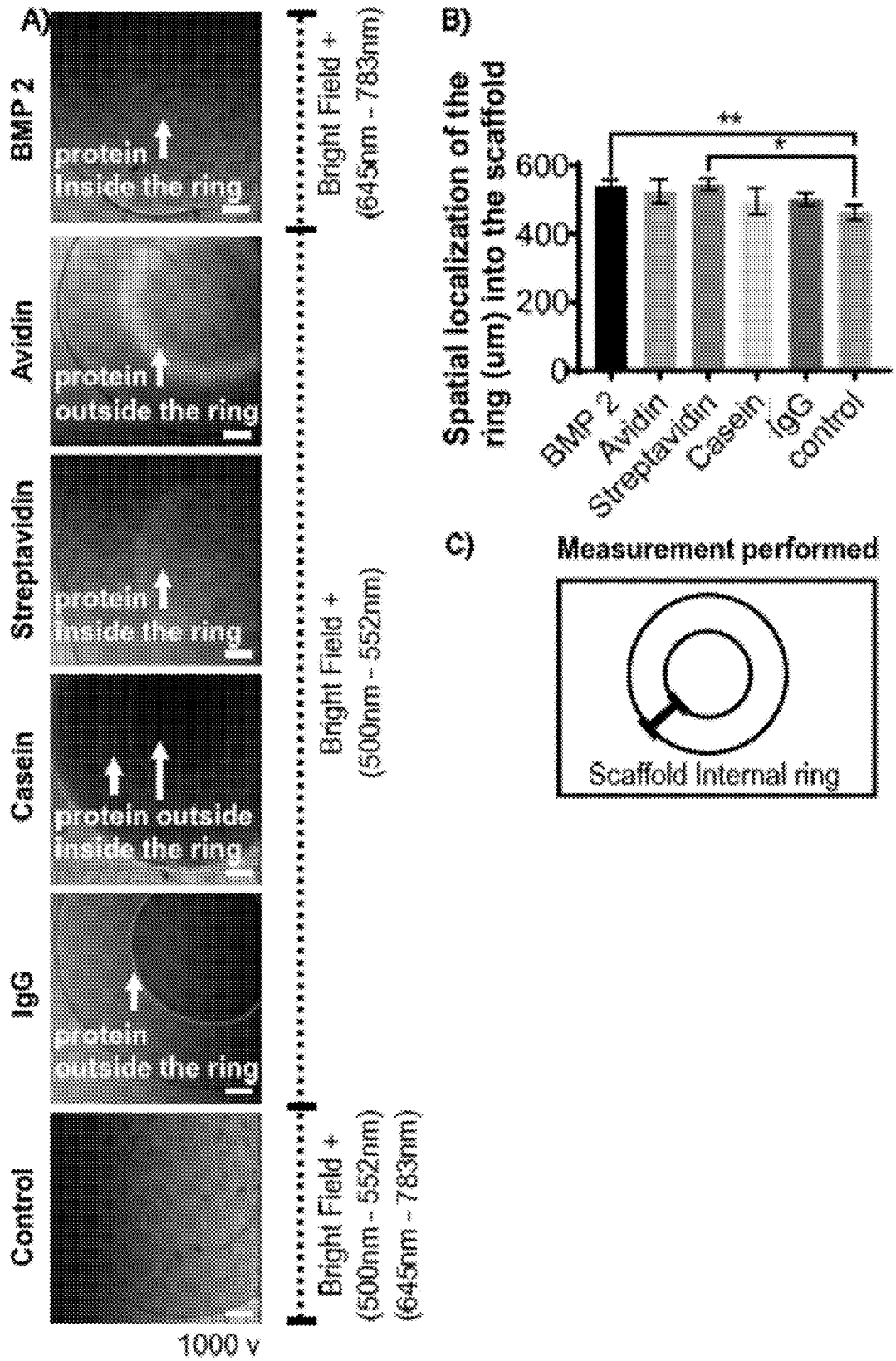

FIG. 9 Spatial localisation of fluorescent globular proteins loaded in the Clay-nanoparticle/protein scaffolds. The spatial localisation of the internal ring was measured from Bright Field images (C) and analysed (B). CLSM images of Bright Field and Fluorescent Signal revealed that the BMP 2 and Streptavidin localise inside the assembled ring, the Avidin and IgG outside the ring and the Casein both inside and outside the ring (A). Data representative of n=3.

Figure 10:
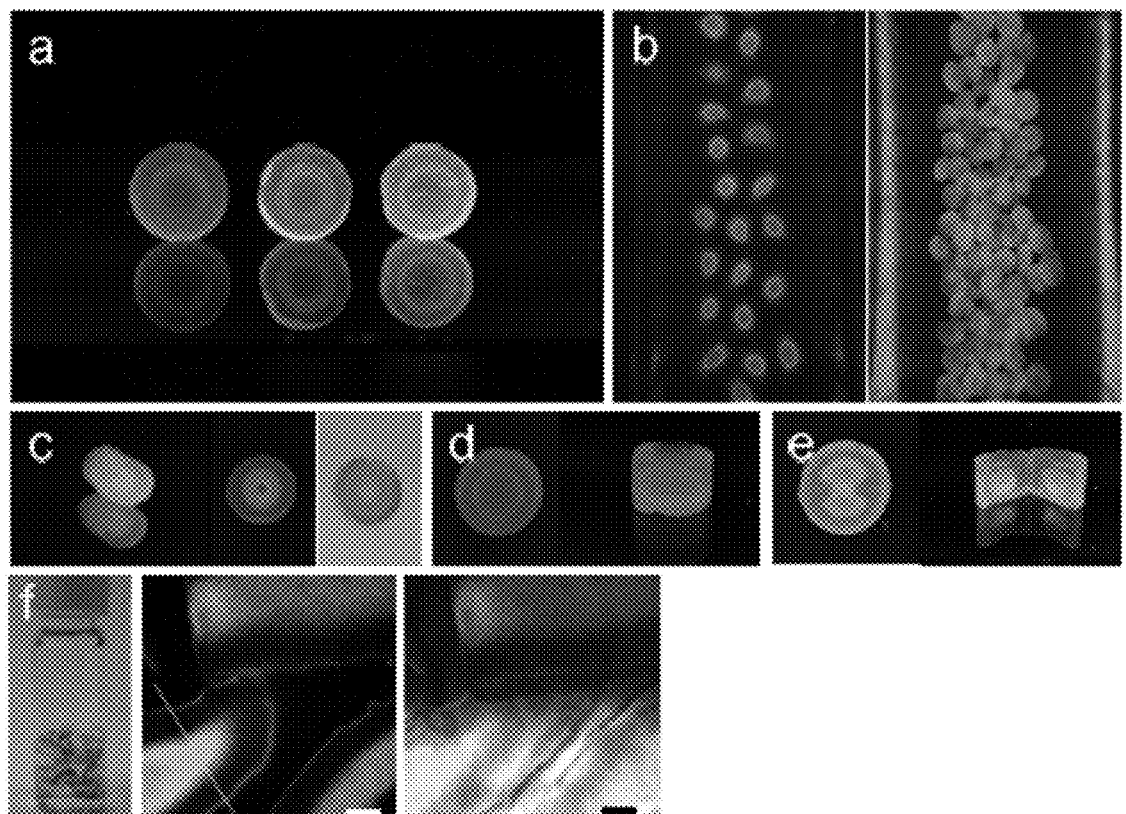
Figure 10:
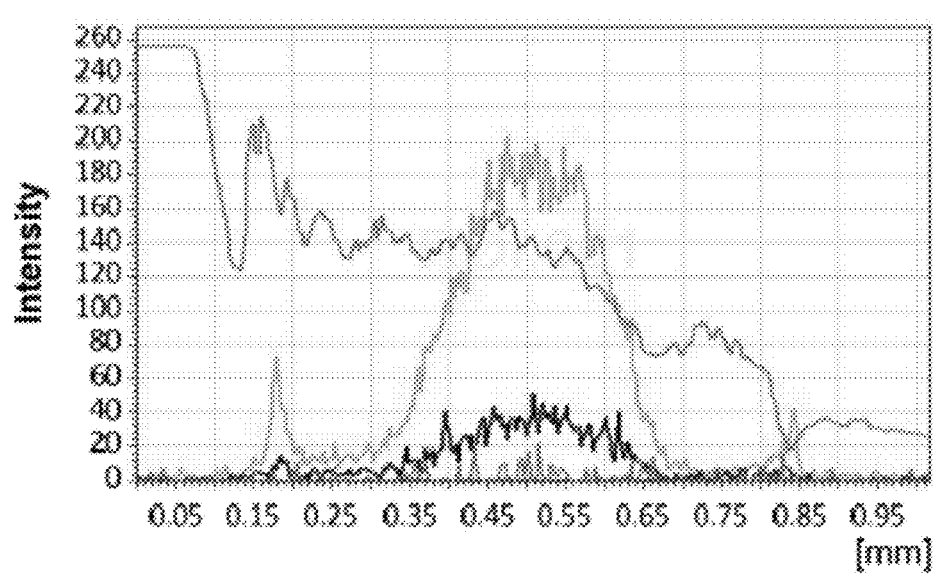

FIG. 10 Self-assembled protein patterning in nanoclay colloidal hydrogels of different size and shapes. Anisotropic concentration gradients stabilised in colloidal gels (>97% water) of various dimensions (tubes (a, c-e) and spheres (b)) and incorporating various model proteins-FITC-streptavidin (a, left and d), FITC-BSA (b left, e and f) and Rhoda-BSA (b, right and c).

Figure 11A:
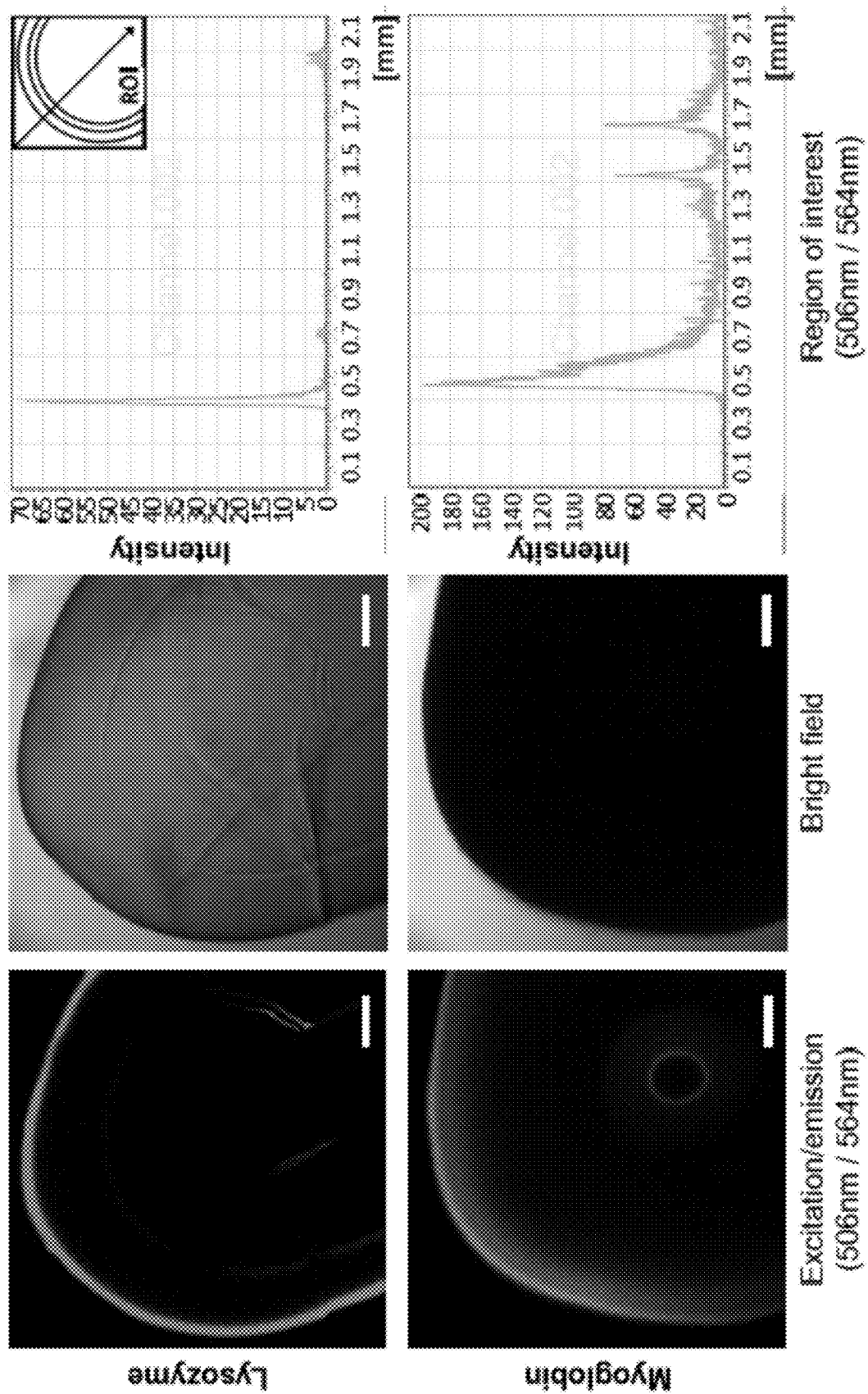
Figure 11A:
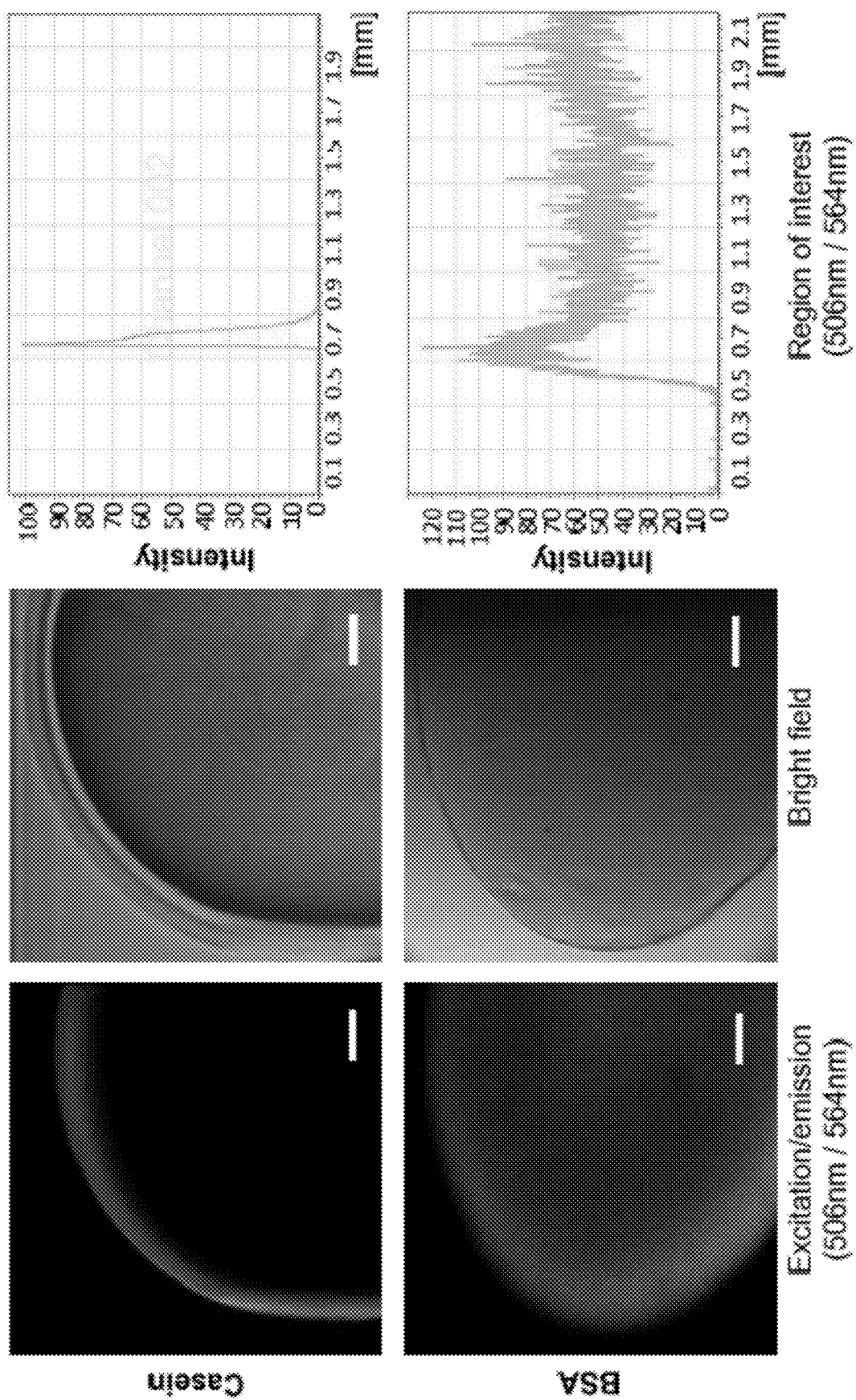
Figure 11A:
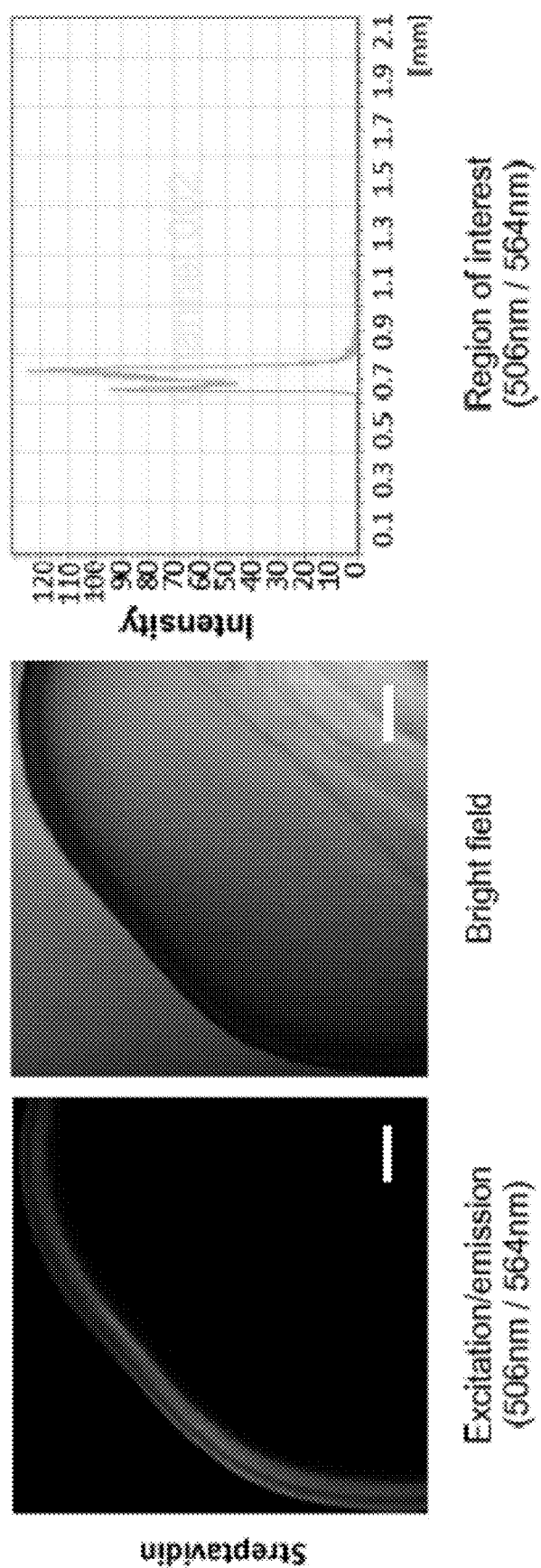

FIG. 11a&b Self-assembly of Clay-nanoparticle/protein scaffolds with different globular proteins. The confocal images show the absorption and localization of FITC BSA on Laponite®/protein scaffolds that were assembled in different protein solutions. The images are presented by the protein molecular weight and are representative of triplicates. The scale bar corresponds to 200 µm.

Figure 11B:
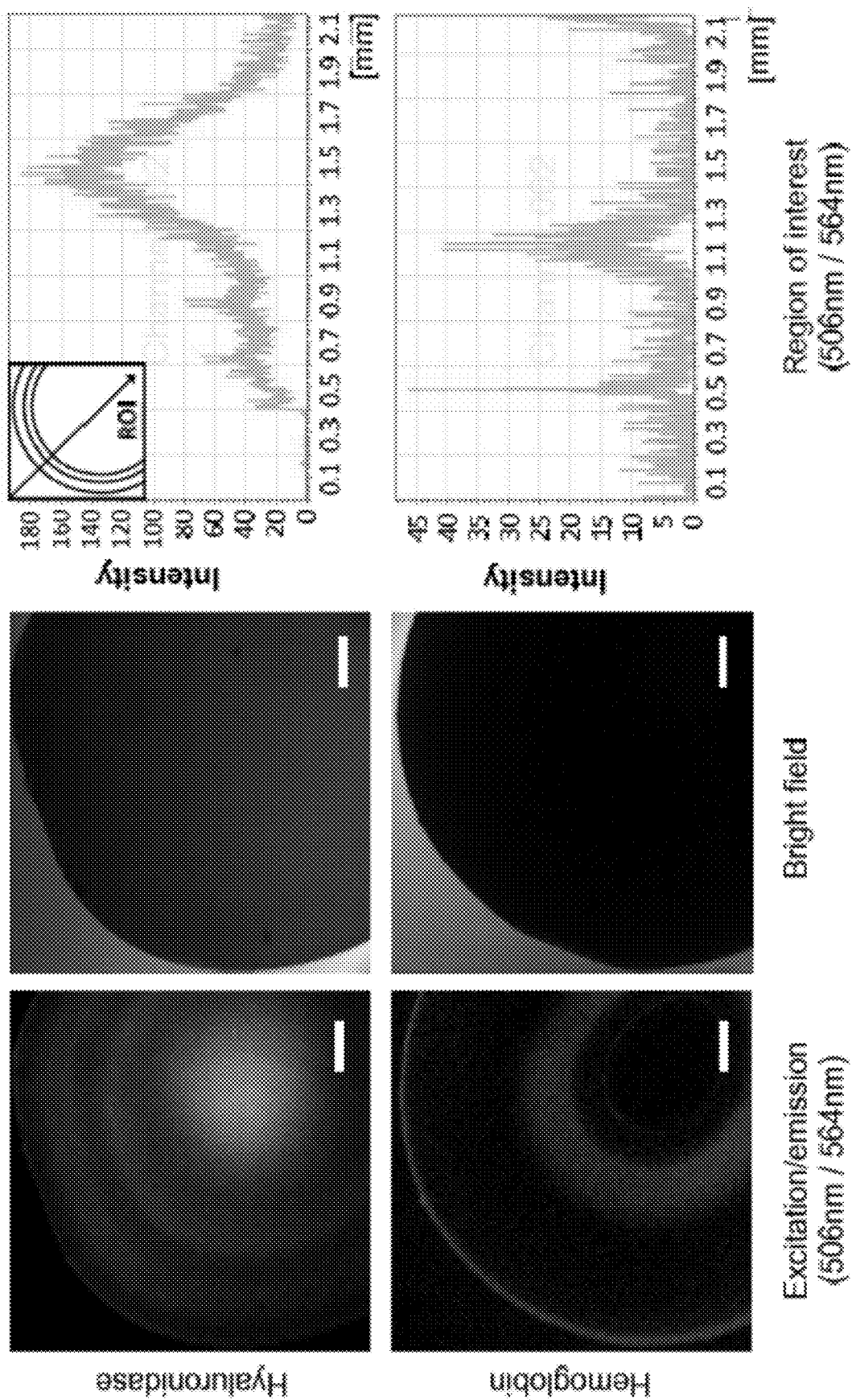
Figure 11B:
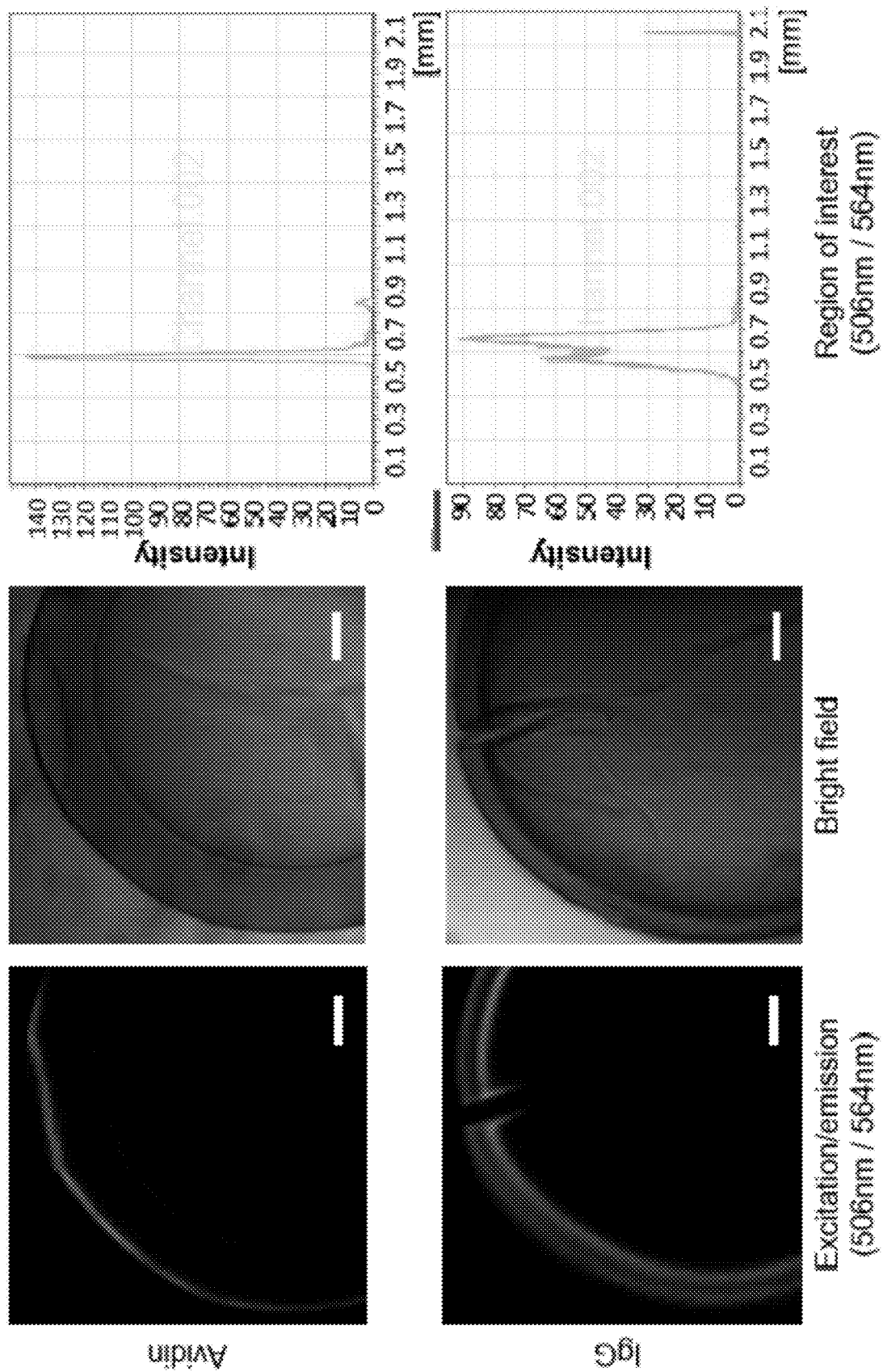
Figure 11B:
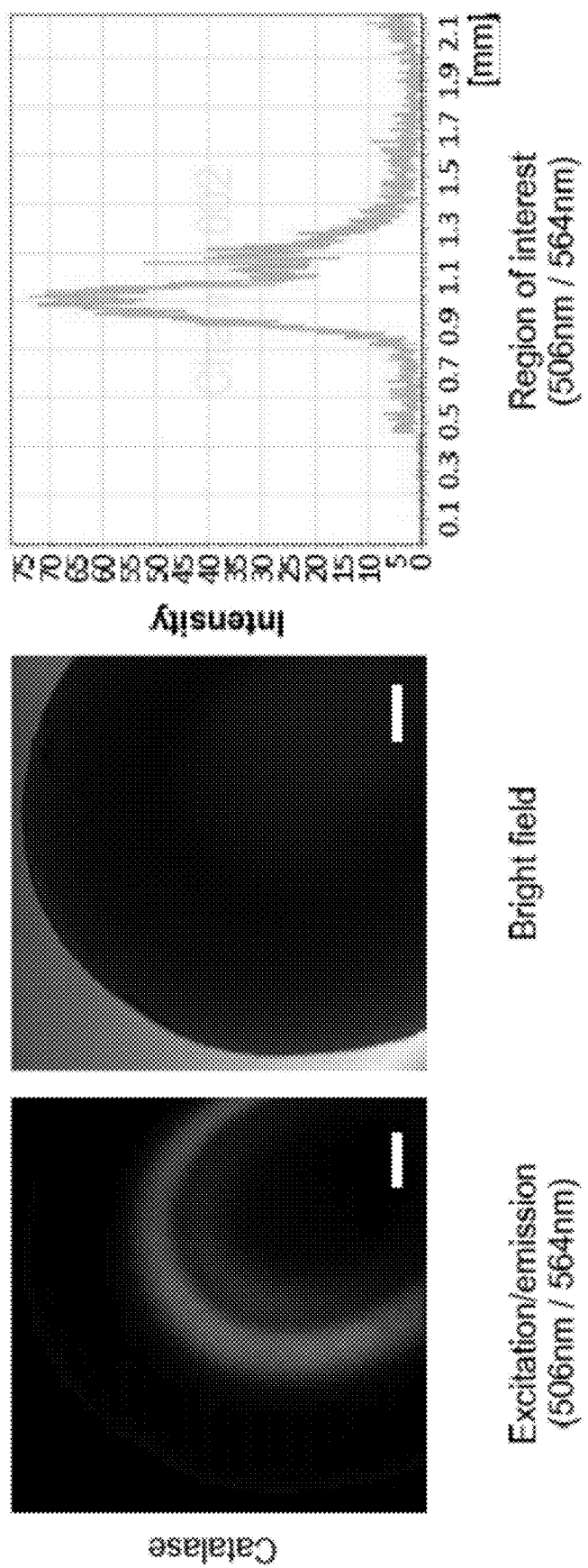
Figure 11C:
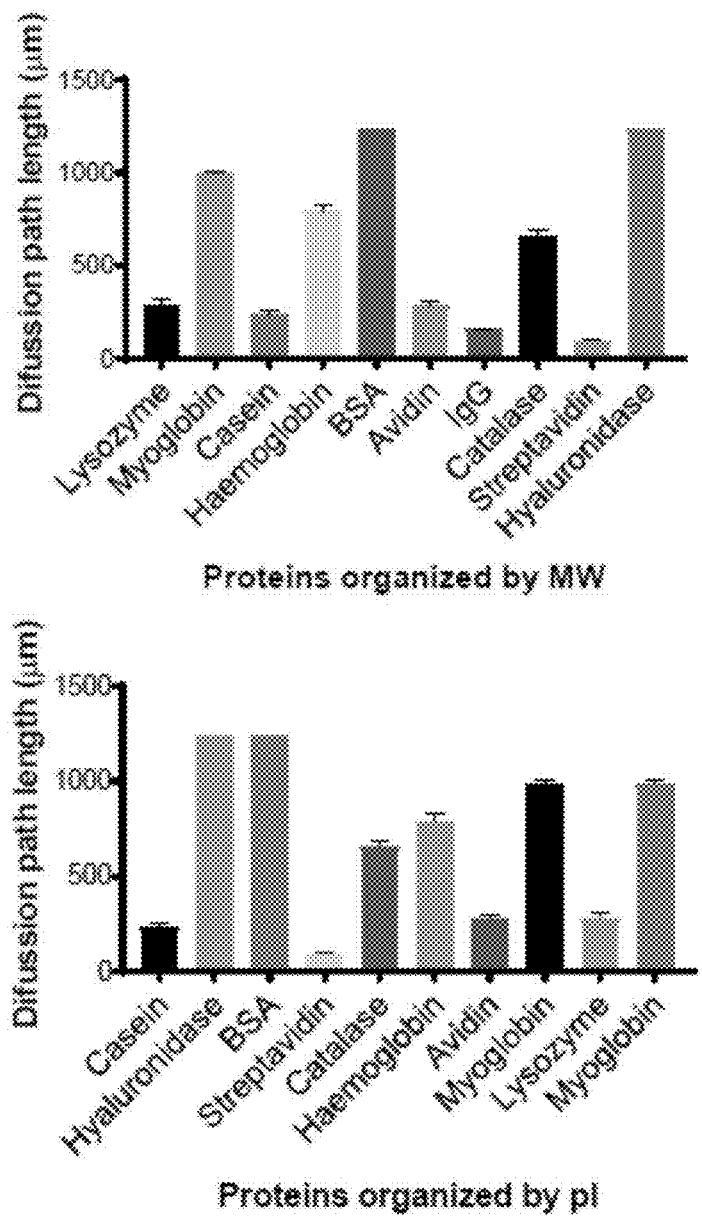

FIG. 11c Self-assembly of Clay-nanoparticle/protein scaffolds with different globular proteins. Graphs of the diffusion path length of the different globular proteins show no relationship with their respective molecular weight and isoelectric point. The data is representative of n=3.

Figure 12:
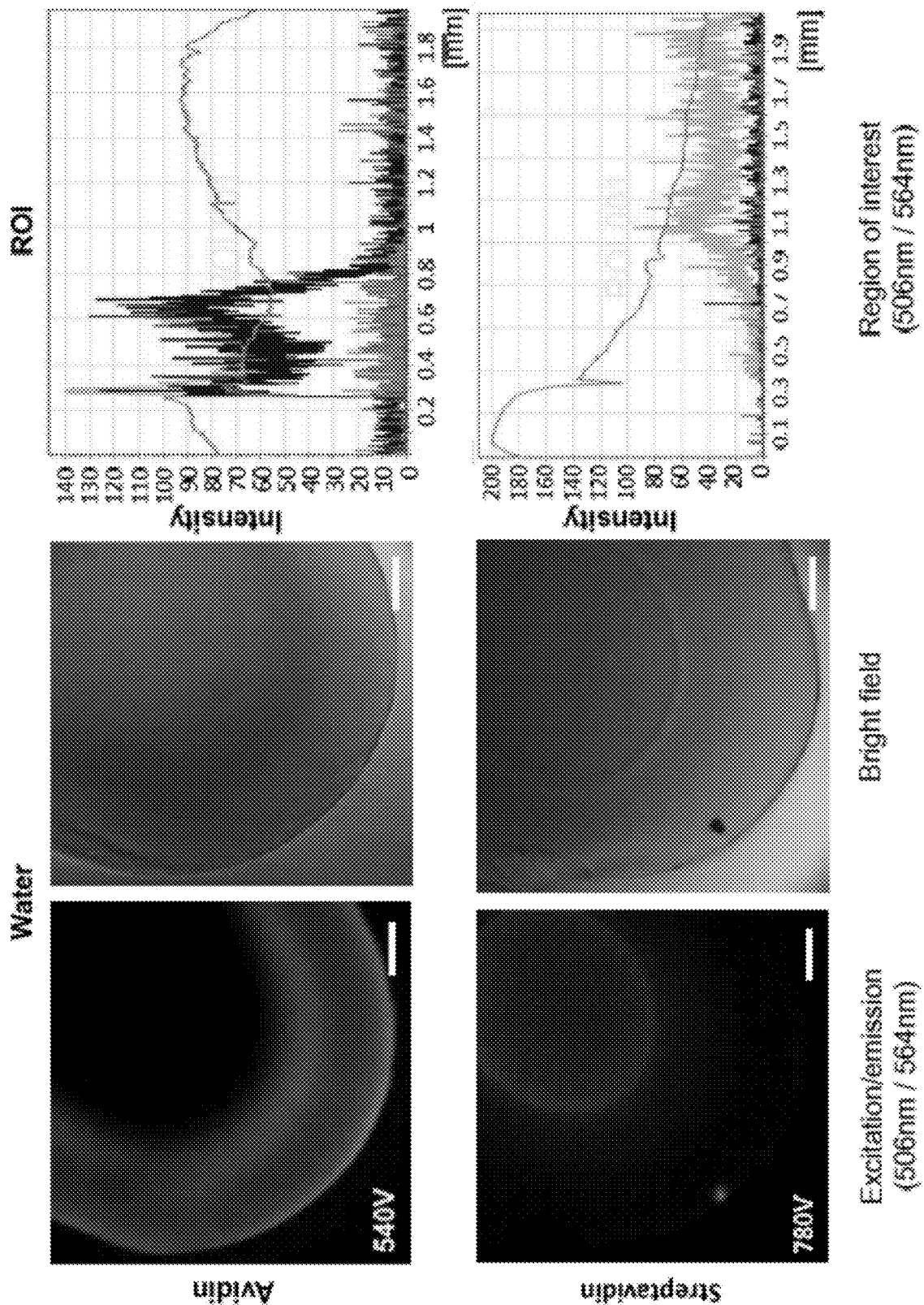
Figure 12:
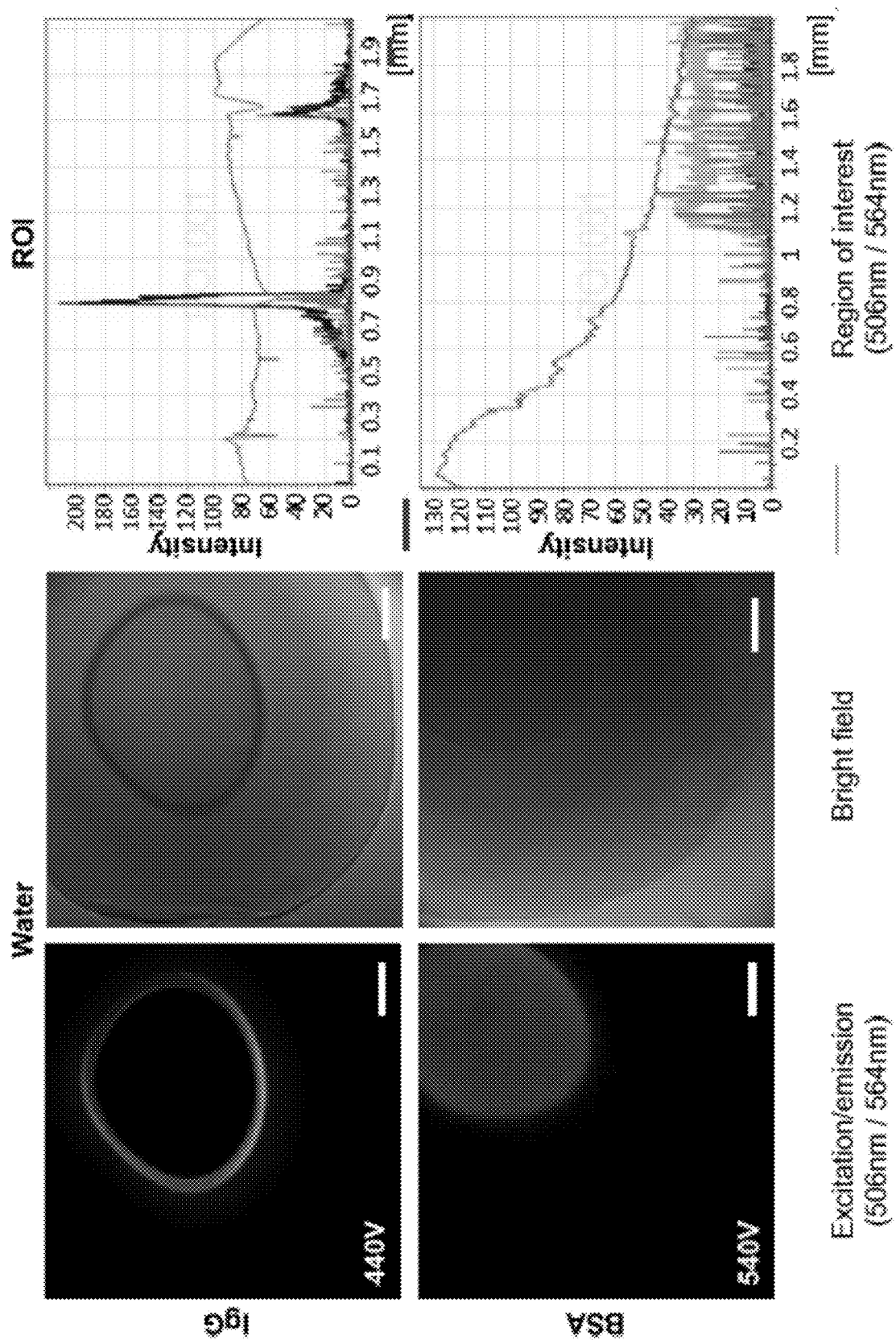
Figure 12:
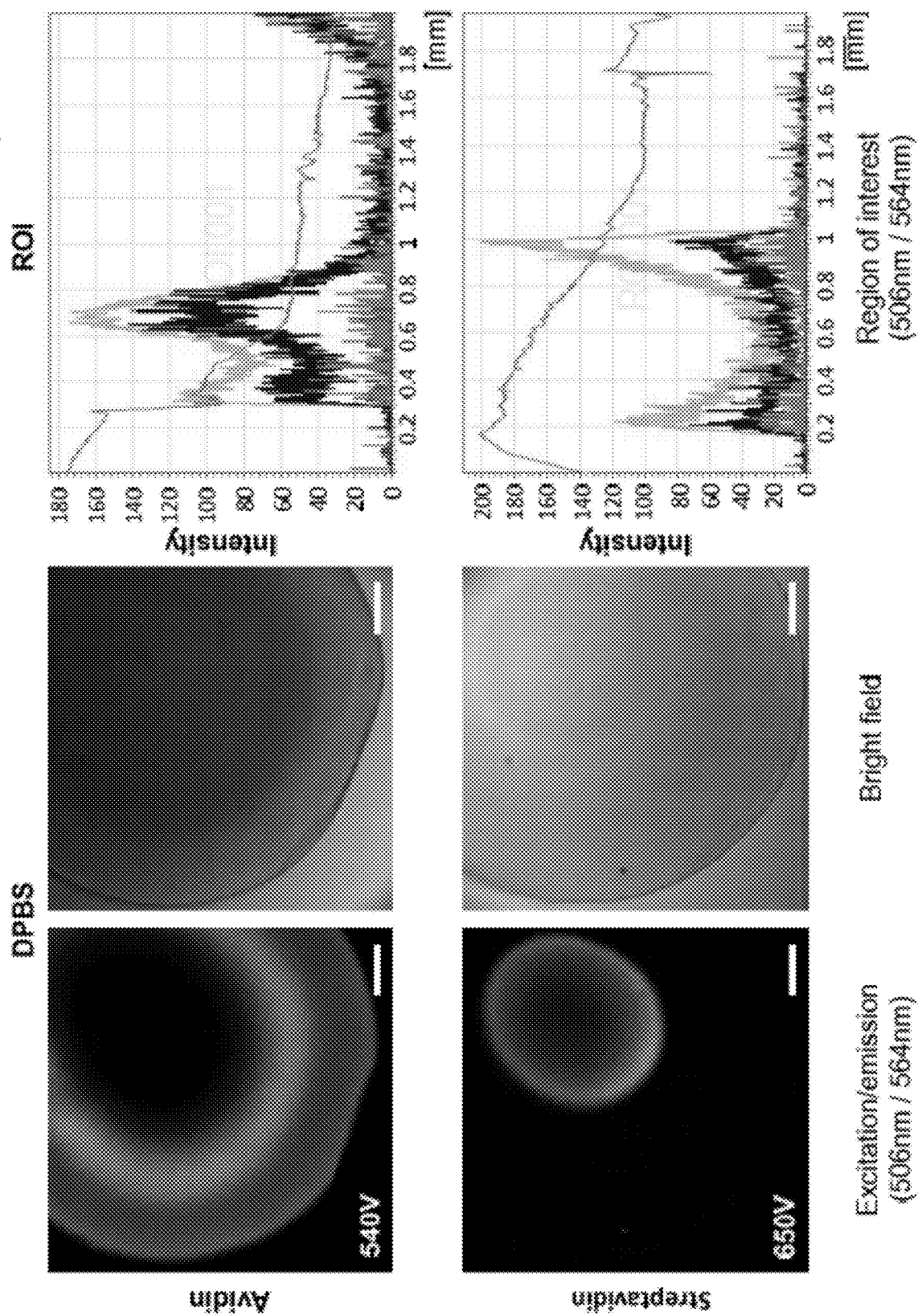

FIG. 12 Loading of globular protein in Clay-nanoparticle/protein scaffolds with different solvents. The confocal images show the absorption and localization of different globular proteins (Avidin, Streptavidin, IgG and BSA) that were reconstituted in water and DPBS respectively. Observed is an increase in the fluorescent intensity on those scaffolds that were loaded with FITC BSA-DPBS, also changes in the localization of some proteins, specifically, Streptavidin and BSA. The images are representative of triplicates and the scale bar corresponds to 200 µm.

Figure 13:
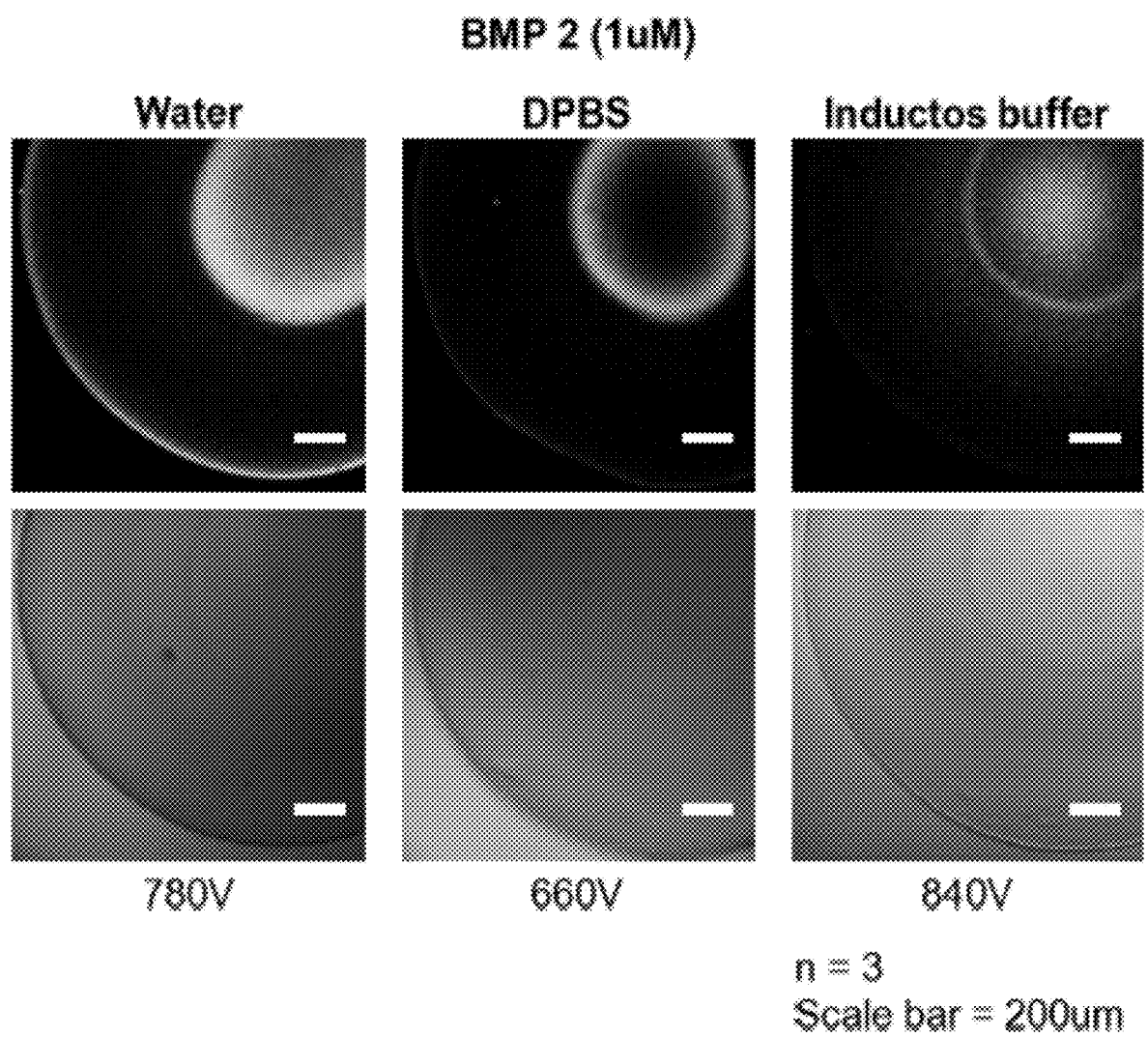

FIG. 13 Loading of BMP 2 in Clay-nanoparticle/protein scaffolds with different solvents. The Confocal images show the absorption and localization of BMP 2 that was reconstituted in water, DPBS and inductos buffer respectively. It can be observed an increase in the fluorescent intensity on those scaffolds that were loaded with BMP 2-DPBS, also there are significant changes in their localization. The images are representative of triplicates and the scale bar corresponds to 200 µm.

Figure 14:
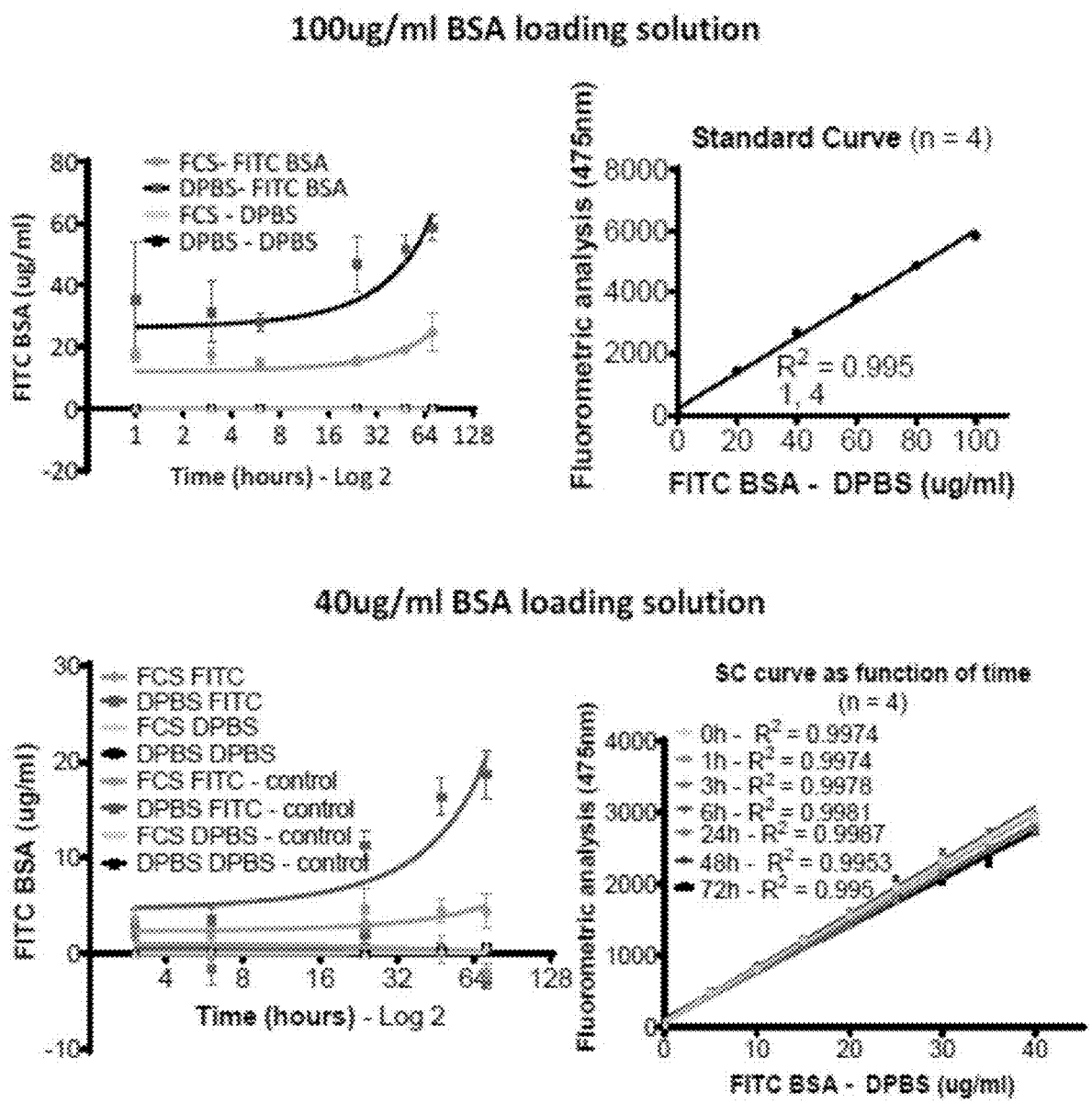

FIG. 14 Quantification of BSA loaded into the Clay nanoparticle/protein scaffolds as a function of time. The statistical analysis shows a continuous absorption of protein as a function of time. The FCS scaffolds incubated in 100 µg/ml FITC BSA absorbed 24.619+−6.2747 µg/ml FITC BSA at 72 h incubation and the control scaffolds assembled with DPBS absorbed 58.691+/−3.800 µg/ml FITC BSA. The FCS scaffolds incubated in 40 µg/ml FITC BSA absorbed 7.0879+/−2.153 µg/ml FITC BSA at 72 h incubation and the control scaffolds assembled with DPBS absorbed 22.142+/−3.159 µg/ml FITC BSA. The data is representative of n=4.

Figure 15:
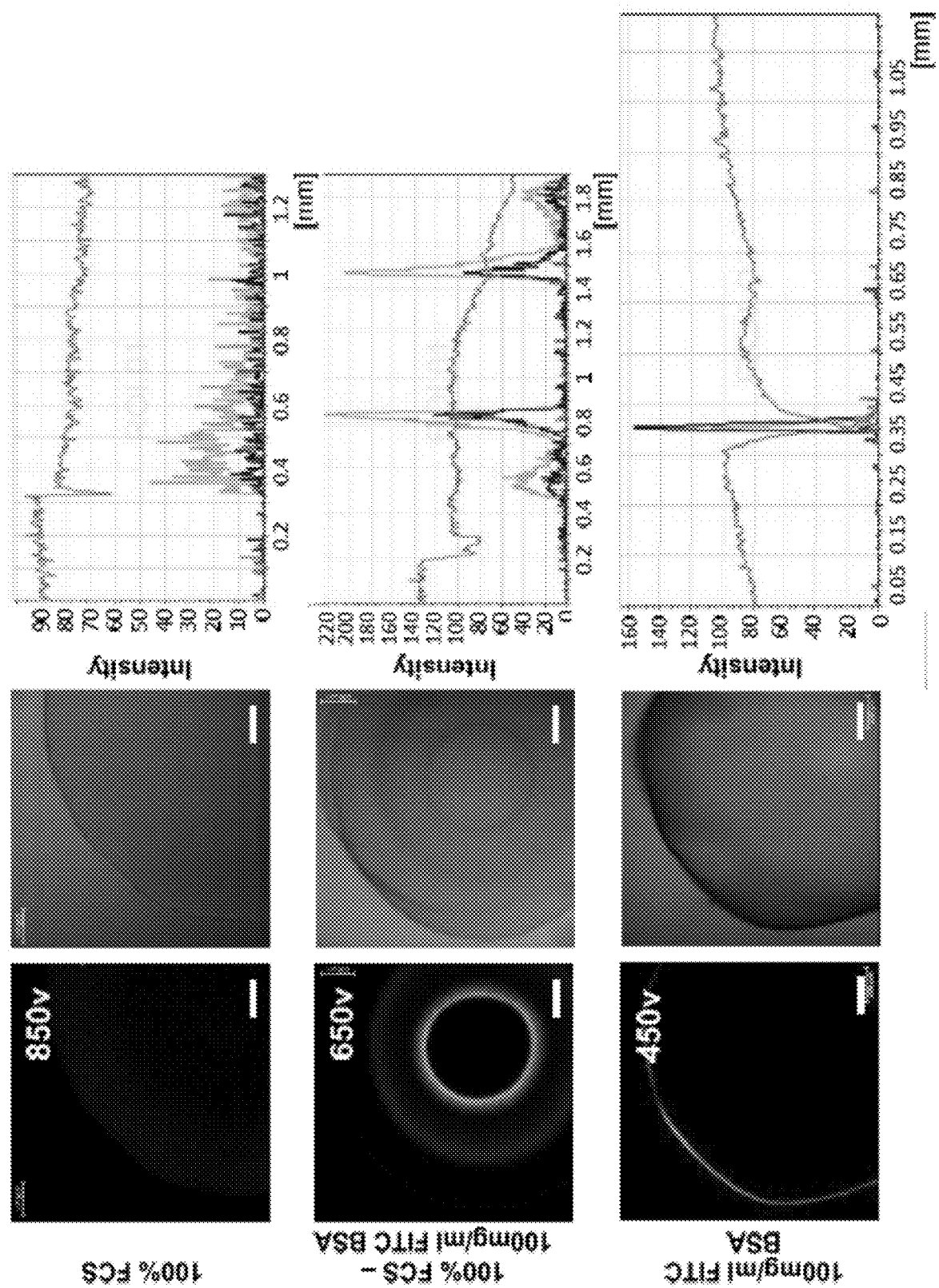
Figure 15:
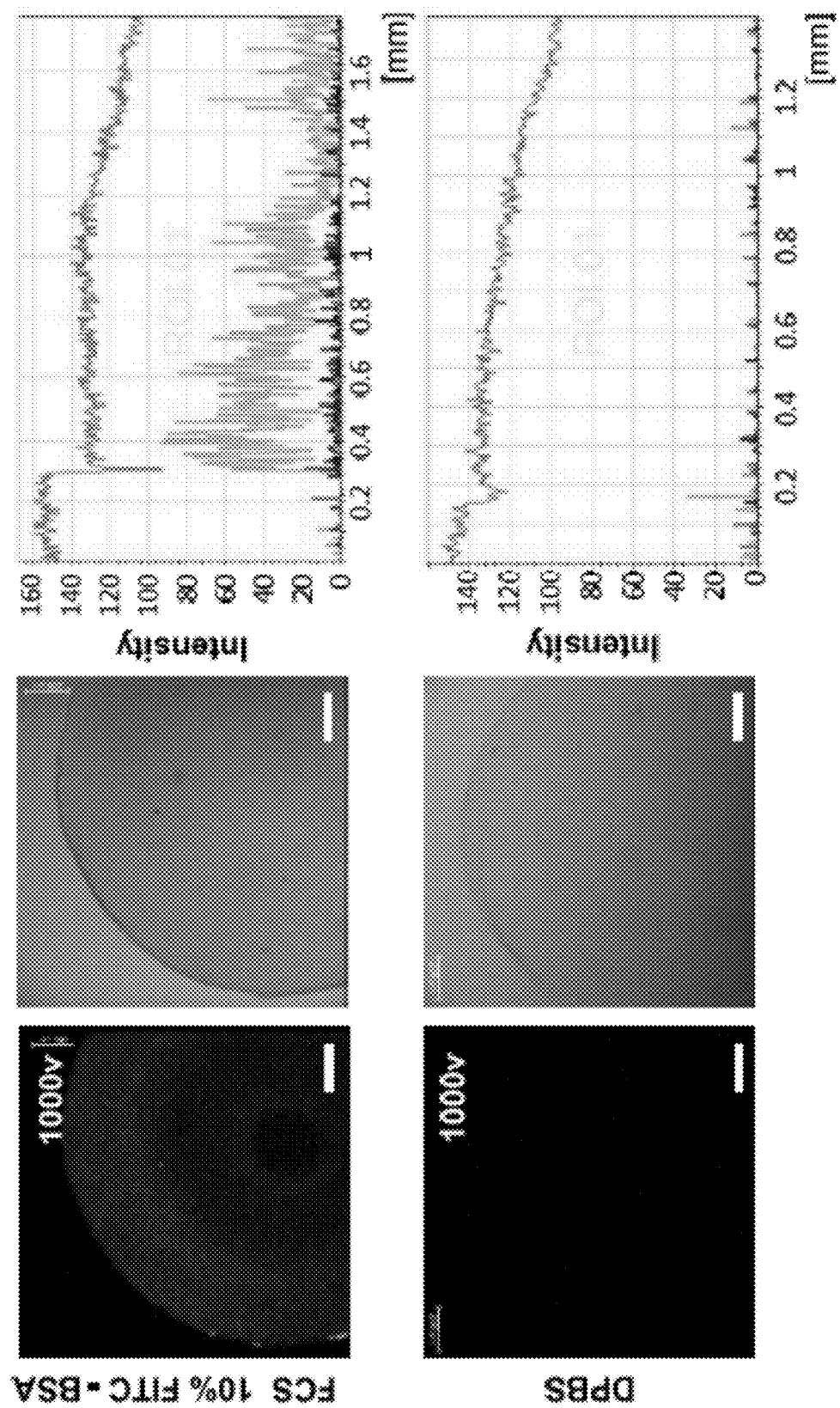

FIG. 15 Effect of combining the assembly and loading steps on the final protein localization. The CLSM images show the diffusion and localization of FITC BSA into the scaffolds facilitated by FCS either by addition of the FITC BSA to the FCS simultaneously at the assembly or later after the assembly with FCS. The spatial localization of the FITC BSA in the scaffolds is different for all treatments. The scale bars correspond to 200 µm.

Figure 16:
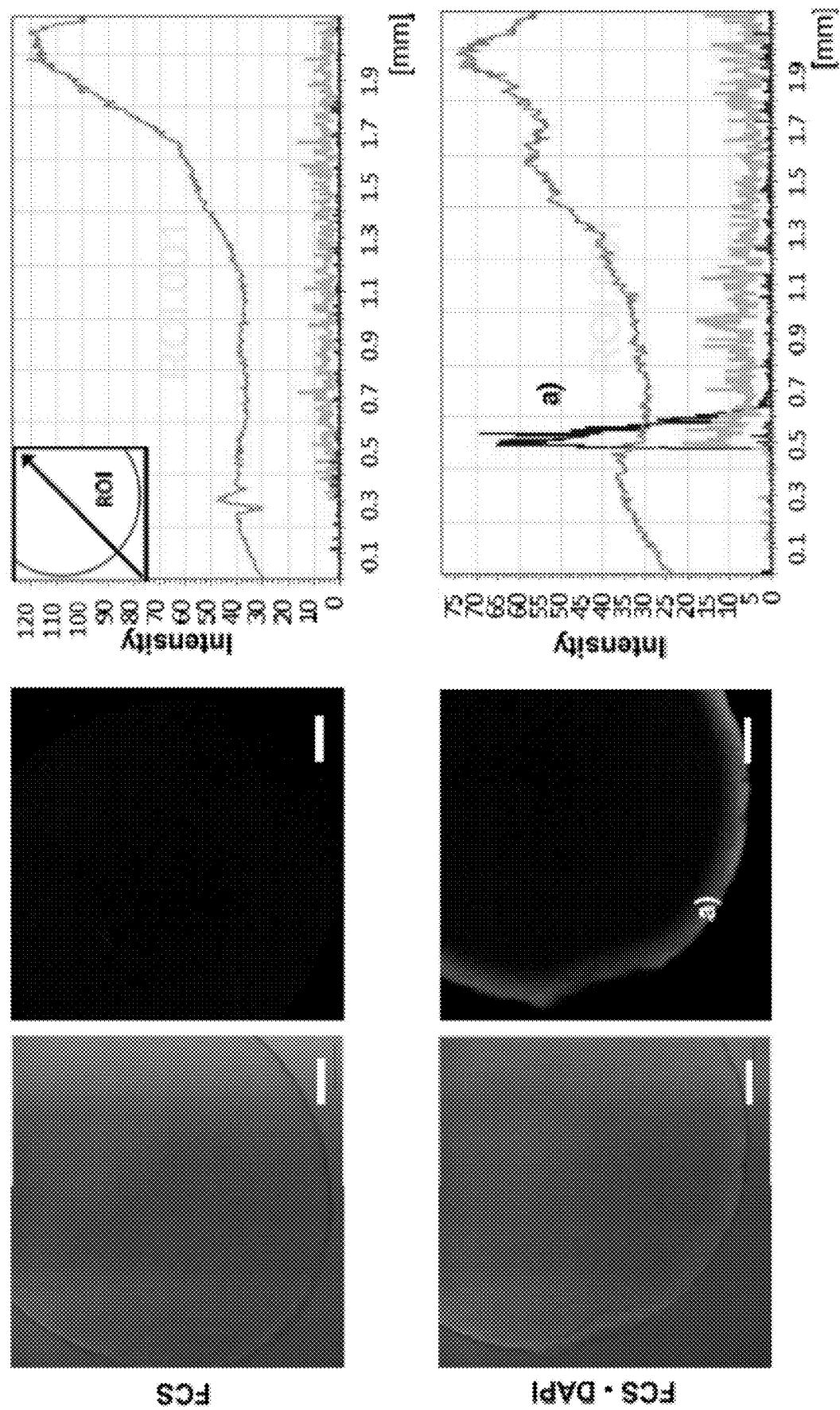
Figure 16:
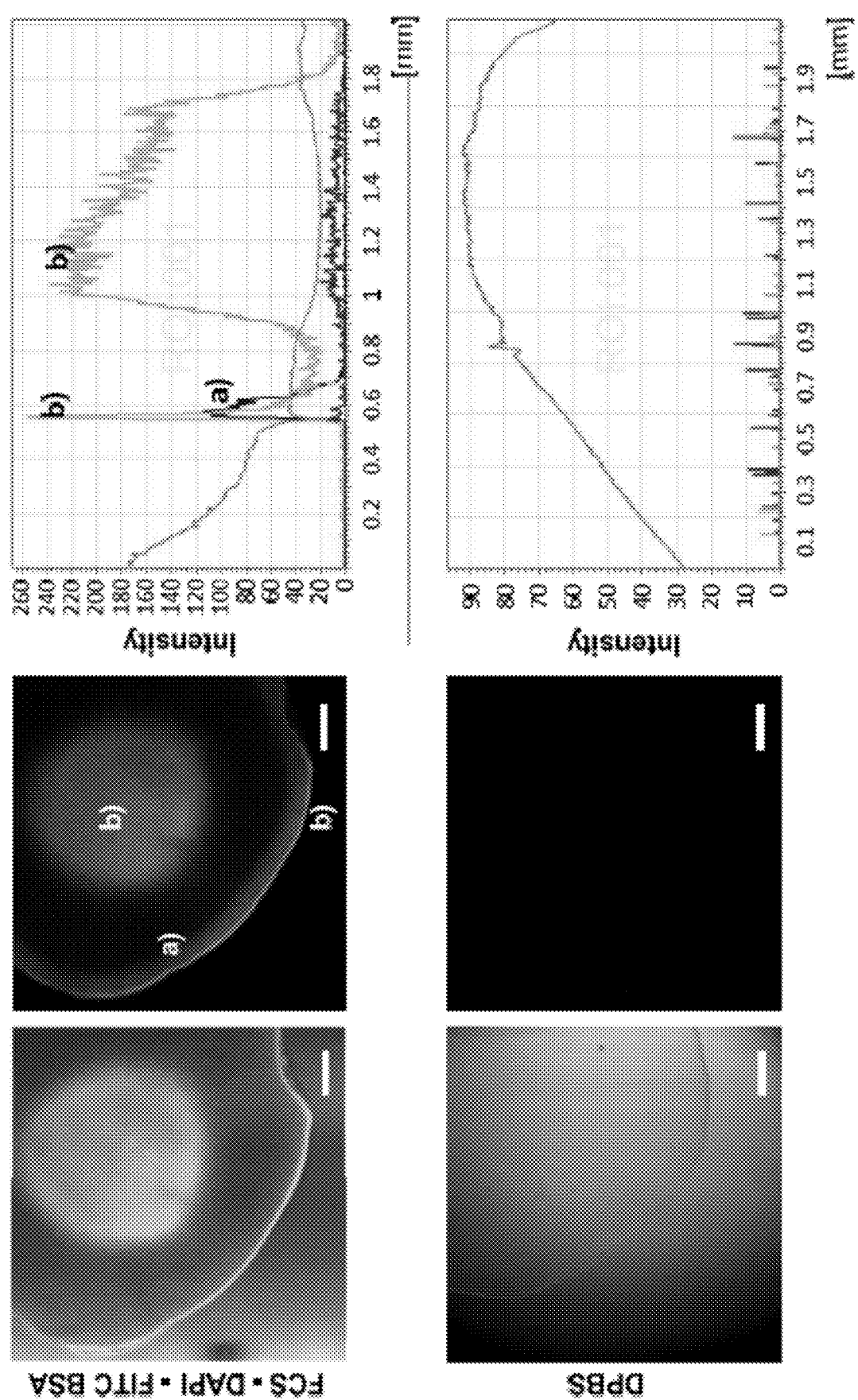

FIG. 16 Loading of different molecules into the Clay nanoparticle/protein scaffolds. A Laponite® droplet was assembled in FCS. It was then rinsed and transferred to DAPI, rinsed again and transferred to FITC BSA. a) The BSA localizes at the periphery and the centre of the scaffold and the b) DAPI next to the surface as shown on the CLSM images and ROI graphs. The scale bar represent 200 um; n=3.

Figure 17:
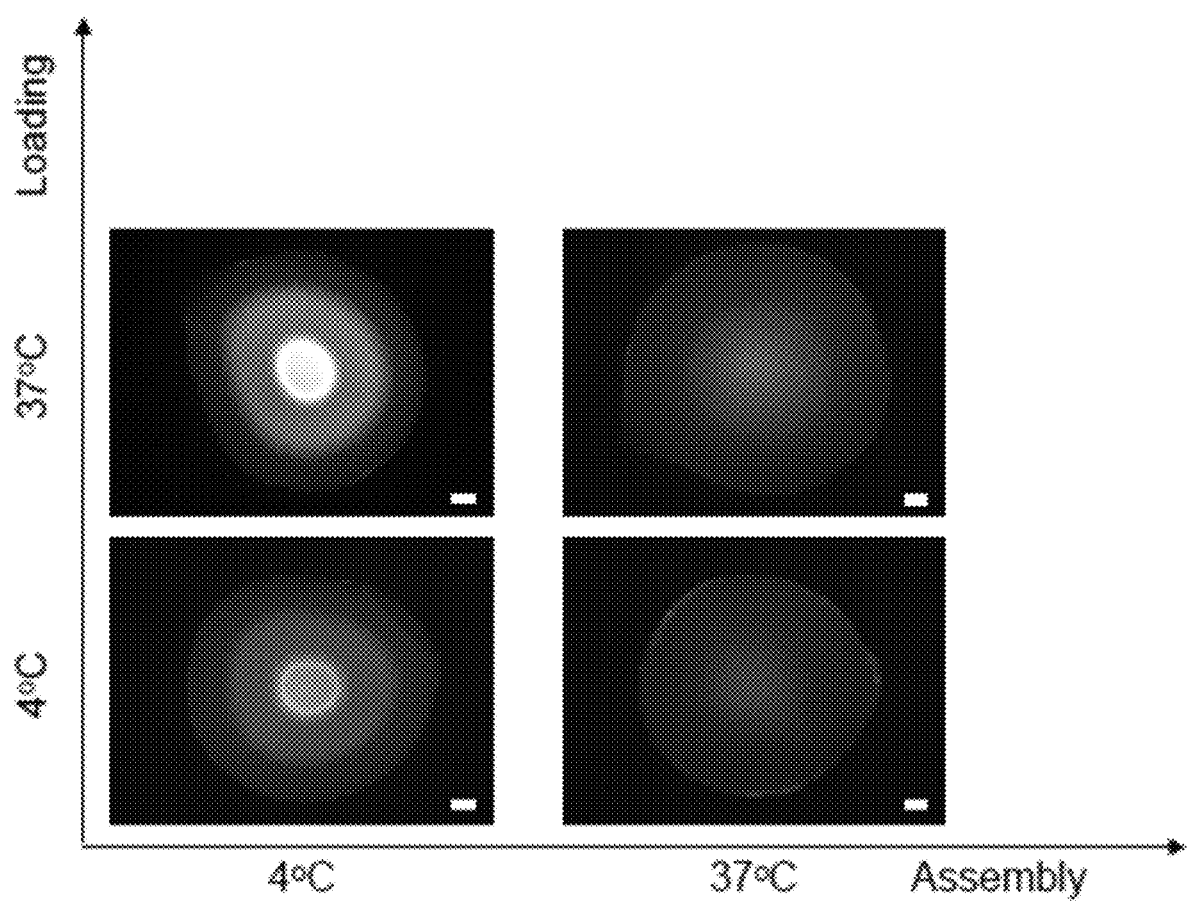

FIG. 17 Quadrant diagram showing the effect of temperature on the scaffold assembly and loading. The assembly temperature affects the protein localization and the loading temperature presumably affects the amount of protein absorbed. Representative Light Fluorescent Microscope images of n=4. The scale bars correspond to 200 µm.

FIG. 18 Assembly and loading of multiple protein rings. The confocal images reveal the formation of multiple rings of FITC BSA into the scaffolds when alternating the assembly and loading solutions four times (n=8)

Figure 19:
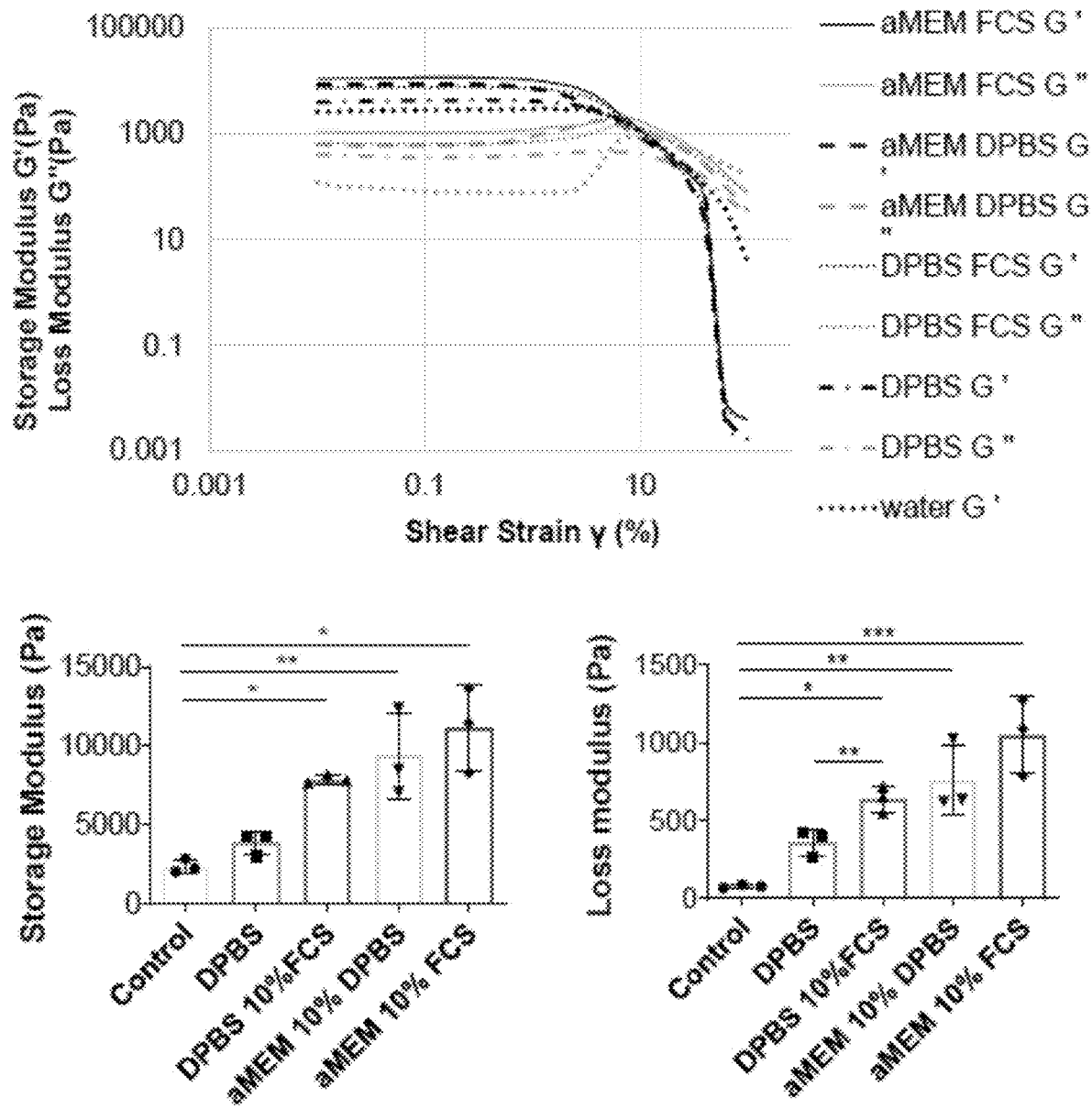

FIG. 19. Amplitude sweep graph of Laponite® gel assembled with different tissue culture solutions. The storage and loss modulus are plotted as a function of shear strain at constant frequency (1 Hz). The results are presented as mean and standard deviation of triplicates analysed with One-way ANOVA, Bonferroni post hoc. The results show an important interaction between the Laponite® nanoparticles and the tissue culture solutions containing organic molecules by means of the increase in the stiffness and viscosity of the gel. Furthermore, dissipation of deformation energy was observed on the gel right before collapsing, except when treated with DPBS.

Figure 20:
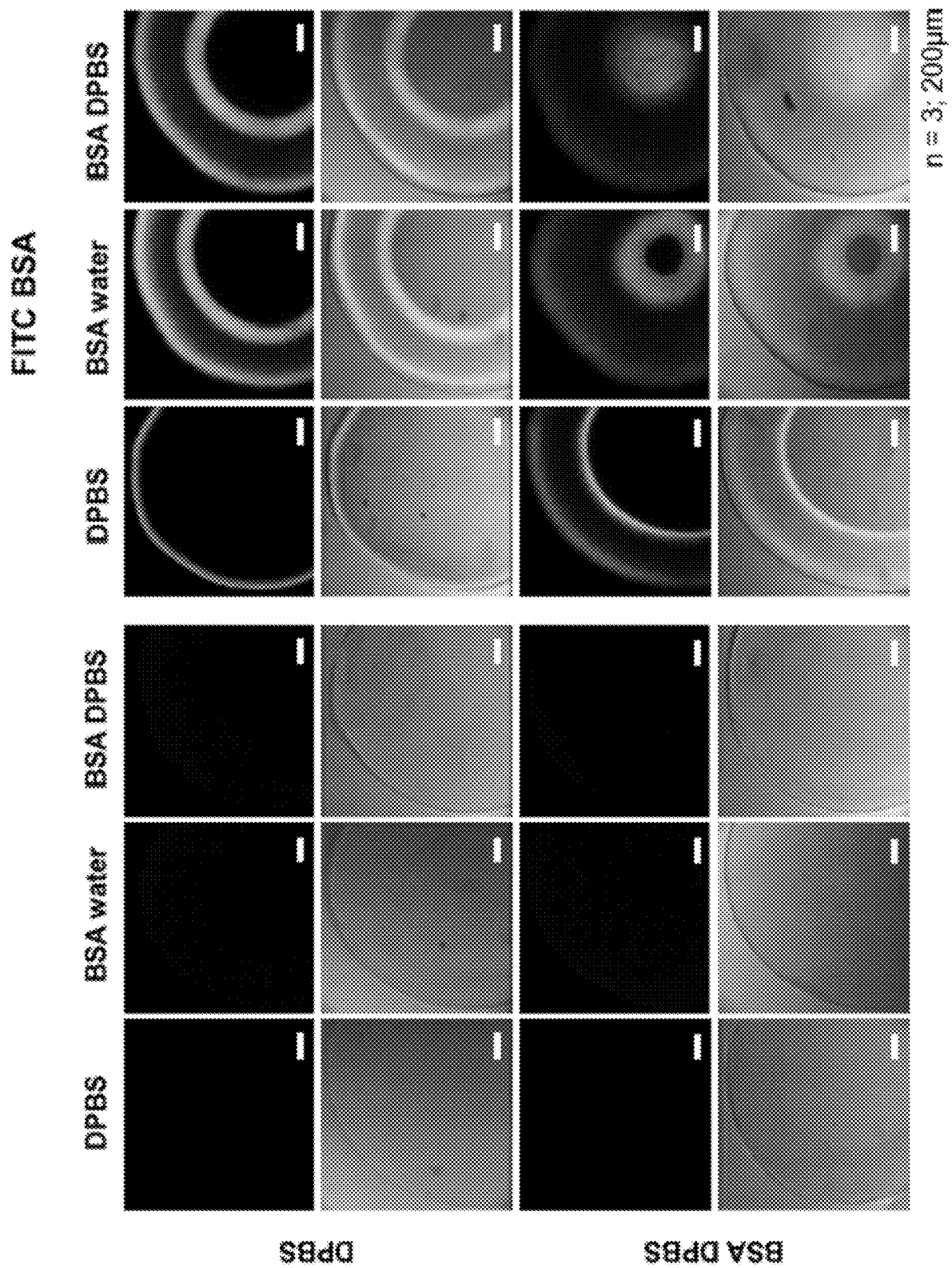

FIG. 20. Assembly of Laponite® protein scaffolds with ions prior to protein. The treatment of DPBS scaffolds with a concentrated protein solution revealed the diffusion and localization of proteins into the Laponite®/protein scaffold. The process is concentration dependent, since the 100 µg/ml FITC BSA localized at the DPBS scaffold surface, but the DPBS scaffolds treated with BSA water and BSA DPBS diffused into the scaffolds and allowed further diffusions of 100 µg/ml FITC BSA. Treatment of BSA DPBS scaffolds with a concentrated loading protein solution results in further diffusion of the protein into the core, which affects the final protein localization. The presence of ions accelerates the diffusion process of proteins into the DPBS and BSA DPBS scaffolds.

FIG. 21. Functionalization of laponite colloidal solution with different polymer solution prior to the assembly and loading steps. The confocal images reveal the assembly and loading of the scaffold regardless of the polymer added, collagen, alginate or agarose to the 2.8% clay-gel. The images represent n=4 and the scale bar to 200 µm.

FIG. 22. Viscosity and shear stress vs. shear rate for 2.8% laponite autoclaved and non-autoclaved (n=3).

INTRODUCTION

Biomimicry is an important principle underlying a number of tissue engineering (TE) strategies. Emulating the three dimensional (3D) hierarchical organization of physical and/or biochemical cues of the native cellular microenvironment is likely to be key to building scaffold materials with higher levels of functionality. Despite advances in TE, true 3D patterning of biochemical cues has proved difficult. 2. Clay-nanoparticle gels offer potential in TE for their ability to sequester proteins for sustained localised function. The current study reports a simple and biomimetic approach to applying self-assembling clay nanoparticle gels for spontaneous 3D micropatterning of proteins under physiological conditions. Hydrous suspensions of Laponite®, a synthetic smectite clay were added to a master solution containing concentrations of biomolecules and ions present in blood plasma. A diffusion-reaction mediated self-assembly process generated Laponite®/protein scaffolds possessing an internal degree of order. Self-assembled protein Laponite® scaffolds were able to absorb and template 3D patterns of a range of control model proteins (bovine serum albumin, avidin, streptavidin, immunoglobulin G and casein) and the growth factor, bone morphogenic protein. Importantly gel structures and protein loading patterns remained stable after a month at 4° C. Characterisation of the structures using fluorescence microscopy and confocal scanning laser microscopy demonstrated consistent spatial localization of the fluorescent model proteins able to be tuned by changing the assembly solution concentration. Protein free Laponite® gel controls actively adsorbed model proteins on gel surfaces. Simultaneous to the 3D protein micropatterning, polarized light imaging exposed a radial birefringence pattern that indicates the structure attained a degree of anisotropy, which increases as a function of time at 37° C. This study reveals, for the first time, the possibility to harness interactions between clay nanoparticles, biomolecules and ions present in physiological fluids to trigger the assembly of supramolecular structures of physical and biochemical cues. This bottom up approach affords new opportunities for 3D protein micropatterning and delivery of growth factors for tissue engineering of hard and soft tissues.

Example 1—Fabrication of a Clay-Nanoparticle/Protein Scaffold

Here we developed a 3D scaffold with different levels of hierarchical organization to mimic the cellular microenvironment of bone by exploiting the physicochemical properties of Laponite® (a synthetic hectorite) clay nanoparticles and proteins.

Following the biomimetic design principles towards the fabrication of hierarchical structures, we developed a method for assembling a 3D scaffold with hierarchical organization from nano to macroscale level under mild conditions using Laponite® colloidal gel and proteins. Here is presented the initial fabrication of the Laponite®/protein scaffold, followed by understanding and simplification of the systems in terms of composition and assembly.

Materials and Methods

Laponite® gel Preparation

Different concentrations of Laponite® gels were prepared as a weight percentage (wt %) of Laponite®/water following the protocol described by Dawson et al. (2011 *Advanced Materials*, 23(29), pp. 3304-3308). In brief, type 1+ deionised water (18.2 MI, pH 7) was added into a glass bottle, weighed and stirred vigorously until a vortex was formed. Weighed Laponite® XLG powder (BYK additive limited) was then slowly added and left to stir for 1 h at room temperature until the colloidal solution was clear. Following, it was weighed and autoclaved for 30 min at 121° C. and 15 psi using a bench top autoclave suitable for liquids sterilization (Classic Media Extendable). Other autoclaving conditions could be used. Once cooled, it was weighed again and the lost water was added to adjust the concentration.

Laponite® Droplet Assembly 2.8% Laponite® was vortexed vigorously for 20 seconds and then used to make 5 µl droplets with a 10 µl micropipette (piston-driven air displacement). Following, the scaffolds were assembled by placing a droplet directly into different tissue culture solutions as reported by Dawson et al. (2011. *Advanced Materials*, 23(29), pp. 3304-3308), such as Dulbecco's Modified Eagle's Medium (DMEM) (Lonza), Dulbecco's phosphate-buffered saline without calcium and magnesium (DPBS) (Lonza) and Foetal Calf Serum (FCS) (Gibco, Thermo Fisher Scientific).

Assuming that the clay nanoparticle gel assembled has a spherical shape. The diameter expected could be calculated from the known volume, as follows:

The volume (V) of a sphere is derived from the equation $$V = 4/3 \, \pi r^3 \quad (1)$$

Solving for the radius (r) variable $$r = \sqrt[3]{3\left(\frac{V}{4\pi}\right)} \quad (2)$$

Substitute the V by 5 mm³ into the formula solved (2) as the scaffold was made with 5 µl droplet of Laponite®

$$r = \sqrt[3]{3\left(\frac{5 \text{mm}^3}{4\pi}\right)} = 1.06 \text{ mm}$$

Consequently, the expected diameter of the scaffold assembled is 2.12 mm.

Laponite®/Protein Scaffolds

In this section, it is described the general procedure to build the Laponite® scaffold.

A 5 µl droplet of Laponite® gel (high viscosity) was placed directly into a tissue culture solution to assemble a Laponite® droplet and left to stabilize in the same solution. The scaffold was then rinsed to remove the excess tissue culture molecules. Next, the scaffold was transferred to a solution containing the proteins of interest to be loaded. Finally, the scaffold was rinsed and stored in an aqueous solution for further analysis (FIGS. 1 & 2).

Laponite®/Protein Scaffold Structural Characterization Techniques

High water content and non-covalently cross-linked hydrogels are difficult to process for imaging analysis without resulting in substantial collapse, deformation or masking of important features. In this regard, only optical imaging techniques, which did not require previous processing of the scaffolds to preserve the structure and prevent the introduction of artefacts, such as confocal laser scanning microscopy (CLSM), fluorescent light microscopy (LFM) and polarized light microscopy (PLM) were used.

Dynamic Mechanical Analysis (DMA)

To determine the effect of different tissue culture and protein solutions on the dynamic mechanical response of the Laponite® gels, an amplitude sweep test was performed. This rheological analysis is commonly used to evaluate the linear viscoelastic region (LVER) and critical strain or stress of viscoelastic materials by varying the amplitude of the shear stress, while the frequency is kept constant.

To prepare the samples, a 5 ml syringe was used as a mould; the head of the barrel was removed and 500 µl of 2.8% Laponite® gel was added. Following this, 500 µl tissue culture or protein solutions were poured over the gels and left to incubate for 24 h at 4° C. (n=3).

Afterward, the flat gels assembled were placed between the parallel plates of the rheometer (MCR 302, Anton Paar). The upper measuring plate (PP12, 12 mm diameter) was fixed at a distance of 2.5 mm. Furthermore, the amplitude range was set from 0.01 to 100%, and the frequency at 1 Hz. All rheology measurements were performed at 25° C.

Finally, the acquired data were processed with Microsoft excel software, and a graph of the storage (G', Pa) and loss modulus (G", Pa) values was plotted against the shear strain ($\gamma$-%) or deformation. Notice that the G' and G" represents the elastic and viscous behaviour of the sample respectively.

The gel viscoelastic properties were inferred from the graph by finding the value of $\gamma$ at which the G' and G" start to deviate from linear region. This value was then used to determine and compare the size of the linear viscoelastic region (LVER) of the G' and G". Thus, when the LVER of G' is larger than the G", the gel behaves more like a viscoelastic gel. In the opposite case when G" is larger than G' it behaves like a viscoelastic fluid.

A flow curve study was performed to evaluate the viscosity of autoclaved and non-autoclaved Laponite® gel as function of the shear rate time. The equipment was set to measure 21 points during a logarithmic increase in the shear rate from 0.01 to 100 (1/s). The measuring time for each point varied from 10 to 40 seconds for the lowest and highest shear rate respectively.

For this analysis, the sample was placed with a spatula directly into the stationary plate and the upper measuring plate (CP50, 50 mm diameter) was fixed at a distance of 0.5 mm. The excess of gel were removed and the rheological measurements were performed at 25° C.

We can observe that both samples describe a time-dependent shear thinning, since the viscosity decreases gradually as the shear rate increases. This is a typical behaviour of thixotropic materials. Furthermore, the autoclaved laponite was more viscous than the non-autoclaved (FIG. 22).

Example 2—Fractionation of FCS Solution into the Minimum Components Necessary to Assemble the Laponite®/Protein Scaffolds: A Bottom-Up Approach Assembly of clay-nanoparticle gel scaffolds in a foetal calf serum (FCS) leads to the formation of a structure with an internal pattern that facilitates the diffusion and 3D localization of model proteins into the clay-nanoparticle gel. On the other hand, the assembly in DPBS, an ionic solution does not facilitate the diffusion of proteins into the clay-nanoparticle gel, but their localization at the surface (FIG. 2). To our knowledge, this is the first report describing a bottom-up approach to fabricate a 3D scaffold with spatial localization of different macromolecules and with micron resolution involving non-covalent clay-nanoparticle gels and a physiological solution.

The FCS is a complex solution equivalent to the blood plasma. Determining the components of the FCS related to the clay-nanoparticle/protein scaffold is imperative. This solution contains xenogenic species that might induce some infections and despite it could be replaced by synthetic sera or human serum, still it is not practical since the scaffold would carry proteins and molecules out of interest that could potentially interfere with the desired biological response. In this regard, the aim of this experiment was to determine the main components present in the foetal calf serum (FCS) associated with 3D patterning of biomolecules within clay-nanoparticle gel scaffolds.

Experimental Design

FCS is composed of organic and inorganic phases. The organic phase is constituted by proteins, lipids and sugars, and the inorganic phase by ions. From each sub-group was evaluated the constituents accordingly to their concentration. The total protein concentration is ~3.7 g/dL, of which Bovine Serum Albumin (BSA) forms ~2.4 g/dL and Globulin 1.3 g/dL (RMBIO certificate of analysis, 2015). There are other growth factors, but at very low concentrations, in the order of micro to pictograms. The lipids are mainly constituted by cholesterol <50 mg/dL which are insoluble and thus form complexes with proteins known as lipoproteins. Fatty acids are found free in blood with a concentration of 100 to 120 µg/ml and complex with BSA for transport into the cells. Other lipophilic components are vitamins, specifically the D, E, A and K (fat-soluble) and some amino acids. Glucose is the main form of sugar found in blood and the foetal calf serum (FCS) contains ~86 mg/dL. Finally, the main ions are sodium (138 mmol/L) potassium (10.1 mmol/L), calcium (13.7 mg/dL) and phosphorus (9.3 mg/ml) (Table 1). The skilled person will appreciate that some variance in composition may occur in such a natural product. Table 2 provides a constituent list according to Freshney (2010. (p. 125). New Jersey: John Wiley & Sons. https://doi.org/10.1017/CBO9781107415324.004) and Cheever et al (2017. BioProcessing Journal, 16, 1-6. https://doi.org/10.12665/j16oa.cheever).

TABLE 1

Foetal calf serum, main components.
Foetal calf serum composition

| Main phases | Components | Sub-components | Concentrations |
| --- | --- | --- | --- |
| Organic | Proteins | Bovine Serum Albumin | 2.4 g/dL |
| | | Globulin | 1.3 g/dL |
| | Lipids | Cholesterol | <50 mg/dL |
| | | Vitamins | — |
| | | Fatty Acids | 100-120 µg/ml |
| | | Amino Acids | — |
| | Sugars | Glucose | 86 mg/dL |
| Inorganic | Ions | Sodium | 138 mmol/L |
| | | Potassium | 10.1 mmol/L |
| | | Phosphorus | 9.3 mg/ml |
| | | Calcium | 13.7 mg/dL |

TABLE 2

Constituents of serum.
Constituents of serum

| Main phases | Components | Sub-components | Range of Concentrations |
| --- | --- | --- | --- |
| Organic | Proteins | Bovine Serum Albumin | 20-50 mg/mL |
| | | Globulin | 1-15 mg/mL |
| | | Growth factors | 1-100 ng/mL |
| | | Hormones | 0.1-200 nM |
| | Lipids | Triglycerides * | 66.85 mg/dL |
| | | Cholesterol * | 28.33 mg/dL |
| | | Free Fatty Acids | 0.1-1.0 µM |
| | | Phospholipids | 0.7-3.0 mg/mL |
| | Carbohydrates | Glucose | 0.6-1.2 mg/mL |
| | Vitamins | Fat/water soluble | 10 ng-10 µg/mL |
| | Amino acids | | 0.01-1.0 µM |
| | Urea | | 170-300 ng/mL |
| Inorganic | Ions | Sodium | 135-155 mM |
| | | Potassium | 5-15 mM |
| | | Phosphate | 2-5 mM |
| | | Calcium | 4-7 mM |
| | | Magnesium | 0.6-11 mmol/L |
| | | Chlorides | 100 µM |

Table modified from Freshney (2010) and some data taken from Cheever et al (2017)*.

To determine the necessary components required for assembly of 3D patterning of proteins in clay-nanoparticle gels, individual components were selected to represent the various organic and inorganic fractions of FCS. In the first instance, BSA (30 mg/ml) was used to represent the protein component and Dulbecco's Phosphate Buffered Saline (DPBS) (NaCl—137 mmol/L, KCl—2.7 mmol/L, Na2HPO4—1.42 mmol/L and KH2PO4—0.24 mmol/L) with and without addition of the divalent cations, $Ca^{2+}$ (CaCl2 2H2O 0.1 mg/ml) and $Mg^{2+}$ (MgCl2 6H2O 0.1 mg/ml) was compared with water to assess the contribution of the inorganic phase. 5 µl droplets of 2.8% Laponite® gel were assembled into the various master solutions and left to stabilize for 50 min at 4° C. They were then transferred to a solution of FITC BSA at 4° C. to assess protein loading. Afterwards, the samples were rinsed briefly, stored in a 96 well plate with 200 µl of DPBS and imaged with confocal laser scanning microscope (CLSM) within 48 hours.

Results 3D patterning of FITC labelled BSA within the core of the clay-nanoparticle/protein scaffold, similar to that observed in FCS, was apparent only in clay-nanoparticle gels assembled in the presence of BSA (FIGS. 2 & 3). When added to water alone, the Laponite® phase swelled and lost integrity. Consistent with our previous data, addition to DPBS both with and without further addition of divalent cations generated scaffolds able to localise proteins around the periphery, but without movement of labelled protein to the core (FIG. 3). In contrast, BSA in water, in the absence of ions was able to generate strong patterning of BSA across the cross section of the scaffold.

Interestingly, despite being closer in composition to FCS compared to BSA in water, no clear movement of protein towards the core was apparent in scaffolds assembled in solutions of BSA in DPBS—though this was recovered with further addition of divalent ions, albeit at a substantially lower intensity.

These observations indicate that, while additional components in FCS could be used to tune the assembly and 3D localization of proteins in clay-nanoparticle gels, an aqueous solution of BSA alone is sufficient to assemble clay-nanoparticle/protein scaffolds capable of patterning proteins within the gel.

Example 3—Protein Gradient

The "system simplification" showed that BSA alone is sufficient to assemble the clay-nanoparticle/protein scaffold, but also the addition of ions could potentially be used to alter the protein localization. Thus, the aim of this experiment was to 1) determine the BSA concentration necessary to assemble the clay-nanoparticle/protein scaffold and 2) to evaluate the effect of ions in the clay-nanoparticle/protein scaffold assembly as function of BSA concentration.

For this purpose different BSA dilutions were prepared (0, 1, 2.5, 5, 10, 20, 30, 40 & 50 mg/ml) in water and DPBS respectively. Following, 200 µl of each dilution were added to 96 well plates (n=4) and to make the clay-nanoparticle/protein scaffold 5 µl droplets of 2.8% autoclaved Laponite® gel were placed in the assembly solutions (one per well) and incubated for 50 min at 4° C. They were transferred to 200 µl of 100 µg/ml FITC BSA and left to incubate for 1 h at 4° C. Finally, the scaffolds were transferred to 200 µl of DPBS and stored at 4° C. ready for analysis.

The scaffolds were analyzed by Confocal Laser Scanning Microscopy (CLSM) to evaluate the fluorescent protein localization inside the scaffolds and Bright field microscopy (BF) to measure the linear dimensions of the scaffolds after the assembly.

Qualitative analysis of the confocal images showed that the clay-nanoparticle/protein scaffold assembles in the presence of ions irrespectively of the protein concentration. Nevertheless, the BSA water scaffolds do not form under 20 mg/ml (FIG. 4).

The diffusion and localization of the fluorescent protein inside the scaffolds is protein concentration dependent for both assembly conditions; BSA water and BSA DPBS. The images reveal a fluorescent ring of protein near the surface of all the scaffolds irrespectively of the treatment except for the 0 mg/ml BSA DPBS that is at the surface (FIG. 4). A second internal fluorescent ring, closer to the scaffold core, can be observed on the scaffolds assembled with 20-30 mg/ml BSA water and 1-20 mg/ml BSA DPBS (FIGS. 5 and 6, respectively). Moreover, this ring localizes closer to the scaffolds core as the protein concentration increases and it seems to be thinner and sharper in the BSA DPBS scaffolds (FIGS. 4, 5 & 6).

Notice that the internal fluorescent ring of the scaffolds assembled with 30 mg/ml BSA water and 20 mg/ml BSA DPBS were observed only on 2 and 1 scaffolds out of 4 respectively. Thus, the threshold must be near these concentrations, respectively.

The bright field images of the scaffolds assembled with 1-10 mg/ml BSA DPBS show an internal ring (arrow), which correlates to the fluorescent protein localization inside the scaffold accordingly to the image measurements performed (FIGS. 6 A & C). Notice that this feature could not be detected on any of the BSA water scaffolds (FIG. 5). Moreover, it could be observed that the thickness of the internal fluorescent ring increases with the protein concentration (FIG. 6-D).

Finally, measurement of the scaffolds linear dimensions reveals that the size of the BSA DPBS scaffolds do not change as a function of the protein concentration (FIG. 7-C). In addition, their size is similar to the calculated theoretical size. On the contrary, the BSA water scaffolds show a decrease in size as the protein concentration increases (FIG. 7-D).

Conclusions

The globular protein (BSA) is a key component for the assembly and localization of proteins inside the clay-nanoparticle/protein scaffold (FIG. 4)
Assembly of scaffolds in BSA water is concentration dependent, from 50 to 20 mg/ml. However, under 20 mg/ml they do not assemble (FIG. 4).
The localization of the fluorescent proteins inside the BSA water scaffolds is concentration dependent. As the concentration of BSA decreases the fluorescent proteins move away from the core (the concentration threshold is 30 to 20 mg/ml) (FIG. 4).
Addition of ions to the system significantly decreases the BSA concentration necessary to localize proteins inside the scaffolds from 30 mg/ml BSA water to 10 mg/ml BSA DPBS (FIG. 4).
The localization of the fluorescent proteins inside the BSA DPBS scaffolds is concentration dependent. As the concentration of BSA decreases the fluorescent proteins move away from the core (the concentration threshold is 20 to 1 mg/ml) (FIGS. 4 & 6).
Ions can be used to tune the scaffolds. For example; they prevent the scaffold shrinkage and help to increase the spatial resolutions of proteins localization into the scaffolds (FIGS. 4 & 7).

Example 4—Loading of Different Selected Protein Molecules within Clay-Nanoparticle Scaffold Once the clay-nanoparticle/protein scaffold is assembled, the formation of rings inside the scaffold upon FITC BSA loading has been observed. Interestingly, this process occurs irrespective of the removal of excess FCS. Previous experiments have shown that simultaneously to the FITC BSA loading there is a release of FCS excess from the scaffold as a function of time. The process could be accounted for a simple diffusion gradient and separation of molecules (by size or charge). Although, given the composition of FCS, this hypothesis can be partly rejected since the FCS contains a high concentration of BSA (~25 to 30 mg/ml) and 300× diluted FITC BSA (0.1 mg/ml) is added.

Moreover, similar absorption and spatial localization of FITC BSA into rings was observed on scaffolds where excess of FCS had been removed.

Current data demonstrate an affinity of FITC BSA to specific regions of the clay-nanoparticle/protein scaffold although the mechanism(s) at play remain unclear. We hypothesized, that the secondary absorption and localization of FITC BSA to the scaffold is a process driven by the physical properties of the protein. Thus, we evaluated the loading of proteins with different molecular weights (MW) and isoelectric points (pI) into the clay-nanoparticle/protein scaffold. For this purpose, 5 μl droplets of 2.8% Laponite® gel were assembled into 60% FCS and left to stabilize for 50 min at 4° C. They were then rinsed with DPBS for 5 hours at 100 rpm at room temperature (RT). The rinsing solution was changed every hour and analysed by absorbance to verify that unbound FCS molecules were removed. Finally, the samples were transferred to a solution of BMP 2, Avidin, Streptavidin, Casein and Immunoglobulin G respectively to load the proteins for 1 h at 4° C. Samples were subsequently rinsed briefly, stored in a 96 well plate with 200 μl of DPBS and imaged with confocal laser scanning microscope (CLSM) (FIG. 8).

The model proteins loaded were fluorescently labelled to enable detection of their absorption and spatial localization within the nanoclay scaffolds. The Avidin, Streptavidin, Casein and IgG were labelled with fluorescein isocyanate (490 nm/525 nm) and the BMP 2 with DyLight 633 (638 nm/658 nm).

Confocal images were assigned pseudo colours to determined range of wavelengths (channels) to facilitate the subsequent analysis of the grey-scale images. Green was assigned to the emission bandwidth 500 nm-552 nm and red to the bandwidth 645 nm-783 nm in order to detect the FITC BSA and DyLight fluorophores respectively.

Qualitative analysis of the confocal images and region of interest (ROI) chart confirmed that BMP 2, Avidin, Streptavidin, Casein and IgG could be loaded into the Laponite®/protein scaffold (FIG. 8). Absorption of proteins occurred irrespective of their MW, pI and composition. Furthermore, the model proteins showed different spatial localization within the Laponite® scaffold (FIG. 9).

Further analysis of the spatial localisation of proteins into the scaffold was performed by comparing their localisation (fluorescent signal) with respect to the distinct ring observed in the bright field images of all the scaffolds, together with their pI and MW (FIG. 9). Notice that the ring structure is related, from previous experiments, to the assembly process with FCS.

The assembled ring localised ~500 nm from the scaffold surface (FIGS. 9 B & C). Proteins were noted to be absorbed and localised outside or inside the ring (FIG. 9-A). Specifically IgG (150 KDa-pI 7) and Avidin (68 KDa-pI 10.5) were not absorbed further from the ring, comparable to BSA (66 KDa, pI 4.8). These proteins possess different isoelectric points, therefore different charges at pH 7.4. In this regard, the IgG should be neutral, Avidin positively charged and the BSA negatively charged. The current data confirm absorption into the scaffold and preferential localisation outside the ring is not a function of the protein net charge.

BMP 2 (32 KDa-pI 8.2+/−4) and streptavidin (60 KDa-IP 5) were absorbed and localised inside the ring. At physiological pH, BMP 2 is modestly positively charged and streptavidin negatively charged. As indicated, protein charge does not determine protein localisation in the Laponite® scaffold (FIG. 9-A). Interestingly, the casein (19 KDa-pI 4) was absorbed predominantly over the surface, adjacent and within the ring (FIG. 9-A).

Furthermore, protein localisation is not related to protein MW. IgG, Avidin and BSA were observed to be localised outside the rings (MW 150, 68, and 66.5 KDa respectively). BMP 2 (32 KDa) and streptavidin (60 KDa) were localised inside the ring. Although a threshold of approximately 60 to 66.5 KDa would appear appropriate, Casein (19 KDa) was observed to reside outside and inside the ring (FIGS. 8 & 9).

Protein aggregation is a common issue with proteins related to numerous intrinsic (primary, secondary, tertiary or quaternary structure) and extrinsic (environment in which protein present or processed)" conditions. The aggregates are at least twice the size as that of the native protein. Thus, we hypothesize that the Avidin and BSA form aggregates that increases their size significantly and limit their absorption to outside the ring. The Streptavidin could be forming smaller aggregates, which subsequently can pass though the ring. Casein is a phosphoprotein, relatively insoluble, especially in water and requires a long stirring time to reconstitute. In these studies, all proteins were prepared 1 hour prior to loading and reconstituted in water except for the Casein, which was dissolved in DPBS. Thus, if protein aggregation is at play, then Casein localisation in different areas of the Laponite® scaffold is a consequence of varying aggregate composition.

Conclusions

The present studies have examined the mechanism of protein loading within a clay-nanoparticle/protein scaffold. We hypothesized, that the secondary absorption and localisation proteins into the scaffold is a process driven by the physical properties of the protein and thus evaluated the loading of proteins with different molecular weights (MW) and isoelectric points (pI) within the Laponite®/protein scaffold.

In summary:
  Clay-nanoparticle/protein scaffold can be loaded with different globular proteins such as BMP 2, Avidin, Streptavidin, Casein and IgG.
  The absorption of globular proteins into the clay-nanoparticle/protein scaffold occurs irrespectively of their MW and pI.
  The spatial localisation of the proteins within the scaffolds are not a function of protein net charge at physiological pH.
  The mechanisms at play delineating the spatial localisation of globular proteins into the clay-nanoparticle/protein scaffold cannot be inferred from these studies and other factors including the actual size of the protein in nanometres could change significantly as a consequence of internal or external factors resulting in the formation of protein monomers and/or macromolecules complexes upon reconstitution.

Moreover, to determine the loading mechanism or driving force, we hypothesize that it could be a "hydrophobic effect". Thus, hydrophobic and hydrophilic drugs can be loaded. Other molecules apart from proteins could be loaded in the scaffold, such as DNA, amino acids, vitamins, peptides and drugs (eg. Ibuprofen or bisphosphonate).

Example 5—Laponite®/Protein Scaffolds of Different Shapes and Sizes

A proof of concept study was setup to demonstrate the versatility of the system showing that different proteins could be loaded into clay-nanoparticle gels of different size and shapes. It was observed that assembly time is related to the concentration of the assembly solution and the Laponite® volume. For example: the strings assembly took 30 min in 60% FCS, the 5 µl and 20 µl droplets took 50 min and 3 h respectively in 60% FCS, the 200 µl and 1 ml cylinders took 14 h and 3 days respectively in 100% FCS. In addition, the concentration of the loading solution was adjusted accordingly to the scaffolds size. The results (FIG. 10) show the versatility of the system to make scaffolds of different size and shape loaded with different globular proteins.

Example 6—Different Globular Protein Assembly

The aim of this experiment was to determine if the Laponite® protein scaffolds could be assembled with alternative globular proteins to BSA. For this purpose, the globular proteins (myoglobin, lysozyme, casein, BSA, streptavidin, hyaluronidase, haemoglobin, Avidin, IgG and catalase) were dissolved in DPBS with a molar concentration of 150 µM. To assemble the scaffolds, a 5 µl droplet of 2.8% Laponite® gel was placed in 200 µl of each assembly solution (n=3). The scaffolds were left incubating for 3 h at 4° C. Then, the globular protein solution was removed and 200 µl of DPBS was added (2×) to rinse the scaffolds. Following this, 200 µl of 100 µg/ml FITC BSA (DPBS) was added and incubated for 14 h at 4° C. Finally, the FITC BSA was removed, rinsed gently (2×) with DPBS and the scaffolds stored in 200 µl of DPBS at 4° C. for CLSM imaging analysis.

The confocal images show that it is possible to assemble the clay-nanoparticle/protein scaffold with a wide range of globular protein with different molecular weight and isoelectric points. Moreover, all the scaffolds absorbed the FITC BSA but showed different spatial localization (FIG. 11a & 11b). Further analysis demonstrated no relationship between the protein diffusion path length with their respective isoelectric point and the molecular weight (FIG. 11c).

Example 7—Effect of Loading Solvent on the Protein Absorption

The aim of this experiment was to evaluate the effect of the solvent on the protein loading.

For this purpose, scaffolds of 5 µl of 2.8% Laponite® were assembled in 60% FCS for 50 min at 4° C. They were then rinsed for 20 h in DPBS until no excess of FCS was detected by absorbance. The scaffolds were transferred to 150 µl of 3 µM of Avidin, Streptavidin, IgG and BSA that were dissolved in water and DPBS respectively (n=3).

After incubation at 4° C., the protein solution was removed, replaced by DPBS and the scaffolds imaged by CLSM.

The proteins used were labelled with FITC BSA to be able to evaluate their localization. In this regard, the confocal images revealed significant changes in the fluorescent intensity. The fluorescent intensity was lower for the scaffolds loaded with protein-water compared to the ones loaded with protein-DPBS irrespectively of the globular protein used. Moreover, the protein had the same spatial distribution inside the scaffold irrespective of the solvent except for the BSA, when loaded with water the protein localized in the core, but with DPBS it formed a sharp and thick ring in the core.

Conclusion

The results indicate that the solvent affects the protein loading. Specifically, changes in the fluorescent intensity suggest that the scaffolds loaded with protein-DPBS absorbed more protein than the ones loaded with protein-water (FIG. 12). Moreover, the solvent only affected the localization of the BSA.

Effect of Loading Solvent on the BMP 2 Absorption

Similar to the previous experiment, the aim of this experiment was to evaluate the effect of the loading solvents on the absorption of BMP-2 into the Laponite®/protein scaffold.

For this purpose, scaffolds of 5 µl of 2.8% Laponite® were assembled in 60% FCS for 50 min at 4° C. They were then rinsed for 20 h in DPBS until no excess of FCS was detected by absorbance. The scaffolds were transferred to 150 µl of 1 µM BMP-2 that was dissolved in water, DPBS and InductOS® respectively (n=3). After incubation at 4° C., the protein solution was removed, replaced by DPBS and the scaffolds imaged by CLSM.

The proteins used were labelled with DyLight 633 to be able to evaluate their localization. In this regard, the confocal images revealed significant changes in the fluorescent intensity. It was higher for the proteins that were dissolved with DPBS, followed by water and InductOS® (FIG. 13). Interestingly, all the proteins loaded have different spatial localization into the scaffolds. It localized into the core when loaded with water, formed a sharp and thick ring in the core with DPBS and a sphere in the core surrounded by a halo with InductOS®.

Conclusions

The results indicate that the loading solvent does has an effect in the protein loading and localization (FIG. 13). The changes in fluorescent intensity suggest that the scaffolds loaded with DPBS absorbed more protein, followed by water and InductOS®. Nevertheless, further absorbance analysis must be performed to verify observations and to evaluate if the changes in the fluorescent intensity results from the fluorescent quenching or enhancement effect produced by the solvent.

Example 8—Quantification of the Protein Loading into the Laponite®/Protein Scaffold The aim of these experiments was to quantify the amount of proteins that can be loaded into the Laponite® protein scaffold.

The first experiment was performed with a loading solution of 100 ng/ml FITC BSA. For this purpose, 5 µl scaffolds of 2.8% Laponite® gel in FCS were made. They were left to incubate for 50 min at 4° C. and rinsed for 20 h until no excess of FCS was detected by absorbance analysis. The control scaffolds were assembled in DPBS. Then, the scaffolds were transferred to 200 µl of 100 ng/ml FITC BSA and DPBS respectively, 4 replicates per time point (0, 1, 3, 6, 24, 48 and 72 h). Finally, they were removed from the loading solution at every time point, transferred to DPBS to be imaged with CLSM and FM and the aliquots were analysed with fluorometric analysis (FIG. 14).

The results show that the scaffolds assembled with FCS absorbed 4.923+1.25 mg/ml of Laponite® gel at 72 h incubation and the control scaffolds assembled with DPBS absorbed 11.738+760 mg/ml of Laponite® gel.

In this regard, it was decided to decrease the concentration of the protein loading solution to 40 µg/ml, to evaluate the maximum absorption capacity of the scaffolds and also to examine the absorption profile in more detail.

Thus, the experiment was repeated, but a loading solution of 40 µg/ml was used, controls for the loading solutions (FITC BSA and DPBS) were added and a standard curve per time point was produced.

The results show that the scaffolds assembled with FCS absorbed 1.417+430.6 mg/ml of Laponite® gel at 72 h incubation and the control scaffolds assembled with DPBS absorbed 4.428+631.8 mg/ml of Laponite® gel. Thus, the protein absorbed was significantly lower compared to the ones loaded with 100 µg/ml (FIG. 14).

Conclusions

In both experiments the maximum absorption capacity was not reached. Thus, the loading time points need to be extended to at least 5 to 7 days.

An increase in concentration of the loading solution, increases the concentration of protein absorbed into the scaffold. This indicates that increasing the concentration of the loading solution could be used to decrease the loading time.

The results suggest that the amount of protein loaded is the result of a diffusion process driven by concentration gradient across the scaffold.

The globular protein loading (BSA) within the FCS gel is ~4.9 mg/ml of gel scaffold (after 72 h incubation).

Example 9—Assembly and Loading of Multiple Protein Rings

The aim of this experiment was to assemble clay-protein scaffolds and with multiple protein localization. For this purpose 20 mg/ml BSA was prepared to assemble the scaffolds and 100 ug/ml FITC BSA to load. To make the scaffolds 5 µl droplets of the Laponite® gel were placed in 200 µl of BSA solution (one per well, n=8). The scaffolds were left assembling in the solution and alternated with FITC BSA 4 times. Finally, they were stored in 200 µl of DPBS ready for confocal imaging analysis.

The CLSM images show the formation of multiple fluorescent rings inside the Laponite®/protein scaffolds (FIG. 18).

Example 10—Functionalization of Laponite Colloidal Solution with Polymer Prior Assembly and Loading Steps To improve the bioactivity, porosity and mechanical properties of the scaffolds, 2.8% clay-gel was mixed with different polymeric solutions, collagen type I—FITC (210.75 ug/ml), alginate (348.15 ug/ml) and agarose (219.9 ug/ml) in a 1/100 ratio, respectively. The scaffolds were assembled by placing a 5 ul droplet of respective composites in 10 mg/ml BSA solution. Later they were transferred to 100 ug/ml BSA Alexa 647 to load the protein, except for the agarose based scaffolds that were transferred to 100 ug/ml FITC BSA. Finally, the scaffolds were stored in DPBS and imaged with CLSM.

With reference to FIG. 21, the confocal images revealed the assembly and loading of the scaffold regardless of the polymer added to the 2.8% clay-gel.

The results indicate that other molecules can be added to the clay-gel prior the assembly without altering the assembly of the 3D micropatterned scaffolds.

The invention claimed is:

1. A method for forming a spatially structured clay-nanoparticle gel comprising one or more spatially structured molecule species, the method comprising:
    forming a spatially structured clay-nanoparticle gel comprising protein, by
        providing a colloidal solution of clay-nanoparticles, and immersing the colloidal solution of clay-nanoparticles into an aqueous assembly solution without mixing and allowing the colloidal solution of clay-nanoparticles to set via protein diffusion into a gel within the aqueous assembly solution,
wherein a protein is provided in the aqueous assembly solution prior to, concurrently, or after the immersion of the colloidal solution of clay-nanoparticles into the aqueous assembly solution, thereby forming a clay-nanoparticle gel comprising the protein; and
loading the clay-nanoparticle gel comprising protein with additional molecules comprising the step of immersing the clay-nanoparticle gel comprising protein into an aqueous loading solution,
wherein the additional molecules are provided in the aqueous loading solution prior to, concurrently, or after the immersion of the clay-nanoparticle gel comprising protein into the aqueous loading solution, such that the additional molecules are absorbed into the clay-nanoparticle gel and spatially structured therein.

2. The method according to claim 1, wherein the colloidal solution of clay-nanoparticles comprises between about 0.5% and about 5% clay-nanoparticles (w/v).

3. The method according to claim 1, wherein the protein provided in the aqueous assembly solution is a globular protein.

4. The method according to claim 1, wherein the aqueous assembly solution comprising protein and/or the aqueous loading solution further comprises one or more ions.

5. The method according to claim 1, wherein the molar ionic strength of the aqueous assembly solution and/or the aqueous loading solution is between about 0.1 and about 0.30 mol/L.

6. The method according to claim 1, wherein the molecule that is to be loaded and spatially structured in the clay-nanoparticle gel, is a bioactive molecule.

7. The method according to claim 1, wherein the molecule that is to be loaded and spatially structured in the clay-nanoparticles gel comprises an organic or inorganic molecule, and is optionally selected from the group consisting of a drug; a pro-drug; a biomolecule; a protein; a peptide; an oligomer; nucleic acid; oligonucleotide; antibody; antibody fragment, mimic or variant; a small molecule; and combinations thereof.

8. The method according to claim 1, wherein the molecule that is to be loaded and spatially structured in the clay-nanoparticles gel comprises a protein selected from the group consisting of BMP, Avidin, Streptavidin, Casein, IgG, and combinations thereof.

9. The method according to claim 1, wherein combinations of different organic molecules are loaded into the clay-nanoparticles gel.

10. The method according to claim 1, wherein the molecule that is to be loaded and spatially structured in the clay-nanoparticles gel is dye or fluorescent dye labelled.

11. The method according to claim 1, wherein the setting of the clay-nanoparticles gel is at a temperature of about 4° C.

12. The method according to claim 1, wherein once the colloidal solution of clay-nanoparticles is immersed for assembly into the aqueous assembly solution comprising protein, the resulting clay-nanoparticles gel is left in the aqueous assembly solution and allowed to stabilise for between about 20 minutes and about 4 days.

13. The method according to claim 1, further comprising the step of rinsing the clay-nanoparticles gel in an aqueous rinse solution after its assembly/setting, and/or rinsing the spatially structured clay-nanoparticles gel in an aqueous rinse solution after the molecule loading.

14. The method according to claim 1, wherein the loading of the clay-nanoparticles gel with the molecule comprises suspending the clay-nanoparticles gel in a loading solution or suspension of the molecule.

15. The method according to claim 1, wherein the loading of the clay-nanoparticles gel is at a temperature of about 4° C. or about 37° C., or a temperature therebetween.

16. The method according to claim 1, wherein one or more subsequent molecules are loaded into the spatially structured clay-nanoparticles gel after loading of the first molecule.

17. The method according to claim 1, wherein assembly and loading steps are carried out in combination as one step.

18. The method according to claim 1, wherein the colloidal solution of clay-nanoparticles is autoclaved prior to assembly into the clay-nanoparticles gel.

* * * * *